United States Patent
Da et al.

(10) Patent No.: US 12,532,282 B2
(45) Date of Patent: Jan. 20, 2026

(54) METHOD AND APPARATUS FOR CORRECTING TRANSMITTING CHANNEL DELAY, AND STORAGE MEDIUM

(71) Applicant: DATANG MOBILE COMMUNICATIONS EQUIPMENT CO., LTD., Beijing (CN)

(72) Inventors: Ren Da, Beijing (CN); Bin Ren, Beijing (CN); Hui Li, Beijing (CN); Xiaotao Ren, Beijing (CN); Zheng Zhao, Beijing (CN); Gang Li, Beijing (CN); Rongyi Fang, Beijing (CN); Zhenyu Zhang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 409 days.

(21) Appl. No.: 18/019,239

(22) PCT Filed: Jul. 22, 2021

(86) PCT No.: PCT/CN2021/107775
§ 371 (c)(1),
(2) Date: Feb. 1, 2023

(87) PCT Pub. No.: WO2022/028252
PCT Pub. Date: Feb. 10, 2022

(65) Prior Publication Data
US 2023/0309042 A1  Sep. 28, 2023

(30) Foreign Application Priority Data
Aug. 7, 2020  (CN) .......................... 202010791119.0

(51) Int. Cl.
*H04W 56/00*  (2009.01)
*H04W 64/00*  (2009.01)

(52) U.S. Cl.
CPC ......... *H04W 56/005* (2013.01); *H04W 64/00* (2013.01)

(58) Field of Classification Search
CPC ..... H04W 56/005; H04W 64/00; G01S 19/32; G01S 5/0036; G01S 5/021; G01S 5/0236; H04L 5/0048
(Continued)

(56) References Cited

U.S. PATENT DOCUMENTS 11,902,931 B2 * 2/2024 Tao ..................... H04W 24/10
2015/0382152 A1 12/2015 Lindskog et al.
(Continued)

FOREIGN PATENT DOCUMENTS

| CN | 1913703 A | 2/2007 |
| CN | 101043254 A | 9/2007 |

(Continued)

OTHER PUBLICATIONS

CATT,"Consideration on Supporting Local LMF in NR Positioning R16 ", 3GPP TSG RAN WG2 Meeting #104, Spokane, USA, Nov. 12-16, 2018, total 4 pages, R2-1816955.
(Continued)

*Primary Examiner* — Don N Vo
(74) *Attorney, Agent, or Firm* — KILPATRICK TOWNSEND & STOCKTON LLP

(57) ABSTRACT

Embodiments of the present disclosure provide a method and apparatus for correcting a Tx delay, and a storage medium. The method includes receiving Tx delay (Tx Delay) parameter information transmitted by a transmitting node, and transmitting positioning reference signal configuration information to a receiving node; and correcting a positioning measurement value on the basis of the Tx Delay parameter information, the positioning measurement value being obtained by means of the receiving node measuring,
(Continued)

according to the positioning reference signal configuration information, a positioning reference signal transmitted by the transmitting node. In the embodiments of the present disclosure, by using Tx Delay parameter information, the effect of a Tx delay on a time-related positioning measurement value can be eliminated, and the positioning precision is effectively improved.

20 Claims, 10 Drawing Sheets

(58) Field of Classification Search
USPC .................................................. 455/456.1
See application file for complete search history.

(56) References Cited

U.S. PATENT DOCUMENTS

| | | | |
|---|---|---|---|
| 2020/0153517 | A1 | 5/2020 | Akkarakaran et al. |
| 2020/0229124 | A1 | 7/2020 | Soriaga et al. |
| 2021/0314800 | A1* | 10/2021 | Manolakos ............ H04W 24/10 |
| 2021/0400626 | A1* | 12/2021 | Yerramalli ............ H04L 5/0048 |

FOREIGN PATENT DOCUMENTS

| | | |
|---|---|---|
| CN | 109155984 A | 1/2019 |
| CN | 109587632 A | 4/2019 |
| CN | 110971326 A | 4/2020 |
| JP | 2004101254 A | 4/2004 |
| JP | 2017076927 A | 4/2017 |
| WO | 2019058150 A1 | 3/2019 |
| WO | 2020063393 A1 | 4/2020 |
| WO | 2020132080 A3 | 7/2020 |

OTHER PUBLICATIONS

Nokia et al., "Measurements for NR Positioning", 3GPP TSG RAN WG1 #97, Reno, Nevada, May 13-17, 2019, total 8 pages, R1-1906660.
CATT, "Draft WID of NR Positioning Enhancements in Rel-17", 3GPP TSG RAN Meeting #84, Newport Beach, USA, Jun. 3-6, 2019, total 5 pages, RP-191414.
European Patent Office, Extended European Search Report Issued in Application No. 21852890.9, Aug. 2, 2024, Germany, 10 pages.
Japanese Patent Office, First Office Action Issued in Application No. 2023-508042, Dec. 25, 2023, 5 pages.
3rd Generation Partnership Project; Technical Specification Group Radio Access Network; NG Radio Access Network (NG-RAN); Stage 2 functional specification of User Equipment (UE) positioning in NG-RAN (Release 16), 3GPP TS 38.305 V16.1.0 , Jul. 2020.
3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 16), 3GPP TS 36.305 V16.1.0, Jul. 2020.

* cited by examiner

METHOD AND APPARATUS FOR CORRECTING TRANSMITTING CHANNEL DELAY, AND STORAGE MEDIUM

CROSS-REFERENCE TO RELATED APPLICATION

The present application is a US National Stage of International Application No. PCT/CN2021/107775, filed on Jul. 22, 2021, which claims priority to Chinese Patent Application No. 202010791119.0, filed on Aug. 7, 2020, entitled "Method and Apparatus for Correcting Transmitting Channel Delay, and Storage Medium", which are hereby incorporated by reference in their entireties.

FIELD

The present application relates to the field of communication, in particular to a method and an apparatus for correcting transmission channel delay, and a storage medium.

BACKGROUND

The 3rd generation partnership project (3GPP) has introduced a variety of positioning methods by measuring a positioning reference signal and using the measurement values related to arrival time of the positioning reference signal in relevant protocol specifications, such as a downlink time difference of arrival (DL-TDOA) positioning method in new radio (NR), an uplink time difference of arrival (UL-TDOA) positioning method in NR, and a multiple cell-round trip time (Multi-RTT) positioning method in NR.

The above methods are all to position based on time related measurement values. However, the time related measurement values are inevitably affected by signal propagation delay. From a perspective of transmitting the positioning reference signal, there is a transmission delay (Tx Delay, namely a transmission channel delay) between a timing at which the positioning reference signal is generated and a timing at which the positioning reference signal is transmitted by a transmitter (user equipment (UE) or gNB) antenna. From a perspective of receiving the positioning reference signal, there is a reception delay (Rx Delay) between a timing at which the positioning reference signal arrives at a receiver (gNB or UE) antenna and a timing at which the positioning reference signal is detected. In general, the effect of Rx Delay on the positioning measurement values can be eliminated as much as possible through an appropriate design by the receiver, but it is difficult to eliminate the effect of Tx Delay on the positioning measurement values since the receiver does not know Tx Delay, which results in large positioning error and a positioning accuracy is unable to meet the requirements.

In order to improve the positioning accuracy, it needs to provide a method to correct the transmission channel delay when positioning using time related measurement values.

SUMMARY

Embodiments of the present application provide a method and an apparatus for correcting Tx delay, and a storage medium, to overcome the defect that it is difficult to eliminate the effect of Tx Delay on the positioning measurement value, resulting in large positioning error and a positioning accuracy is unable to meet the requirements.

According to an embodiment of the present application, a method for correcting Tx delay is provided, performed by location management function (LMF), the method includes:
receiving transmission channel delay (Tx Delay) parameter information transmitted by a transmitting node and transmitting positioning reference signal configuration information to a receiving node; and
correcting a positioning measurement value based on the Tx Delay parameter information;
where the positioning measurement value is obtained through measuring, by the receiving node, a positioning reference signal transmitted by the transmitting node according to the positioning reference signal configuration information.

According to the method for correcting Tx delay of an embodiment of the present application, the transmitting node is a next generation Node B (gNB) and/or user equipment (UE),
in case that the transmitting node is the gNB, the Tx Delay parameter information is gNB Tx Delay parameter information, the receiving node includes the UE, and the positioning reference signal is a downlink positioning reference signal;
in case that the transmitting node is the UE, the Tx Delay parameter information is UE Tx Delay parameter information, the receiving node is the gNB, and the positioning reference signal is an uplink positioning reference signal; and
in case that the transmitting node includes a gNB and a UE, the Tx Delay parameter information includes gNB Tx Delay parameter information and UE Tx Delay parameter information, the receiving node includes a UE and a gNB, and the positioning reference signal includes a downlink positioning reference signal and an uplink positioning reference signal.

According to the method for correcting Tx delay of an embodiment of the present application, in case that the transmitting node is the gNB, the receiving the Tx Delay parameter information transmitted by the transmitting node and transmitting the positioning reference signal configuration information to the receiving node includes:
transmitting a TRP INFORMATION REQUEST message to the gNB, where the TRP INFORMATION REQUEST message is used for requesting the gNB to provide its TRP information, downlink positioning reference signal configuration information and gNB Tx Delay parameter information;
receiving the TRP information, the downlink positioning reference signal configuration information and the gNB Tx Delay parameter information; and
transmitting a ProvideAssistanceData message to UE, where the ProvideAssistanceData message includes the downlink positioning reference signal configuration information for the UE to measure the downlink positioning reference signal transmitted by the gNB according to the downlink positioning reference signal configuration information to obtain a first positioning measurement value;
the correcting the positioning measurement value based on the Tx Delay parameter information includes:
correcting the first positioning measurement value based on the gNB Tx Delay parameter information.

According to the method for correcting Tx delay of an embodiment of the present application, before the transmitting the TRP INFORMATION REQUEST message to the gNB, the method further includes:

transmitting a RequestCapabilities message to the UE, where the RequestCapabilities message is used for requesting the UE to inform the LMF of a location function supported by the UE;

receiving a ProvideCapabilities message transmitted by the UE, where the ProvideCapabilities message is used for informing the LMF of the location function supported by the UE; and receiving a RequestAssistanceData message transmitted by the UE, where the RequestAssistanceData message is used for requesting the LMF to provide location assistance data to the UE.

According to the method for correcting Tx delay of an embodiment of the present application, in case that the transmitting node is the UE, the receiving the Tx Delay parameter information transmitted by the transmitting node and transmitting the positioning reference signal configuration information to the receiving node includes:

receiving UE Tx Delay parameter information obtained by the UE;

transmitting a TRP INFORMATION REQUEST message to a gNB, where the TRP INFORMATION REQUEST message is used for requesting the gNB to provide TRP information and uplink positioning reference signal configuration information;

receiving the TRP information and the uplink positioning reference signal configuration information; and transmitting a MEASUREMENT REQUEST message to the gNB, where the MEASUREMENT REQUEST message includes the uplink positioning reference signal configuration information for the gNB to measure an uplink positioning reference signal transmitted by the UE according to the uplink positioning reference signal configuration information to obtain a second positioning measurement value;

the correcting the positioning measurement value based on the Tx Delay parameter information includes:

correcting the second positioning measurement value based on the UE Tx Delay parameter information.

According to the method for correcting Tx delay of an embodiment of the present application, before the receiving UE Tx Delay parameter information obtained by the UE, the method further includes:

transmitting a RequestCapabilities message to the UE, where the RequestCapabilities message is used for requesting the UE to inform the LMF of a location function supported by the UE and whether the UE is configured to provide the UE Tx Delay parameter information;

receiving a ProvideCapabilities message transmitted by the UE, where the ProvideCapabilities message is used for informing the LMF of the location function supported by the UE and whether the UE is configured to provide the UE Tx Delay parameter information; and transmitting a RequestUETxDelay message to the UE, where the RequestUETxDelay message is used for requesting the UE to provide the UE Tx Delay parameter information.

According to the method for correcting Tx delay of an embodiment of the present application, in case that the transmitting node is both gNB and UE, the receiving the Tx Delay parameter information transmitted by the transmitting node and transmitting the positioning reference signal configuration information to the receiving node includes:

receiving UE Tx Delay parameter information obtained by the UE;

transmitting a TRP INFORMATION REQUEST message to the gNB, where the TRP INFORMATION REQUEST message is used for requesting the gNB to provide TRP information, downlink positioning reference signal configuration information, uplink positioning reference signal configuration information and gNB Tx Delay parameter information;

receiving the TRP information, the downlink positioning reference signal configuration information, the uplink positioning reference signal configuration information and the gNB Tx Delay parameter information;

transmitting a Provide AssistanceData message to the UE, where the Provide AssistanceData message includes the downlink positioning reference signal configuration information for the UE to measure the downlink positioning reference signal transmitted by the gNB according to the downlink positioning reference signal configuration information to obtain a third positioning measurement value;

transmitting a MEASUREMENT REQUEST message to the gNB, where the MEASUREMENT REQUEST message includes the uplink positioning reference signal configuration information for the gNB to measure an uplink positioning reference signal transmitted by the UE according to the uplink positioning reference signal configuration information to obtain a fourth positioning measurement value;

the correcting the positioning measurement value based on the Tx Delay parameter information includes:

correcting the third positioning measurement value based on the gNB Tx Delay parameter information; and correcting the fourth positioning measurement value based on the UE Tx Delay parameter information.

According to the method for correcting Tx delay of an embodiment of the present application, the method further including:

transmitting a RequestCapabilities message to the UE, where the RequestCapabilities message is used for requesting the UE to inform the LMF of a location function supported by the UE and whether the UE is configured to provide the UE Tx Delay parameter information;

receiving a ProvideCapabilities message transmitted by the UE, where the ProvideCapabilities message is used for informing the LMF of the location function supported by the UE and whether the UE is configured to provide the UE Tx Delay parameter information;

transmitting a RequestUETxDelay message to the UE, where the RequestUETxDelay message is used for requesting the UE to provide the UE Tx Delay parameter information; and receiving a RequestAssistanceData message transmitted by the UE, where the RequestAssistanceData message is used for requesting the LMF to provide location assistance data to the UE.

According to the method for correcting Tx delay of an embodiment of the present application, the gNB includes a serving gNB and one or more neighboring gNBs, and the positioning reference signal configuration information is determined by the serving gNB.

In an embodiment, the Tx Delay parameter information includes absolute group delay information of the transmission channel, relative group delay information of the transmission channel and a quality indicator for group delay information of the transmission channel:

where the absolute group delay information of the transmission channel is a parameter related to per carrier frequency band or a carrier frequency with a certain carrier bandwidth, and represents an absolute delay of the carrier frequency band or the carrier frequency;

the relative group delay information of the transmission channel is a set of parameters associated with a sub-carrier frequency in a bandwidth covered by a carrier frequency or a frequency band; and the quality indicator for group delay information of the transmission channel includes an error parameter.

According to an embodiment of the present application, a method for correcting Tx delay is provided, performed by user equipment (UE), the method includes:

obtaining UE transmission channel delay (UE Tx Delay) parameter information;

transmitting the UE Tx Delay parameter information to a location management function (LMF) for the LMF to correct a positioning measurement value based on the UE Tx Delay parameter information; and where the positioning measurement value is obtained through measuring, by a gNB, an uplink positioning reference signal transmitted by the UE according to uplink positioning reference signal configuration information, and/or, the positioning measurement value is obtained through measuring, by the UE, a downlink positioning reference signal transmitted by the gNB according to downlink positioning reference signal configuration information.

According to the method for correcting Tx delay of an embodiment of the present application, the transmitting the UE Tx Delay parameter information to the LMF includes:

receiving a RequestCapabilities message transmitted by the LMF, where the RequestCapabilities message is used for requesting the UE to inform the LMF of a location function supported by the UE and whether the UE is configured to provide the UE Tx Delay parameter information;

transmitting a ProvideCapabilities message to the LMF, where the ProvideCapabilities message is used for informing the LMF of the location function supported by the UE and whether the UE is configured to provide the UE Tx Delay parameter information;

receiving a RequestUETxDelay message transmitted by the LMF, where the RequestUETxDelay message is used for requesting the UE to provide the UE Tx Delay parameter information; and transmitting a Provide UETxDelay message to the LMF, where the Provide UETxDelay message includes the UE Tx Delay parameter information.

According to the method for correcting Tx delay of an embodiment of the present application, after the transmitting the Provide UETxDelay message to the LMF, the method further includes:

receiving an uplink positioning reference signal configuration information transmitted by a gNB through radio resource control (RRC) signaling, and transmitting an uplink positioning reference signal to the gNB for the gNB to measure the uplink positioning reference signal and transmitting a measured positioning measurement value to the LMF for the LMF to correct the positioning measurement value based on the UE Tx Delay parameter information.

According to the method for correcting Tx delay of an embodiment of the present application, after the transmitting the Provide UETxDelay message to the LMF, the method further includes:

transmitting a RequestAssistanceData message to the LMF, where the RequestAssistanceData message is used for requesting the LMF to provide location assistance data;

receiving a ProvideAssistanceData message transmitted by the LMF, where the ProvideAssistanceData message includes downlink positioning reference signal configuration information;

measuring a downlink positioning reference signal transmitted by the gNB according to the downlink positioning reference signal configuration information to obtain a third positioning measurement value, and transmitting the third positioning measurement value to the LMF for the LMF to correct the third positioning measurement value based on the gNB Tx Delay parameter information; and receiving an uplink positioning reference signal configuration information transmitted by the gNB through the RRC signaling, and transmitting an uplink positioning reference signal to the gNB for the gNB to measure the uplink positioning reference signal to obtain a fourth positioning measurement value and transmitting the fourth positioning measurement value to the LMF for the LMF to correct the fourth positioning measurement value based on the UE Tx Delay parameter information.

According to an embodiment of the present application, a method for correcting Tx delay is provided, performed by a gNB, the method includes:

obtaining gNB transmission channel delay (gNB Tx Delay) parameter information;

transmitting the gNB Tx Delay parameter information to a location management function (LMF) for the LMF to correct a positioning measurement value based on the gNB Tx Delay parameter information; and where the positioning measurement value is obtained through measuring, by a user equipment (UE), a downlink positioning reference signal transmitted by the gNB according to downlink positioning reference signal configuration information, and/or, the positioning measurement value is obtained through measuring, by the gNB, an uplink positioning reference signal transmitted by the UE according to uplink positioning reference signal configuration information.

According to the method for correcting Tx delay of an embodiment of the present application, the transmitting the gNB Tx Delay parameter information to the LMF includes:

receiving a TRP INFORMATION REQUEST message transmitted by the LMF and transmitting a TRP INFORMATION RESPONSE message to the LMF;

where the TRP INFORMATION REQUEST message is used for requesting the gNB to provide its TRP information, downlink positioning reference signal configuration information and gNB Tx Delay parameter information, and the TRP INFORMATION RESPONSE message includes the TRP information, the downlink positioning reference signal configuration information and the gNB Tx Delay parameter information; or the TRP INFORMATION REQUEST message is used for requesting the gNB to provide TRP information, downlink positioning reference signal configuration information, uplink positioning reference signal configuration information and gNB Tx Delay parameter information, and the TRP INFORMATION RESPONSE message includes the TRP information, the downlink positioning reference signal configuration information, the uplink positioning reference signal configuration information and the gNB Tx Delay parameter information.

According to the method for correcting Tx delay of an embodiment of the present application, the gNB includes a serving gNB and one or more neighboring gNBs, and the uplink positioning reference signal configuration information and/or the downlink positioning reference signal configuration information is determined by the serving gNB.

According to an embodiment of the present application, a method for correcting Tx delay is provided, performed by user equipment (UE), the method includes:
  obtaining UE transmission channel delay (UE Tx Delay) parameter information;
  receiving gNB Tx Delay parameter information transmitted by a gNB or location management function (LMF);
  correcting a positioning measurement value based on the UE Tx Delay parameter information and/or the gNB Tx Delay parameter information; and
  where the positioning measurement value is obtained through measuring, by a receiving node, a positioning reference signal transmitted by a transmitting node according to a positioning reference signal configuration information.

According to the method for correcting Tx delay of an embodiment of the present application, the receiving the gNB Tx Delay parameter information transmitted by the gNB or the LMF includes:
  receiving gNB Tx Delay parameter information of a serving gNB, and gNB Tx Delay parameter information of a neighboring gNB forwarded by the serving gNB; or
  receiving the gNB Tx Delay parameter information of the serving gNB, and the gNB Tx Delay parameter information of the neighboring gNB forwarded by the LMF; or
  receiving the gNB Tx Delay parameter information of the serving gNB and the gNB Tx Delay parameter information of the neighboring gNB which are forwarded by the LMF.

According to the method for correcting Tx delay of an embodiment of the present application, in case that the transmitting node is a gNB, before the correcting the positioning measurement value based on the UE Tx Delay parameter information and/or the gNB Tx Delay parameter information, the method further includes:
  receiving a RequestCapabilities message transmitted by the LMF, where the RequestCapabilities message is used for requesting the UE to inform the LMF of a location function supported by the UE;
  transmitting a ProvideCapabilities message to the LMF, where the ProvideCapabilities message is used for informing the LMF of the location function supported by the UE;
  transmitting a RequestAssistanceData message to the LMF, where the RequestAssistanceData message is used for requesting the LMF to provide location assistance data;
  receiving a ProvideAssistanceData message transmitted by the LMF, where the ProvideAssistanceData message is used for providing the location assistance data to the UE, and the location assistance data includes downlink positioning reference signal configuration information;
  receiving a RequestLocationInformation message transmitted by the LMF, where the RequestLocationInformation message is used for requesting the UE to measure a downlink positioning reference signal transmitted by the gNB;
  measuring the downlink positioning reference signal transmitted by the gNB by using the downlink positioning reference signal configuration information to obtain a fifth positioning measurement value;
  the correcting the positioning measurement value based on the UE Tx Delay parameter information and/or the gNB Tx Delay parameter information includes:
    correcting the fifth positioning measurement value based on the gNB Tx Delay parameter information.

According to the method for correcting Tx delay of an embodiment of the present application, in case that the transmitting node is the gNB and the UE, before the correcting the positioning measurement value based on the UE Tx Delay parameter information and/or the gNB Tx Delay parameter information, the method further includes:
  receiving a RequestCapabilities message transmitted by the LMF, where the RequestCapabilities message is used for requesting the UE to inform the LMF of a location function supported by the UE;
  transmitting a ProvideCapabilities message to the LMF, where the ProvideCapabilities message is used for informing the LMF of the location function supported by the UE;
  transmitting a RequestAssistanceData message to the LMF, where the RequestAssistanceData message is used for requesting the LMF to provide location assistance data;
  receiving a ProvideAssistanceData message transmitted by the LMF, where the ProvideAssistanceData message is used for providing the location assistance data to the UE, and the location assistance data includes downlink positioning reference signal configuration information;
  receiving a RequestLocationInformation message transmitted by the LMF, where the RequestLocationInformation message is used for requesting the UE to measure a downlink positioning reference signal transmitted by the gNB;
  measuring the downlink positioning reference signal transmitted by the gNB by using the location assistance data to obtain a sixth positioning measurement value;
  receiving an uplink positioning reference signal configuration information transmitted by a serving gNB through radio resource control (RRC) signaling;
  transmitting an uplink positioning reference signal to all gNBs participating in positioning according to the RRC signaling for all the gNBs participating in positioning to measure the uplink positioning reference signal according to the uplink positioning reference signal configuration information transmitted by the LMF to obtain a seventh positioning measurement value and transmitting the seventh positioning measurement value to the UE through the LMF;
  where all the gNBs participating in positioning include the serving gNB and one or more neighboring gNBs;
  the correcting the positioning measurement value based on the UE Tx Delay parameter information and/or the gNB Tx Delay parameter information includes:
    correcting the sixth positioning measurement value based on the gNB Tx Delay parameter information; and
    correcting the seventh positioning measurement value based on the UE Tx Delay parameter information.

According to the method for correcting Tx delay of an embodiment of the present application, the UE Tx Delay parameter information or the gNB Tx Delay parameter information includes an absolute group delay information of the transmission channel, a relative group delay information of the transmission channel and a quality indicator for group delay information of the transmission channel;

where the absolute group delay information of the transmission channel is a parameter related to per carrier frequency band or a carrier frequency with a certain carrier bandwidth, and represents an absolute delay of the carrier frequency band or the carrier frequency;

the relative group delay information of the transmission channel is a set of parameters associated with a sub-carrier frequency in a bandwidth covered by a carrier frequency or a frequency band; and the quality indicator for group delay information of the transmission channel includes an error parameter.

According to an embodiment of the present application, a method for correcting Tx delay is provided, performed by location management function (LMF), the method includes:

obtaining gNB Tx Delay parameter information and positioning reference signal configuration information;

transmitting the positioning reference signal configuration information to a receiving node;

transmitting the gNB Tx Delay parameter information to a user equipment (UE) for the UE to correct a positioning measurement value based on UE Tx Delay parameter information of the UE and/or the gNB Tx Delay parameter information;

where the positioning measurement value is obtained through measuring, by the receiving node, a positioning reference signal transmitted by a transmitting node according to the positioning reference signal configuration information; and in case that the transmitting node is a gNB, the receiving node is the UE; and in case that the transmitting node is the UE and the gNB, the receiving node is the gNB and the UE.

According to the method for correcting Tx delay of an embodiment of the present application, the obtaining gNB Tx Delay parameter information and positioning reference signal configuration information includes:

transmitting a TRP INFORMATION REQUEST message to a gNB, and receiving a TRP INFORMATION RESPONSE message transmitted by the gNB;

where for a serving gNB, the TRP INFORMATION REQUEST message is used for simultaneously requesting the serving gNB to provide downlink positioning reference signal configuration information, uplink positioning reference signal configuration information and TRP information and gNB Tx Delay information of the serving gNB; and for a neighboring gNB, the TRP INFORMATION REQUEST message is used for requesting the neighboring gNB to provide TRP information and gNB Tx Delay information of the neighboring gNB; or for the serving gNB, the TRP INFORMATION REQUEST message is used for simultaneously requesting the serving gNB to provide downlink positioning reference signal configuration information and TRP information and gNB Tx Delay information of the serving gNB; and for the neighboring gNB, the TRP INFORMATION REQUEST message is used for requesting the neighboring gNB to provide TRP information and gNB Tx Delay information of the neighboring gNB.

According to the method for correcting Tx delay of an embodiment of the present application, the method further includes:

transmitting a RequestCapabilities message to the UE, where the RequestCapabilities message is used for requesting the UE to inform the LMF of a location function supported by the UE;

receiving a ProvideCapabilities message transmitted by the UE, where the ProvideCapabilities message is used for informing the LMF of the location function supported by the UE;

receiving a RequestAssistanceData message transmitted by the UE, where the RequestAssistanceData message is used for requesting the LMF to provide location assistance data;

transmitting a ProvideAssistanceData message to the UE, where the ProvideAssistanceData message is used for providing the location assistance data to the UE, and the location assistance data includes downlink positioning reference signal configuration information; and transmitting a RequestLocationInformation message to the UE for the UE to measure a downlink positioning reference signal transmitted by a gNB by using the location assistance data, where the RequestLocationInformation message is used for requesting the UE to measure a downlink positioning reference signal transmitted by a gNB.

According to the method for correcting Tx delay of an embodiment of the present application, after the transmitting the RequestLocationInformation message to the UE, the method further includes:

transmitting a MEASUREMENT REQUEST message to all gNBs participating in positioning, where the MEASUREMENT REQUEST message includes uplink positioning reference signal configuration information and is used for requesting all the gNBs participating in positioning to measure uplink positioning reference signal transmitted by the UE and report measured positioning measurement values; and receiving the positioning measurement values transmitted by all the gNBs participating in positioning, and transmitting the positioning measurement values transmitted by all the gNBs participating in positioning to the UE.

According to an embodiment of the present application, a method for correcting Tx delay is provided, performed by a gNB, the method includes:

obtaining gNB transmission channel delay (gNB Tx Delay) parameter information;

providing positioning reference signal configuration information to user equipment (UE), and transmitting the gNB Tx Delay parameter information to the UE for the UE to correct a positioning measurement value based on the gNB Tx Delay parameter information; and where the positioning measurement value is obtained through measuring, by the user equipment (UE), a downlink positioning reference signal transmitted by the gNB according to downlink positioning reference signal configuration information, and/or, the positioning measurement value is obtained through measuring, by the gNB, an uplink positioning reference signal transmitted by the UE according to uplink positioning reference signal configuration information.

According to the method for correcting Tx delay of an embodiment of the present application, the providing positioning reference signal configuration information to user equipment (UE) includes:

generating downlink positioning reference signal configuration information and forwarding the downlink positioning reference signal configuration information to the UE through location management function (LMF)

for the UE to measure the downlink positioning reference signal transmitted by the gNB according to the downlink positioning reference signal configuration information; or generating uplink positioning reference signal configuration information and downlink positioning reference signal configuration information, and transmitting the uplink positioning reference signal configuration information and the downlink positioning reference signal configuration information to the LMF for the LMF to transmit the downlink positioning reference signal configuration information to the UE and transmitting the uplink positioning reference signal configuration information to all gNBs participating in positioning;

where the gNB configures the uplink positioning reference signal configuration information for the UE through Radio Resource Control (RRC) signaling for the UE to transmit the uplink positioning reference signal to the gNB through RRC signaling according to the uplink positioning reference signal configuration information.

According to the method for correcting Tx delay of an embodiment of the present application, the gNB includes a serving gNB and one or more neighboring gNBs, and the transmitting the gNB Tx Delay parameter information to the UE includes:

directly transmitting, by the serving gNB, gNB Tx Delay parameter information of the serving gNB to the UE, or forwarding the gNB Tx Delay parameter information of the serving gNB to the UE through LMF; and forwarding, by the neighboring gNB, gNB Tx Delay parameter information of the neighboring gNB to the UE through the serving gNB or the LMF.

According to the method for correcting Tx delay of an embodiment of the present application, the providing positioning reference signal configuration information to user equipment (UE) and transmitting the gNB Tx Delay parameter information to the UE includes:

receiving a TRP INFORMATION REQUEST message transmitted by LMF and transmitting a TRP INFORMATION RESPONSE message to the LMF;

where for a serving gNB, the TRP INFORMATION REQUEST message is used for simultaneously requesting the serving gNB to provide downlink positioning reference signal configuration information, uplink positioning reference signal configuration information, TRP information and gNB Tx Delay information of the serving gNB; and for a neighboring gNB, the TRP INFORMATION REQUEST message is used for requesting the neighboring gNB to provide TRP information and gNB Tx Delay information of the neighboring gNB; or for the serving gNB, the TRP INFORMATION REQUEST message is used for simultaneously requesting the serving gNB to provide downlink positioning reference signal configuration information, TRP information and gNB Tx Delay information of the serving gNB; and for the neighboring gNB, the TRP INFORMATION REQUEST message is used for requesting the neighboring gNB to provide TRP information and gNB Tx Delay information of the neighboring gNB.

According to an embodiment of the present application, a location management function (LMF) is provided, including: a memory, a transceiver and a processor;

where the memory is used for storing a computer program; the transceiver is used for receiving and transmitting data under the control of the processor; and the processor is used for reading the computer program in the memory and performing the following operations;

receiving transmission channel delay (Tx Delay) parameter information transmitted by a transmitting node and transmitting positioning reference signal configuration information to a receiving node; and correcting a positioning measurement value based on the Tx Delay parameter information;

where the positioning measurement value is obtained through measuring, by the receiving node, a positioning reference signal transmitted by the transmitting node according to the positioning reference signal configuration information.

According to the LMF of an embodiment of the present application, the transmitting node is a next generation Node B (gNB) and/or user equipment (UE), in case that the transmitting node is the gNB, the Tx Delay parameter information is gNB Tx Delay parameter information, the receiving node is the UE, and the positioning reference signal is a downlink positioning reference signal;

in case that the transmitting node is the UE, the Tx Delay parameter information is UE Tx Delay parameter information, the receiving node is the gNB, and the positioning reference signal is an uplink positioning reference signal; and in case that the transmitting node includes the gNB and the UE, the Tx Delay parameter information includes gNB Tx Delay parameter information and UE Tx Delay parameter information, the receiving node includes a UE and a gNB, and the positioning reference signal includes a downlink positioning reference signal and an uplink positioning reference signal.

According to the LMF of an embodiment of the present application, in case that the transmitting node is the gNB, the receiving the Tx Delay parameter information transmitted by the transmitting node and transmitting the positioning reference signal configuration information to the receiving node includes:

transmitting a TRP INFORMATION REQUEST message to the gNB, where the TRP INFORMATION REQUEST message is used for requesting the gNB to provide its TRP information, downlink positioning reference signal configuration information and gNB Tx Delay parameter information;

receiving the TRP information, the downlink positioning reference signal configuration information and the gNB Tx Delay parameter information; and transmitting a ProvideAssistanceData message to UE, where the ProvideAssistanceData message includes the downlink positioning reference signal configuration information for the UE to measure the downlink positioning reference signal transmitted by the gNB according to the downlink positioning reference signal configuration information to obtain a first positioning measurement value;

the correcting the positioning measurement value based on the Tx Delay parameter information includes:

correcting the first positioning measurement value based on the gNB Tx Delay parameter information.

According to the LMF of an embodiment of the present application, before the transmitting the TRP INFORMATION REQUEST message to the gNB, the processor further performs the following operations:

transmitting a RequestCapabilities message to the UE, where the RequestCapabilities message is used for requesting the UE to inform the LMF of a location function supported by the UE;

receiving a ProvideCapabilities message transmitted by the UE, where the ProvideCapabilities message is used for informing the LMF of the location function supported by the UE; and receiving a RequestAssistanceData message transmitted by the UE, where the RequestAssistanceData message is used for requesting the LMF to provide location assistance data to the UE.

According to the LMF of an embodiment of the present application, in case that the transmitting node is the UE, the receiving the Tx Delay parameter information transmitted by the transmitting node and transmitting the positioning reference signal configuration information to the receiving node includes:

receiving UE Tx Delay parameter information obtained by the UE;

transmitting a TRP INFORMATION REQUEST message to gNB, where the TRP INFORMATION REQUEST message is used for requesting the gNB to provide its TRP information and uplink positioning reference signal configuration information;

receiving the TRP information and the uplink positioning reference signal configuration information; and transmitting a MEASUREMENT REQUEST message to the gNB, where the MEASUREMENT REQUEST message includes the uplink positioning reference signal configuration information for the gNB to measure an uplink positioning reference signal transmitted by the UE according to the uplink positioning reference signal configuration information to obtain a second positioning measurement value;

the correcting the positioning measurement value based on the Tx Delay parameter information includes:

correcting the second positioning measurement value based on the UE Tx Delay parameter information.

According to the LMF of an embodiment of the present application, before the receiving UE Tx Delay parameter information obtained by the UE, the processor further performs the following operations:

transmitting a RequestCapabilities message to the UE, where the RequestCapabilities message is used for requesting the UE to inform the LMF of a location function supported by the UE and whether the UE is configured to provide the UE Tx Delay parameter information;

receiving a ProvideCapabilities message transmitted by the UE, where the ProvideCapabilities message is used for informing the LMF of the location function supported by the UE and whether the UE is configured to provide the UE Tx Delay parameter information; and transmitting a RequestUETxDelay message to the UE, where the RequestUETxDelay message is used for requesting the UE to provide the UE Tx Delay parameter information.

According to the LMF of an embodiment of the present application, in case that the transmitting node is both gNB and UE, the receiving the Tx Delay parameter information transmitted by the transmitting node and transmitting the positioning reference signal configuration information to the receiving node includes:

receiving UE Tx Delay parameter information obtained by the UE;

transmitting a TRP INFORMATION REQUEST message to the gNB, where the TRP INFORMATION REQUEST message is used for requesting the gNB to provide TRP information, downlink positioning reference signal configuration information, uplink positioning reference signal configuration information and gNB Tx Delay parameter information;

receiving the TRP information, the downlink positioning reference signal configuration information, the uplink positioning reference signal configuration information and the gNB Tx Delay parameter information;

transmitting a Provide AssistanceData message to the UE, where the Provide AssistanceData message includes the downlink positioning reference signal configuration information for the UE to measure the downlink positioning reference signal transmitted by the gNB according to the downlink positioning reference signal configuration information to obtain a third positioning measurement value;

transmitting a MEASUREMENT REQUEST message to the gNB, where the MEASUREMENT REQUEST message includes the uplink positioning reference signal configuration information for the gNB to measure an uplink positioning reference signal transmitted by the UE according to the uplink positioning reference signal configuration information to obtain a fourth positioning measurement value;

the correcting the positioning measurement value based on the Tx Delay parameter information includes:

correcting the third positioning measurement value based on the gNB Tx Delay parameter information; and correcting the fourth positioning measurement value based on the UE Tx Delay parameter information.

According to the LMF of an embodiment of the present application, the processor further performs the following operations:

transmitting a RequestCapabilities message to the UE, where the RequestCapabilities message is used for requesting the UE to inform the LMF of a location function supported by the UE and whether the UE is configured to provide the UE Tx Delay parameter information;

receiving a ProvideCapabilities message transmitted by the UE, where the ProvideCapabilities message is used for informing the LMF of the location function supported by the UE and whether the UE is configured to provide the UE Tx Delay parameter information;

transmitting a RequestUETxDelay message to the UE, where the RequestUETxDelay message is used for requesting the UE to provide the UE Tx Delay parameter information; and receiving a RequestAssistanceData message transmitted by the UE, where the RequestAssistanceData message is used for requesting the LMF to provide location assistance data to the UE.

According to the LMF of an embodiment of the present application, the gNB includes a serving gNB and one or more neighboring gNBs, and the positioning reference signal configuration information is determined by the serving gNB.

According to the LMF of an embodiment of the present application, the Tx Delay parameter information includes absolute group delay information of the transmission channel, relative group delay information of the transmission channel and a quality indicator for group delay information of the transmission channel;

where the absolute group delay information of the transmission channel is a parameter related to per carrier frequency band or a carrier frequency with a certain carrier bandwidth, and represents an absolute delay of the carrier frequency band or the carrier frequency;

the relative group delay information of the transmission channel is a set of parameters associated with a sub-carrier frequency in a bandwidth covered by a carrier frequency or a frequency band; and the quality indicator for group delay information of the transmission channel includes an error parameter.

According to an embodiment of the present application, a user equipment (UE) is provided, including: a memory, a transceiver and a processor;

where the memory is used for storing a computer program; the transceiver is used for receiving and transmitting data under the control of the processor; and the processor is used for reading the computer program in the memory and performing the following operations:

obtaining UE transmission channel delay (UE Tx Delay) parameter information;

transmitting the UE Tx Delay parameter information to a location management function (LMF) for the LMF to correct a positioning measurement value based on the UE Tx Delay parameter information; and where the positioning measurement value is obtained through measuring, by a gNB, an uplink positioning reference signal transmitted by the UE according to uplink positioning reference signal configuration information, and/or, by measuring, by the UE, downlink positioning reference signal transmitted by a gNB according to downlink positioning reference signal configuration information.

According to the UE of an embodiment of the present application, the transmitting the UE Tx Delay parameter information to the location management function (LMF) includes:

receiving a RequestCapabilities message transmitted by the LMF, where the RequestCapabilities message is used for requesting the UE to inform the LMF of a location function supported by the UE and whether the UE is configured to provide the UE Tx Delay parameter information;

transmitting a ProvideCapabilities message to the LMF, where the ProvideCapabilities message is used for informing the LMF of the location function supported by the UE and whether the UE is configured to provide the UE Tx Delay parameter information;

receiving a RequestUETxDelay message transmitted by the LMF, where the RequestUETxDelay message is used for requesting the UE to provide the UE Tx Delay parameter information; and transmitting a Provide UETxDelay message to the LMF, where the Provide UETxDelay message includes the UE Tx Delay parameter information.

According to the UE of an embodiment of the present application, after the transmitting the Provide UETxDelay message to the LMF, the processor further performs the following operations:

receiving an uplink positioning reference signal configuration information transmitted by a gNB through radio resource control (RRC) signaling, and transmitting an uplink positioning reference signal to the gNB for the gNB to measure the uplink positioning reference signal and transmitting a measured positioning measurement value to the LMF for the LMF to correct the positioning measurement value based on the UE Tx Delay parameter information.

According to the UE of an embodiment of the present application, after the transmitting the Provide UETxDelay message to the LMF, the processor further performs the following operations:

transmitting the UE Tx Delay parameter information to the LMF;

transmitting a RequestAssistanceData message to the LMF, where the RequestAssistanceData message is used for requesting the LMF to provide location assistance data;

receiving a ProvideAssistanceData message transmitted by the LMF, where the ProvideAssistanceData message includes downlink positioning reference signal configuration information;

measuring a downlink positioning reference signal transmitted by a gNB according to the downlink positioning reference signal configuration information to obtain a third positioning measurement value, and transmitting the third positioning measurement value to the LMF for the LMF to correct the third positioning measurement value based on the gNB Tx Delay parameter information; and receiving an uplink positioning reference signal configuration information transmitted by the gNB through the RRC signaling, and transmitting an uplink positioning reference signal to the gNB for the gNB to measure the uplink positioning reference signal to obtain a fourth positioning measurement value and transmitting the fourth positioning measurement value to the LMF for the LMF to correct the fourth positioning measurement value based on the UE Tx Delay parameter information.

According to an embodiment of the present application, a gNB is provided, including: a memory, a transceiver and a processor;

where the memory is used for storing a computer program; the transceiver is used for receiving and transmitting data under the control of the processor; and the processor is used for reading the computer program in the memory and performing the following operations;

obtaining gNB transmission channel delay (gNB Tx Delay) parameter information;

transmitting the gNB Tx Delay parameter information to a location management function (LMF) for the LMF to correct a positioning measurement value based on the gNB Tx Delay parameter information; and where the positioning measurement value is obtained through measuring, by a user equipment (UE), a downlink positioning reference signal transmitted by the gNB according to downlink positioning reference signal configuration information, and/or, the positioning measurement value is obtained through measuring, by the gNB, an uplink positioning reference signal transmitted by the UE according to uplink positioning reference signal configuration information.

According to the gNB of an embodiment of the present application, the transmitting the gNB Tx Delay parameter information to the LMF includes:

receiving a TRP INFORMATION REQUEST message transmitted by the LMF and transmitting a TRP INFORMATION RESPONSE message to the LMF;

where the TRP INFORMATION REQUEST message is used for requesting the gNB to provide its TRP information, downlink positioning reference signal configuration information and gNB Tx Delay parameter information, and the TRP INFORMATION RESPONSE message includes the TRP information, the downlink positioning reference signal configuration information and the gNB Tx Delay parameter information; or the TRP INFORMATION REQUEST message is used for requesting the gNB to provide TRP information, downlink positioning reference signal configuration information, uplink positioning reference signal configuration information and gNB Tx Delay parameter information, and the TRP INFORMATION RESPONSE message includes the TRP information, the downlink positioning reference signal configuration information, the uplink positioning reference signal configuration information and the gNB Tx Delay parameter information.

According to the gNB of an embodiment of the present application, the gNB includes a serving gNB and one or more neighboring gNBs, and the uplink positioning reference signal configuration information and/or the downlink positioning reference signal configuration information is determined by the serving gNB.

According to an embodiment of the present application, a user equipment (UE) is provided, including: a memory, a transceiver and a processor:

where the memory is used for storing a computer program; the transceiver is used for receiving and transmitting data under the control of the processor; and the processor is used for reading the computer program in the memory and performing the following operations;

obtaining UE transmission channel delay (UE Tx Delay) parameter information;

receiving gNB Tx Delay parameter information transmitted by a gNB or location management function (LMF);

correcting a positioning measurement value based on the UE Tx Delay parameter information and/or the gNB Tx Delay parameter information; and where the positioning measurement value is obtained through measuring, by a receiving node, a positioning reference signal transmitted by a transmitting node according to a positioning reference signal configuration information.

According to the UE of an embodiment of the present application, the receiving the gNB Tx Delay parameter information transmitted by a gNB or location management function (LMF) includes:

receiving gNB Tx Delay parameter information of a serving gNB, and gNB Tx Delay parameter information of a neighboring gNB forwarded by the serving gNB; or receiving the gNB Tx Delay parameter information of the serving gNB, and the gNB Tx Delay parameter information of the neighboring gNB forwarded by the LMF; or receiving the gNB Tx Delay parameter information of the serving gNB and the gNB Tx Delay parameter information of the neighboring gNB which are forwarded by the LMF.

According to the UE of an embodiment of the present application, in case that the transmitting node is a gNB, before the correcting the positioning measurement value based on the UE Tx Delay parameter information and/or the gNB Tx Delay parameter information, the processor further performs the following operations:

receiving a RequestCapabilities message transmitted by the LMF, where the RequestCapabilities message is used for requesting the UE to inform the LMF of a location function supported by the UE;

transmitting a ProvideCapabilities message to the LMF, where the ProvideCapabilities message is used for informing the LMF of the location function supported by the UE;

transmitting a RequestAssistanceData message to the LMF, where the RequestAssistanceData message is used for requesting the LMF to provide location assistance data;

receiving a ProvideAssistanceData message transmitted by the LMF, where the ProvideAssistanceData message is used for providing the location assistance data to the UE, and the location assistance data includes downlink positioning reference signal configuration information;

receiving a RequestLocationInformation message transmitted by the LMF, where the RequestLocationInformation message is used for requesting the UE to measure a downlink positioning reference signal transmitted by the gNB;

measuring the downlink positioning reference signal transmitted by the gNB by using the downlink positioning reference signal configuration information to obtain a fifth positioning measurement value;

the correcting the positioning measurement value based on the UE Tx Delay parameter information and/or the gNB Tx Delay parameter information includes:

correcting the fifth positioning measurement value based on the gNB Tx Delay parameter information.

According to the UE of an embodiment of the present application, in case that the transmitting node is the gNB and the UE, before the correcting the positioning measurement value based on the UE Tx Delay parameter information and/or the gNB Tx Delay parameter information, the processor further performs the following operations:

receiving a RequestCapabilities message transmitted by the LMF, where the RequestCapabilities message is used for requesting the UE to inform the LMF of a location function supported by the UE;

transmitting a ProvideCapabilities message to the LMF, where the ProvideCapabilities message is used for informing the LMF of the location function supported by the UE;

transmitting a RequestAssistanceData message to the LMF, where the RequestAssistanceData message is used for requesting the LMF to provide location assistance data;

receiving a Provide AssistanceData message transmitted by the LMF, where the ProvideAssistanceData message is used for providing the location assistance data to the UE, and the location assistance data includes downlink positioning reference signal configuration information;

receiving a RequestLocationInformation message transmitted by the LMF, where the RequestLocationInformation message is used for requesting the UE to measure a downlink positioning reference signal transmitted by the gNB;

measuring the downlink positioning reference signal transmitted by the gNB by using the location assistance data to obtain a sixth positioning measurement value;

receiving an uplink positioning reference signal configuration information transmitted by a serving gNB through radio resource control (RRC) signaling;

transmitting an uplink positioning reference signal to all gNBs participating in positioning according to the RRC signaling for all the gNBs participating in positioning to measure the uplink positioning reference signal according to the uplink positioning reference signal configuration information transmitted by the LMF to obtain a seventh positioning measurement value and transmitting the seventh positioning measurement value to the UE through the LMF;

where all the gNBs participating in positioning include the serving gNB and one or more neighboring gNBs;

the correcting the positioning measurement value based on the UE Tx Delay parameter information and/or the gNB Tx Delay parameter information includes:

correcting the sixth positioning measurement value based on the gNB Tx Delay parameter information; and correcting the seventh positioning measurement value based on the UE Tx Delay parameter information.

According to the UE of an embodiment of the present application, the UE Tx Delay parameter information or the gNB Tx Delay parameter information includes an absolute group delay information of the transmission channel, a relative group delay information of the transmission channel and a quality indicator for group delay information of the transmission channel;

where the absolute group delay information of the transmission channel is a parameter related to per carrier frequency band or a carrier frequency with a certain carrier bandwidth, and represents an absolute delay of the carrier frequency band or the carrier frequency;

the relative group delay information of the transmission channel is a set of parameters associated with a subcarrier frequency in a bandwidth covered by a carrier frequency or a frequency band; and the quality indicator for group delay information of the transmission channel includes an error parameter.

According to an embodiment of the present application, a location management function (LMF) is provided, including: a memory, a transceiver and a processor;

where the memory is used for storing a computer program; the transceiver is used for receiving and transmitting data under the control of the processor; and the processor is used for reading the computer program in the memory and performing the following operations;

obtaining gNB Tx Delay parameter information and positioning reference signal configuration information;

transmitting the positioning reference signal configuration information to a receiving node;

transmitting the gNB Tx Delay parameter information to a user equipment (UE) for the UE to correct a positioning measurement value based on UE Tx Delay parameter information of the UE and/or the gNB Tx Delay parameter information;

where the positioning measurement value is obtained through measuring, by the receiving node, a positioning reference signal transmitted by a transmitting node according to the positioning reference signal configuration information; and in case that the transmitting node is a gNB, the receiving node is the UE; and in case that the transmitting node is the UE and the gNB, the receiving node is the gNB and the UE.

According to the LMF of an embodiment of the present application, where the obtaining gNB Tx Delay parameter information and positioning reference signal configuration information includes:

transmitting a TRP INFORMATION REQUEST message to a gNB, and receiving a TRP INFORMATION RESPONSE message transmitted by the gNB;

where for a serving gNB, the TRP INFORMATION REQUEST message is used for simultaneously requesting the serving gNB to provide downlink positioning reference signal configuration information, uplink positioning reference signal configuration information and TRP information and gNB Tx Delay information of the serving gNB; and for a neighboring gNB, the TRP INFORMATION REQUEST message is used for requesting the neighboring gNB to provide TRP information and gNB Tx Delay information of the neighboring gNB; or for the serving gNB, the TRP INFORMATION REQUEST message is used for simultaneously requesting the serving gNB to provide downlink positioning reference signal configuration information and TRP information and gNB Tx Delay information of the serving gNB; and for the neighboring gNB, the TRP INFORMATION REQUEST message is used for requesting the neighboring gNB to provide TRP information and gNB Tx Delay information of the neighboring gNB.

According to the LMF of an embodiment of the present application, the processor further performs the following operations:

transmitting a RequestCapabilities message to the UE, where the RequestCapabilities message is used for requesting the UE to inform the LMF of a location function supported by the UE;

receiving a ProvideCapabilities message transmitted by the UE, where the ProvideCapabilities message is used for informing the LMF of the location function supported by the UE;

receiving a RequestAssistanceData message transmitted by the UE, where the RequestAssistanceData message is used for requesting the LMF to provide location assistance data;

transmitting a ProvideAssistanceData message to the UE, where the ProvideAssistanceData message is used for providing the location assistance data to the UE, and the location assistance data includes downlink positioning reference signal configuration information; and transmitting a RequestLocationInformation message to the UE for the UE to measure the downlink positioning reference signal transmitted by a gNB by using the location assistance data, where the RequestLocationInformation message is used for requesting the UE to measure a downlink positioning reference signal transmitted by a gNB.

According to the LMF of an embodiment of the present application, after the transmitting the RequestLocationInformation message to the UE, the processor further performs the following operations:

transmitting a MEASUREMENT REQUEST message to all gNBs participating in positioning, where the MEASUREMENT REQUEST message includes uplink positioning reference signal configuration information and is used for requesting all the gNBs participating in positioning to measure uplink positioning reference signal transmitted by the UE and report measured positioning measurement values; and receiving the positioning measurement values transmitted by all the gNBs participating in positioning, and transmitting the positioning measurement values transmitted by all the gNBs participating in positioning to the UE.

According to an embodiment of the present application, a gNB is provided, including: a memory, a transceiver and a processor:

where the memory is used for storing a computer program; the transceiver is used for receiving and transmitting data under the control of the processor; and the processor is used for reading the computer program in the memory and performing the following operations:

obtaining gNB transmission channel delay (gNB Tx Delay) parameter information;

providing positioning reference signal configuration information to user equipment (UE), and transmitting the gNB Tx Delay parameter information to the UE for the UE to correct a positioning measurement value based on the gNB Tx Delay parameter information; and where the positioning measurement value is obtained through measuring, by the user equipment (UE), a downlink positioning reference signal transmitted by the gNB according to downlink positioning reference signal configuration information, and/or, the positioning measurement value is obtained through measuring, by the gNB, an uplink positioning reference signal transmitted by the UE according to uplink positioning reference signal configuration information.

According to the gNB of an embodiment of the present application, the providing positioning reference signal configuration information to user equipment (UE) includes:

generating downlink positioning reference signal configuration information and forwarding the downlink positioning reference signal configuration information to the UE through location management function (LMF) for the UE to measure the downlink positioning reference signal transmitted by the gNB according to the downlink positioning reference signal configuration information; or generating uplink positioning reference signal configuration information and downlink positioning reference signal configuration information, and transmitting the uplink positioning reference signal configuration information and the downlink positioning reference signal configuration information to the LMF for the LMF to transmit the downlink positioning reference signal configuration information to the UE and transmitting the uplink positioning reference signal configuration information to all gNBs participating in positioning;

where the gNB configures the uplink positioning reference signal configuration information for the UE through Radio Resource Control (RRC) signaling for the UE to transmit the uplink positioning reference signal to the gNB through RRC signaling according to the uplink positioning reference signal configuration information.

According to the gNB of an embodiment of the present application, the gNB includes a serving gNB and one or more neighboring gNBs, and the transmitting the gNB Tx Delay parameter information to the UE includes:

directly transmitting, by the serving gNB, gNB Tx Delay parameter information of the serving gNB to the UE, or forwarding the gNB Tx Delay parameter information of the serving gNB to the UE through LMF; and forwarding, by the neighboring gNB, gNB Tx Delay parameter information of the neighboring gNB to the UE through the serving gNB or the LMF.

According to the gNB of an embodiment of the present application, the providing positioning reference signal configuration information to user equipment (UE) and transmitting the gNB Tx Delay parameter information to the UE includes:

receiving a TRP INFORMATION REQUEST message transmitted by LMF and transmitting a TRP INFORMATION RESPONSE message to the LMF;

where for a serving gNB, the TRP INFORMATION REQUEST message is used for simultaneously requesting the serving gNB to provide downlink positioning reference signal configuration information, uplink positioning reference signal configuration information, TRP information and gNB Tx Delay information of the serving gNB; and for a neighboring gNB, the TRP INFORMATION REQUEST message is used for requesting the neighboring gNB to provide TRP information and gNB Tx Delay information of the neighboring gNB; or for the serving gNB, the TRP INFORMATION REQUEST message is used for simultaneously requesting the serving gNB to provide downlink positioning reference signal configuration information, TRP information and gNB Tx Delay information of the serving gNB; and for the neighboring gNB, the TRP INFORMATION REQUEST message is used for requesting the neighboring gNB to provide TRP information and gNB Tx Delay information of the neighboring gNB.

According to an embodiment of the present application, a location management function (LMF) is provided, including:

a first transmission device, used for receiving transmission channel delay (Tx Delay) parameter information transmitted by a transmitting node and transmitting positioning reference signal configuration information to a receiving node;

a first correcting device, used for correcting a positioning measurement value based on the Tx Delay parameter information; and where the positioning measurement value is obtained through measuring, by the receiving node, a positioning reference signal transmitted by the transmitting node according to the positioning reference signal configuration information.

According to an embodiment of the present application, a user equipment (UE) is provided, including:

a first obtaining device, used for obtaining UE transmission channel delay (UE Tx Delay) parameter information;

a first transmitting device, used for transmitting the UE Tx Delay parameter information to a location management function (LMF) for the LMF to correct a positioning measurement value based on the UE Tx Delay parameter information; and where the positioning measurement value is obtained through measuring, by a gNB, an uplink positioning reference signal transmitted by the UE according to uplink positioning reference signal configuration information, and/or, the positioning measurement value is obtained through measuring, by the UE, a downlink positioning reference signal transmitted by the gNB according to downlink positioning reference signal configuration information.

According to an embodiment of the present application, a gNB is provided, including:

a second obtaining device, used for obtaining gNB transmission channel delay (gNB Tx Delay) parameter information;

a second transmitting device, used for transmitting the gNB Tx Delay parameter information to a location management function (LMF) for the LMF to correct a positioning measurement value based on the gNB Tx Delay parameter information; and where the positioning measurement value is obtained through measuring, by a user equipment (UE), a downlink positioning reference signal transmitted by the gNB according to downlink positioning reference signal configuration information, and/or, the positioning measurement value is obtained through measuring, by the gNB, an uplink positioning reference signal transmitted by the UE according to uplink positioning reference signal configuration information.

According to an embodiment of the present application, a user equipment (UE) is provided, including:
- a third obtaining device, used for obtaining UE transmission channel delay (UE Tx Delay) parameter information;
- a receiving devicedevice, used for receiving gNB Tx Delay parameter information transmitted by a gNB or location management function (LMF);
- a second correcting device, used for correcting a positioning measurement value based on the UE Tx Delay parameter information and/or the gNB Tx Delay parameter information; and
- where the positioning measurement value is obtained through measuring, by a receiving node, a positioning reference signal transmitted by a transmitting node according to a positioning reference signal configuration information.

According to an embodiment of the present application, a location management function (LMF) is provided, including:
- a fourth obtaining device, used for obtaining gNB Tx Delay parameter information and positioning reference signal configuration information;
- a third transmitting device, used for transmitting the positioning reference signal configuration information to a receiving node;
- a fourth transmitting device, used for transmitting the gNB Tx Delay parameter information to user equipment (UE) for the UE to correct a positioning measurement value based on UE Tx Delay parameter information of the UE and/or the gNB Tx Delay parameter information;
- where the positioning measurement value is obtained through measuring, by the receiving node, a positioning reference signal transmitted by a transmitting node according to the positioning reference signal configuration information; and
- in case that the transmitting node is a gNB, the receiving node is the UE; and in case that the transmitting node is the UE and the gNB, the receiving node is the gNB and the UE.

According to an embodiment of the present application, a gNB is provided, including:
- a fifth obtaining device, used for obtaining a corresponding transmission channel delay (gNB Tx Delay) parameter information of the gNB;
- a second transmission device, used for providing positioning reference signal configuration information to user equipment (UE), and transmitting the gNB Tx Delay parameter information to the UE for the UE to correct a positioning measurement value based on the gNB Tx Delay parameter information; and
- where the positioning measurement value is obtained through measuring, by the user equipment (UE), a downlink positioning reference signal transmitted by the gNB according to downlink positioning reference signal configuration information, and/or, the positioning measurement value is obtained through measuring, by the gNB, an uplink positioning reference signal transmitted by the UE according to uplink positioning reference signal configuration information.

According to an embodiment of the present application, a non-transitory computer readable storage medium is provided, storing computer programs that cause a processor to perform any one of the above methods for correcting Tx delay.

In the methods and apparatuses for correcting Tx delay, and the storage medium provided by the present application, the effect of transmission channel delay on the time related positioning measurement value can be eliminated and the accuracy for positioning can be effectively improved by using the Tx Delay parameter information.

BRIEF DESCRIPTION OF DRAWINGS

In order to clearly illustrate the solutions according to the embodiments of the present application or the related art, the accompanying drawings used in the description of the embodiments or the related art are briefly introduced below. It should be noted that the drawings in the following description are only some embodiments of the present application.

DETAILED DESCRIPTION OF THE EMBODIMENTS

Figure 1:
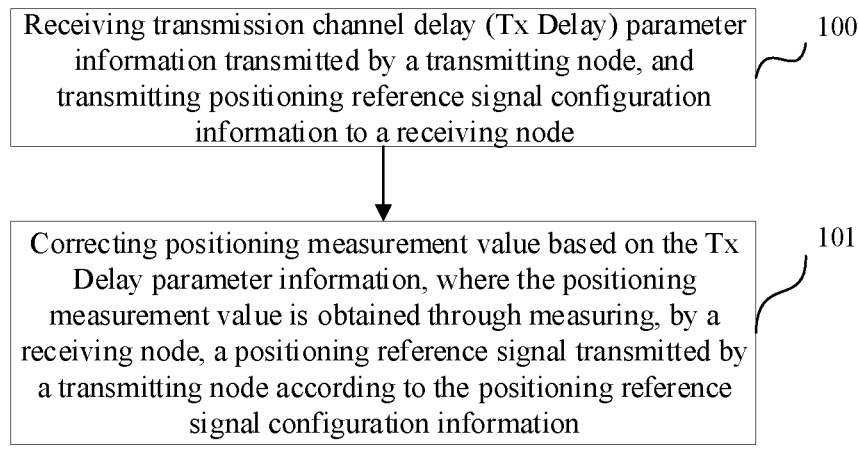
FIG. 1 is first schematic flowchart diagram of a method for correcting Tx delay according to an embodiment of the present application.

The term "and/or" in the embodiments of the present application describes three situations of the related objects. For example, A and/or B can represent three situations: only A, A and B together, and only B. The character "/" generally represents that the two objects on two sides have a relationship of "or".

The terms "multiple" and "a plurality of" in the embodiments of the present application refer to two or more, and other quantifiers are similar to them.

The solutions according to the present application are clearly and completely described below in combination with the accompanying drawings in the embodiments of the present application. It should be noted that the described embodiments are some embodiments of the present application, rather than all the embodiments.

The abbreviations used in the embodiments of the present application are illustrated as follows:

4G; the 4rd Generation;
5G; the 5rd Generation;
NR: New Radio;
E-SMLC: Evolve-Serving Mobile Location Center (4G);
gNB: Next generation Node B (5G);
LMF: Location Management Function (5G);
LPP: LTE Positioning Protocol;
PRS: Positioning Reference Signal;
RAT: Radio Access Technology;
RSTD: Reference Signal Time Difference;
RTT: Round Trip Time;
SRS-Pos: Sounding Reference Signal for Positioning;
TOA: Time of Arrival;
TDOA: Time Difference of Arrival;
TRP: Transmission-Reception Point;
UE: User Equipment;
UL RTOA: Uplink Relative time of Arrival (5G);
UL-TDOA: Uplink time Difference of Arrival (5G);
UTDOA: Uplink Time Difference of Arrival (4G);
DL-TDOA: Downlink Time Difference of Arrival (5G);
OTDOA: Observed Time Difference of Arrival (4G); and
Multi-RTT: Multiple cell-Round Trip Time.

The downlink time difference of arrival positioning method is called as OTDOA in 4G, and called as DL-TDOA in 5G; the uplink time difference of arrival positioning method is called as UTDOA in 4G and called as UL-TDOA in 5G; and the location server is called E-SMLC in 4G, but called LMF in 5G.

For the convenience of description, the related concepts in the present application are uniformly expressed by terms in 5G, but this does not mean that the methods and apparatuses according to the embodiments of the present application are limited to 5G only.

In embodiments of the present application, gNB can represent Node B, cell, gNB or TRP, etc. For example, gNB Tx Delay can represent TRP Tx Delay and Node B Tx Delay.

According to relevant protocol specifications of 3GPP, a node responsible for positioning calculation can be either a UE or a location management function (LMF). The former is often called as UE-based positioning and the latter is often called as UE-assisted positioning, or the latter is called LMF-based positioning in 5G.

The information interacted among the gNB, the UE and the LMF does not include the information related to the radio transmission channel signal delay between the UE and the gNB. Therefore, in the LMF-based positioning method, LMF can not make necessary correction or compensation for the transmission channel signal delay of the UE and the gNB in the measurement values during positioning calculation; and in the UE-based positioning method, UE can not make necessary correction or compensation for the transmission channel signal delay of the gNB in the measurement values during positioning calculation. For example, a positioning measurement error of 1.2 m is introduced in Tx Delay of 4 nanosecond (ns), and the final accuracy for UE positioning can not reach a sub meter level.

Embodiments of the present application provide a method and an apparatus for correcting transmission channel delay, and a storage medium, which can overcome the effect of transmission channel delay of UE and gNB on time related positioning measurement values, correct the transmission channel delay of UE and gNB, and improve positioning accuracy. The method and apparatus for correcting transmission channel delay, and the storage medium according to the embodiments of the present application is applicable to various positioning methods (such as DL-TDOA, UL-TDOA, Multi-RTT, etc.) that use time related measurement values (such as DL RSTD, UL RTOA, UE Rx-Tx time difference and gNB Rx-Tx time difference) for positioning.

It should be noted that the method and the apparatus according to the embodiments of the present application are based on the same conception. Since the principles of the method and the apparatus to solve the problems are similar, the implementation of the apparatus and method can be similar to each other, and the same part will not be repeated.

FIG. 1 is first schematic flowchart diagram of a method for correcting Tx delay according to an embodiment of the present application. The method is performed by a location management function (LMF), including:

step 100, receiving Tx Delay parameter information transmitted by a transmitting node, and transmitting positioning reference signal configuration information to a receiving node.

For example, the embodiment of the present application is applied to the LMF-based positioning method and is performed by a location management function (LMF). The LMF is used as a calculation node for positioning calculation.

In an embodiment, the location management function (LMF) can perform positioning calculation by the following three positioning methods: downlink time difference of arrival (DL-TDOA) positioning method, uplink time difference of arrival (UL-TDOA) positioning method, and multiple cell-round trip time (Multi-RTT) positioning method.

The LMF receives the Tx Delay parameter information transmitted by the transmitting node, and transmits the positioning reference signal configuration information to the receiving node.

In an embodiment, the transmitting node is a node transmitting the positioning reference signal, which can be a gNB and/or a user equipment (UE); and the receiving node is a node receiving the positioning reference signal, which can be a user equipment (UE) and/or a gNB.

In order to correct the transmission channel delay, the present application proposes to establish a parameter information (Tx Delay parameter information) related to the transmission channel delay of the positioning reference signal transmitting terminal (UE and gNB) in 3GPP LPP and NRPPa protocols.

The Tx Delay parameter information is from the transmitting node and is obtained by the transmitting node. For example, the UE transmits a reference signal and then receives the reference signal by itself, so as to calculate the Tx Delay parameter information of the UE.

The positioning reference signal configuration information is a configuration information of the positioning reference signal. The positioning reference signal is a reference signal used for positioning or assistance positioning. In an embodiment, the positioning reference signal includes an uplink sounding reference signal for positioning (UL SRS Pos) and/or a downlink position reference signal (DL PRS).

It should be noted that the positioning reference signal configuration information is from the gNB, which is determined by the gNB and is transmitted to the LMF by the gNB.

In an embodiment, the transmitting node is a gNB and/or a UE;
  in case that the transmitting node is the gNB, that is, the LMF adopts a downlink time difference of arrival (DL-TDOA) positioning method, the Tx Delay parameter information is gNB Tx Delay parameter information, the receiving node is the UE, the positioning reference signal is a downlink positioning reference signal, and the positioning reference signal configuration information is a downlink positioning reference signal configuration information;
  in case that the transmitting node is a UE, that is, the LMF adopts an uplink time difference of arrival (such as UL-TDOA) positioning method, the Tx Delay parameter information is UE Tx Delay parameter information, the receiving node is the gNB, and the positioning reference signal is an uplink positioning reference signal;
  in case that the transmitting node includes a gNB and a UE respectively, that is, the LMF adopts a multiple cell-round trip time (such as Multi-RTT) positioning method, the Tx Delay parameter information includes gNB Tx Delay parameter information and UE Tx Delay parameter information, the receiving node includes the UE and the gNB respectively, and the positioning reference signal is a downlink positioning reference signal and an uplink positioning reference signal respectively.

Step 101, correcting a positioning measurement value based on the Tx Delay parameter information.

In an embodiment, the positioning measurement value is obtained through measuring, by the receiving node, the positioning reference signal transmitted by the transmitting node according to the positioning reference signal configuration information.

For example, the LMF receives the positioning measurement value reported by the receiving node, where the positioning measurement value is obtained by the receiving node measuring the positioning reference signal transmitted by the transmitting node according to the positioning reference signal configuration information transmitted by the LMF.

In an embodiment, the positioning measurement value includes, but not limited to, one or more of the following items: downlink reference signal time difference (DL RSTD), uplink relative time of arrival (UL RTOA), gNB Rx-Tx time difference and UE Rx-Tx time difference.

Then, the LMF corrects the positioning measurement value based on the Tx Delay parameter information.

In an embodiment, the correcting the positioning measurement value based on the Tx Delay parameter information includes
  correcting the positioning measurement value based on the Tx Delay parameter information by using the following formula;
  a corrected positioning measurement value=uncorrected positioning measurement value−Tx Delay parameter information.

In an embodiment, the following corrections can be performed for different types of positioning methods:
  1) for downlink time difference of arrival (DL-TDOA) positioning method:

$DL\ RSTD=DL\ RSTD-gNB\ Tx\ Delay$:

2) for uplink time difference of arrival (UL-TDOA) positioning method:

$UL\ RTOA=UL\ RTOA-UE\ Tx\ Delay$;

3) for multiple cell-round trip time (Multi-RTT) positioning method:

$gNB\ Rx\text{-}Tx\ time\ difference=gNB\ Rx\text{-}Tx\ time\ difference-UE\ Tx\ Delay$;

$UE\ Rx\text{-}Tx\ time\ difference=UE\ Rx\text{-}Tx\ time\ difference-gNB\ Tx\ Delay$.

In an embodiment, the LMF can perform positioning calculation based on the corrected positioning measurement value and an antenna location information of the gNB reported by the gNB, to achieve accurate positioning.

The method for correcting Tx delay according to the embodiment of the present application is applicable to various LMF-based positioning methods, can eliminate the effect of the transmission channel delay on the time related positioning measurement value, and can effectively improve the accuracy for positioning.

Based on the above embodiments, the transmission channel delay (Tx Delay) parameter information includes an absolute group delay information of the transmission channel, a relative group delay information of the transmission channel and a quality indicator for group delay information of the transmission channel;
  the absolute group delay information of the transmission channel is a parameter related to per carrier frequency band or a carrier frequency with a certain carrier bandwidth, and represents an absolute delay of the carrier frequency band or the carrier frequency;
  the relative group delay information of the transmission channel is a set of parameters associated with a sub-carrier frequency in a bandwidth covered by a carrier frequency or a frequency band; and
  the quality indicator for group delay information of the transmission channel includes an error parameter.

In an embodiment, in order to correct the transmission channel delay, the present application proposes to establish a parameter information (Tx Delay parameter information) related to the transmission channel delay of the positioning reference signal transmitting side (UE and gNB) in 3GPP LPP and NRPPa protocols.

In an embodiment, the Tx Delay parameter information includes the following three parts.
  1) The absolute group delay information of the transmission channel, with a device of ns, being defined as a parameter related to per carrier frequency band or a carrier frequency with a certain carrier bandwidth and represents an absolute delay of the carrier frequency band or the carrier frequency.

When a radio signal passes through a transmission medium, a delay occurs in general. The size of the delay is related to the transmission medium. In an ideal case, the delay per frequency is equal in a signal bandwidth range. In practice, for some electrical elements, such as cables, the signal transmission delay generated by the radio signal passing through a certain frequency band or a certain bandwidth range is nearly equal, and this delay is called absolute group delay. In general, the absolute group delay is a main part of transmission channel group delay and reception channel group delay of UE and gNB, and the absolute delay needs to be corrected or compensated first during positioning.

In the embodiment of the present application, the absolute group delay is defined as a parameter related to per carrier frequency band or a carrier frequency with a certain carrier bandwidth and represents an absolute delay of the carrier frequency band or the carrier frequency.

2) The relative group delay information of the transmission channel, with a device of ns, being defined as a set of parameters associated with a sub-carrier frequency in a bandwidth covered by the carrier frequency or the frequency band.

The radio transmission and reception channels between UE and gNB are limited by band-pass characteristics of filters, amplifiers and mixers. The delay of some electrical elements (such as band-pass filters) in a radio frequency (RF) circuit varies greatly with the frequency in the range of carrier bandwidth. In 5G NR system, one carrier frequency band or carrier frequency covers a large bandwidth. The signal components of each sub-carrier in this bandwidth are subjected to different group delays, which are called relative group delay. The larger the bandwidth, the greater the relative group delay between the sub-carriers in this bandwidth, where the relative difference of the delay can reach several nanoseconds (ns) or more. As 5G supports large bandwidth and requires high-precision positioning, the effect of relative group delay on positioning measurement in 5G positioning cannot be ignored.

In the embodiment of the present application, the relative group delay of transmission channels of UE and gNB is defined as a set of parameters associated with a sub-carrier frequency in a bandwidth covered by the frequency band or carrier frequency. For example, UE and gNB can provide the relative group delay information of each sub-carrier in the bandwidth, or divide the bandwidth into several parts and then a set of relative group delay parameters represent the relative group delay of each bandwidth part respectively.

3) The quality indicator for group delay information of the transmission channel, includes an error parameter, where the error parameter includes, but not limited to, a variance, a mean value or a standard deviation of group delay error.

The qualities (such as accuracy and reliability, etc.) of group delay information provided by UE and gNB may be different. For example, a group delay information provided by a UE or a gNB may only be an average value of group delay of similar products, or may be an accurate value obtained after performing a measurement on the group delay of the UE or the gNB. Therefore, providing the quality of group delay information while providing the group delay information by UE and gNB can aid in rightly using the group delay information provided by the UE and the gNB during positioning calculation. In an embodiment, the quality indicator for group delay information can be defined in different ways. For example, the quality indicator for group delay information is a parameter representing an error between a measured group delay information and an ideal group delay information, including a variance, a mean vale or a standard deviation of the group delay error.

In the method for correcting Tx delay according to the embodiment of the present application, an accurate Tx delay can be obtained by defining the Tx Delay parameter information, which can effectively improve the positioning calculation capability.

In an embodiment, in order to enable the node responsible for positioning calculation to obtain the Tx Delay parameter information of the positioning reference signal transmitting terminal, to facilitate removing Tx Delay from the positioning measurement value provided by the positioning reference signal receiving terminal and improving the positioning accuracy, amendments and enhancements has been made in the present application to 3GPP protocols as follows, such as LTE positioning protocol (LPP), NR Positioning Protocol A (NRPPa) and radio resource control (RRC), to support UE, gNB and LMF to exchange gNB Tx Delay parameter information and UE Tx Delay parameter information proposed in the present application.

The amended and newly added LPP messages are as follows.

RequestCapabilities: LMF uses an LPP RequestCapabilities message to request UE function information and various positioning methods supported by UE. The present application proposes that the content of the RequestCapabilities message includes, other than traditional information, for LMF-based positioning method, LMF can request UE to provide whether the UE supports providing UE Tx Delay parameter information through a RequestCapabilities message.

ProvideCapabilities: UE uses an LPP ProvideCapabilities message to indicate UE positioning capability to LMF. The present application proposes that the content of the ProvideCapabilities message includes, other than traditional information, for LMF-based positioning method, UE can inform LMF whether the UE supports providing UE Tx Delay information through a ProvideCapabilities message.

RequestUETxDelay: It is an added message in the present application. LMF requests UE to provide the UE Tx Delay parameter information through an LPP RequestUETxDelay message.

ProvideUETxDelay: It is an added message in the present application. UE provides UE Tx Delay parameter information to LMF through an LPP Provide UETxDelay message.

RequestAssistanceData: UE requests assistance data to LMF through an LPP RequestAssistanceData message. For UE-based positioning method, the present application proposes that the content of the RequestAssistanceData message not only includes the traditional information, but also supports UE to request LMF to provide gNB Tx Delay information.

ProvideAssistanceData: LMF provides assistance data to UE through an LPP ProvideAssistanceData message. For UE-based positioning method, the present application proposes that the content of the ProvideAssistanceData message not only includes traditional information, but also enables LMF to provide UE with gNB Tx Delay information. UE can use this information to improve the positioning accuracy of DL-TDOA and Multi-RTT.

ProvideLocationInformation: UE provides positioning measurement or location estimation to LMF through an LPP ProvideLocationInformation message. For LMF-based positioning method, the present application proposes that the content of the ProvideLocationInformation message not only includes traditional information, but also supports UE to provide UE Tx Delay information to LMF. LMF can use this information to improve the positioning accuracy of UL-TDOA and Multi-RTT.

The amended and added NRPPa messages are as follows.

For new radio (NR) positioning, NRPPa needs to support LMF to request gNB to provide group delay information and the gNB to provide group delay information to the LMF. As the NRPPa protocol for NR positioning has not been yet completed in 3GPP, the following assumptions are made in the present application:

LMF uses a "TRP INFORMATION REQUEST" message to request gNB to provide TRP information, which may include TRP DL PRS configuration and TRP UL Positioning SRS configuration, etc.; and the gNB uses a "TRP INFORMATION RESPONSE" message to provide the LMF with TRP information, which may include the DL PRS configuration required to support DL-DTOA and Multi-RTT, and the UL Positioning SRS configuration required to support UL-DTOA and Multi-RTT, etc.

Based on the above assumptions, the present application proposes:

requesting, by the LMF, the gNB to provide gNB Tx Delay information is supported in the "TRP INFORMATION REQUEST" message; and providing LMF with gNB Tx Delay information is supported in the "TRP INFORMATION RESPONSE" message.

The amended and added RRC messages are as follows.

UE and gNB can exchange information on UE Tx Delay and gNB Tx Delay through RRC signaling. For example, UE can inform a serving gNB of the UE Tx Delay through the RRC signaling, and then the serving gNB can inform LMF of the UE Tx Delay. A gNB can inform a UE of the gNB Tx Delay through RRC unicast signaling, or inform each UE of the gNB Tx Delay through RRC broadcast signaling.

The method for correcting Tx delay according to the embodiment of the present application is illustrated in the following based on the positioning methods adopted by the LMF, such as downlink time difference of arrival (DL-TDOA) positioning method, uplink relative time of arrival (UL-TDOA) positioning method and multiple cell-round trip time (Multi-RTT) positioning method.

In an embodiment, the LMF performs positioning calculation by using downlink time difference of arrival (DL-TDOA) positioning method. Based on the above embodiments, in case that the transmitting node is the gNB, the receiving the Tx Delay parameter information transmitted by the transmitting node and transmitting the positioning reference signal configuration information to the receiving node includes:

transmitting a TRP INFORMATION REQUEST message to the gNB, where the TRP INFORMATION REQUEST message is used for requesting the gNB to provide TRP information, downlink positioning reference signal configuration information and gNB Tx Delay parameter information;

receiving the TRP information, downlink positioning reference signal configuration information and gNB Tx Delay parameter information; and transmitting a ProvideAssistanceData message to a UE, where the ProvideAssistanceData message includes the downlink positioning reference signal configuration information for the UE to measure the downlink positioning reference signal transmitted by the gNB according to the downlink positioning reference signal configuration information to obtain a first positioning measurement value.

For example, the LMF transmits the TRP INFORMATION REQUEST message to the gNB, and the TRP INFORMATION REQUEST message is used for requesting the gNB to provide TRP information, downlink positioning reference signal configuration information and gNB Tx Delay parameter information.

In an embodiment, the TRP INFORMATION REQUEST message is TRP INFORMATION REQUEST.

In an embodiment, TRP information includes TRP ID, TRP antenna location coordinates and other information, and downlink positioning reference signal configuration information is DL PRS configuration data.

After receiving the TRP INFORMATION REQUEST message transmitted by the LMF, the gNB transmits a TRP INFORMATION RESPONSE message to the LMF, where the TRP INFORMATION RESPONSE message is used for providing the LMF with assistance data which includes the TRP information, downlink positioning reference signal configuration information and gNB Tx Delay parameter information. In an embodiment, the assistance data is DL-TDOA assistance data.

In an embodiment, the TRP INFORMATION RESPONSE message is TRP INFORMATION RESPONSE.

The LMF receives the TRP information, downlink positioning reference signal configuration information and gNB Tx Delay parameter information.

In an embodiment, the gNB includes a serving gNB and one or more neighboring gNBs, and the downlink positioning reference signal configuration information is determined by the serving gNB. In this embodiment, the LMF transmits the TRP INFORMATION REQUEST message to the gNB and receives the TRP INFORMATION RESPONSE message transmitted by the gNB, for the serving gNB, the LMF transmits a TRP INFORMATION REQUEST message to the serving gNB, where the TRP INFORMATION REQUEST message is used for simultaneously requesting the serving gNB to provide downlink positioning reference signal configuration information, a TRP information and a gNB Tx Delay information of the serving gNB, and receives the TRP INFORMATION RESPONSE message transmitted by the serving gNB, where the TRP INFORMATION RESPONSE message includes the downlink positioning reference signal configuration information, and the TRP information and the gNB Tx Delay information of the serving gNB; and for the neighboring gNB, the LMF transmits a TRP INFORMATION REQUEST message to the neighboring gNB, where the TRP INFORMATION REQUEST message is used for requesting the neighboring gNB to provide a TRP information and a gNB Tx Delay information of the neighboring gNB, and receives a TRP INFORMATION RESPONSE message transmitted by the neighboring gNB, where the TRP INFORMATION RESPONSE message includes the TRP information and the gNB Tx Delay information of the neighboring gNB.

After the above steps, LMF obtains the downlink positioning reference signal configuration information and the gNB Tx Delay parameter.

Then, the LMF transmits the Provide AssistanceData message to the UE, where the ProvideAssistanceData message is used for providing the UE with the assistance data requested by the UE. The assistance data requested by the UE includes downlink positioning reference signal configuration information. In an embodiment, the ProvideAssistanceData message is Provide AssistanceData.

The LMF transmits a RequestLocationInformation message to the UE, where the RequestLocationInformation message is used for requesting the UE to measure the downlink positioning reference signal transmitted by the gNB and feed back a measured positioning measurement value. The UE measures the downlink positioning reference signal transmitted by the gNB according to the downlink positioning reference signal configuration information to obtain the first positioning measurement value. In an embodiment, the RequestLocationInformation message is RequestLocationInformation. In an embodiment, the first positioning measurement value is a downlink reference signal time difference (DL RSTD) or DL reference signal received power (RSRP).

Accordingly, the correcting the positioning measurement value based on the Tx Delay parameter information includes:

correcting the first positioning measurement value based on the gNB Tx Delay parameter information.

In the method for correcting transmission channel delay according to the embodiment of the present application, the LMF corrects the positioning measurement value by using the gNB Tx Delay parameter information, which improves the positioning accuracy of downlink time difference of arrival (DL-TDOA) positioning method.

Based on the above embodiments, before the transmitting the TRP INFORMATION REQUEST message to the gNB, the method further includes:

transmitting a RequestCapabilities message to the UE, where the RequestCapabilities message is used for requesting the UE to inform the LMF of the location function supported by the UE;

receiving a ProvideCapabilities message transmitted by the UE, where the ProvideCapabilities message is used for informing the LMF of the location function supported by the UE; and receiving a RequestAssistanceData message transmitted by the UE, where the RequestAssistanceData message is used for requesting the LMF to provide location assistance data to the UE.

For example, before LMF transmits the TRP INFORMATION REQUEST message to the gNB, LMF transmits a RequestCapabilities message to the UE, to request the UE to inform the LMF of the location function supported by the UE. In an embodiment, the RequestCapabilities message is RequestCapabilities.

In response to the RequestCapabilities message transmitted by the LMF, the UE transmits a ProvideCapabilities message to the LMF to report the location function supported by the UE.

The LMF receives the ProvideCapabilities message transmitted by the UE, where the ProvideCapabilities message is used for informing the LMF of the location function supported by the UE. In an embodiment, the ProvideCapabilities message is ProvideCapabilities, and the location function supported by the UE is LMF based DL-TDOA positioning.

The UE transmits a RequestAssistanceData message to the LMF to report the LMF to provide location assistance data.

The LMF receives the RequestAssistanceData message transmitted by the UE, where the RequestAssistanceData message is used for requesting the LMF to provide location assistance data to the UE. In an embodiment, the RequestAssistanceData message is RequestAssistanceData, and the assistance data is DL TDOA positioning assistance data.

In an embodiment, the UE establishes a connection with the gNB, and is in a radio resource control connected (RRC_CONNECTED) mode.

The method for correcting Tx delay according to the embodiment of the present application is applicable to LMF-based downlink time difference of arrival (DL-TDOA) positioning method, in which the positioning measurement value is corrected by using the gNB Tx Delay parameter information, and the positioning accuracy of the positioning method is improved.

Figure 2:
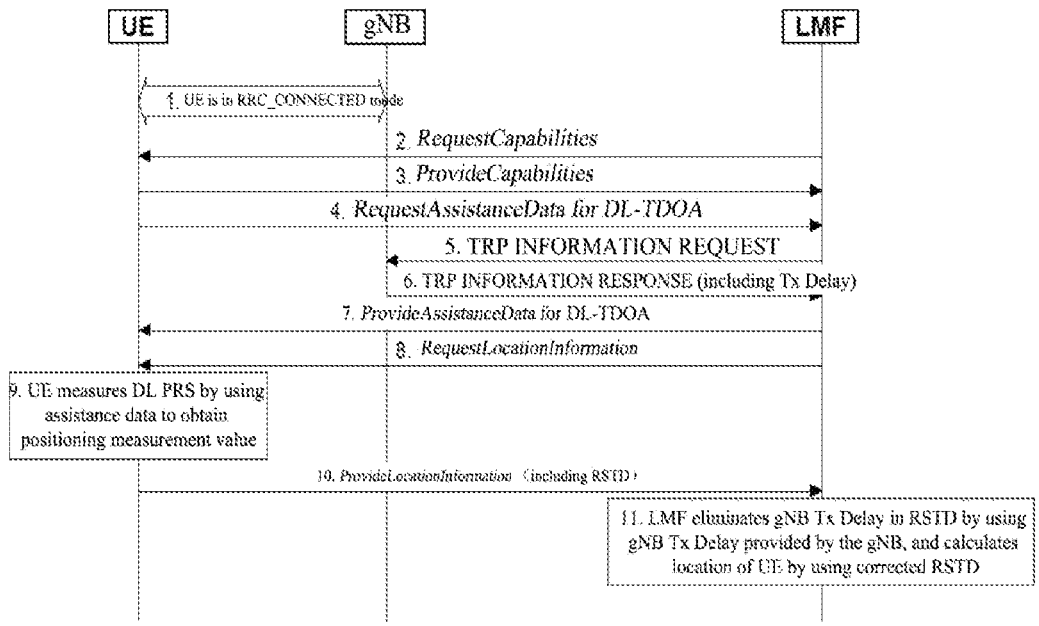
FIG. 2 is a schematic flowchart diagram of LMF-based DL-TDOA positioning method according to an embodiment of the present application.

FIG. 2 is a schematic flowchart diagram of LMF-based DL-TDOA positioning method according to an embodiment of the present application. The LMF based DL-TDOA positioning method can include the following steps:

The UE establishes the connection with a gNB and is in a radio resource control connected (RRC_CONNECTED) mode;

LMF transmits a RequestCapabilities message to the UE to request the UE to inform the LMF of a location function supported by the UE;

the UE transmits a ProvideCapabilities message to the LMF to report that the UE supports LMF-based DL TDOA positioning;

the UE transmits a RequestAssistanceData message to the LMF to request the LMF to provide DL TDOA assistance data;

the LMF transmits a TRP INFORMATION REQUEST message to the gNB, where for a serving gNB, the TRP INFORMATION REQUEST message requests the serving gNB to provide TRP information and DL PRS configuration data simultaneously; and for a neighboring gNB, the TRP INFORMATION REQUEST message only requests the neighboring gNB to provide TRP information; and in an embodiment, the LMF can request the serving gNB and the neighboring gNB to provide gNB Tx Delay information;

the gNB transmits a TRP INFORMATION RESPONSE message to the LMF, where for a serving gNB, the TRP INFORMATION RESPONSE message provides the LMF with DL-TDOA assistance data which includes the TRP information of the serving gNB and the DL PRS configuration data for DL-TDOA positioning; and for a neighboring gNB, the TRP INFORMATION RESPONSE message provides the LMF with the TRP information of the neighboring gNB; and in an embodiment, both the serving gNB and neighboring gNB can provide LMF with gNB Tx Delay information;

the LMF transmits a Provide AssistanceData message to the UE to provide the UE with the DL-TDOA assistance data requested by the UE, where the DL-TDOA assistance data includes DL PRS configuration data;

the LMF transmits a RequestLocationInformation message to the UE to request the UE to measure DL PRS and feed back a measured positioning measurement value;

the UE measures the DL PRS by using the DL-TDOA assistance data to obtain the positioning measurement value which includes RSTD and/or DL RSRP;

the UE transmits a ProvideLocationInformation message to the LMF, where the ProvideLocationInformation message includes the positioning measurement value obtained by measuring the DL PRS and the positioning measurement value includes RSTD; and the LMF corrects the RSTD measured by the UE by using the gNB Tx Delay information provided by the gNB, to eliminate the effect of the gNB Tx Delay on the RSTD measurement value, and then the LMF calculate the accurate location of the UE by using the corrected RSTD measurement value.

It should be noted that FIG. 2 shows an example of the LMF-based DL-TDOA positioning process, and only the serving gNB is shown, not the neighboring gNB, the present application of the method for correcting Tx delay according to the present application is not limited to the order of steps shown in FIG. 2.

In an embodiment, the LMF adopts an uplink time difference of arrival (UL-TDOA) positioning method. Based on the above embodiments, in case that the transmitting node is a user equipment (UE), the receiving the Tx Delay parameter information transmitted by the transmitting node and transmitting the positioning reference signal configuration information to the receiving node includes:
  receiving UE Tx Delay parameter information obtained by UE;
  transmitting a TRP INFORMATION REQUEST message to a gNB, where the TRP INFORMATION REQUEST message is used for requesting the gNB to provide TRP information and uplink positioning reference signal configuration information;
  receiving the TRP information and the uplink positioning reference signal configuration information;
  transmitting a MEASUREMENT REQUEST message to the gNB, where the MEASUREMENT REQUEST message includes the uplink positioning reference signal configuration information for the gNB to measure an uplink positioning reference signal transmitted by the UE according to the uplink positioning reference signal configuration information to obtain a second positioning measurement value;
  the correcting the positioning measurement value based on the Tx Delay parameter information includes:
  correcting the second positioning measurement value based on the UE Tx Delay parameter information.

For example, the LMF receives the UE Tx Delay parameter information obtained by UE.

The LMF transmits the TRP INFORMATION REQUEST message to the gNB, where the TRP INFORMATION REQUEST message is used for requesting the gNB to provide TRP information and uplink positioning reference signal configuration information. In an embodiment, the TRP INFORMATION REQUEST message is TRP INFORMATION REQUEST.

In an embodiment, TRP information includes TRP ID, TRP antenna location coordinates and other information, and uplink positioning reference signal configuration information includes UL SRS-Pos configuration data.

The gNB receives the TRP INFORMATION REQUEST message transmitted by the LMF and transmits a TRP INFORMATION RESPONSE message to the LMF, where the TRP INFORMATION RESPONSE message includes TRP information and uplink positioning reference signal configuration information. The LMF receives the TRP information and uplink positioning reference signal configuration information.

In an embodiment, the gNB includes a serving gNB and one or more neighboring gNBs, and the uplink positioning reference signal configuration information is determined by the serving gNB.

In this embodiment, the LMF transmits the TRP INFORMATION REQUEST message to the gNB and receives the TRP INFORMATION RESPONSE message transmitted by the gNB;

for the serving gNB, the TRP INFORMATION REQUEST message is used for simultaneously requesting the serving gNB to provide uplink positioning reference signal configuration information and a TRP information of the serving gNB, and the TRP INFORMATION RESPONSE message includes the uplink positioning reference signal configuration information and the TRP information of the serving gNB; and for the neighboring gNB, the TRP INFORMATION REQUEST message is used for requesting the neighboring gNB to provide a TRP information of the neighboring gNB, and the TRP INFORMATION RESPONSE message includes the TRP information of the neighboring gNB.

After the above steps, LMF obtains the uplink positioning reference signal configuration information and the UE Tx Delay parameter.

Then, the LMF transmits the MEASUREMENT REQUEST message to the gNB, where the MEASUREMENT REQUEST message includes the uplink positioning reference signal configuration information for the gNB to measure the uplink positioning reference signal transmitted by the UE according to the uplink positioning reference signal configuration information to obtain a second positioning measurement value. In an embodiment, the MEASUREMENT REQUEST message is MEASUREMENT REQUEST. In an embodiment, the second positioning measurement value is an uplink relative time of arrival (UL RTOA).

In an embodiment, the gNB includes a serving gNB and one or more neighboring gNBs. Accordingly, the LMF transmits the MEASUREMENT REQUEST message to the gNB. That is, the LMF transmits the MEASUREMENT REQUEST message to all gNBs participating in UL-TDOA positioning, and all the gNBs participating in UL-TDOA positioning measure the uplink positioning reference signal transmitted by the UE by using the uplink positioning reference signal configuration information provided by the LMF.

The correcting the positioning measurement value based on the Tx Delay parameter information includes:
  correcting the second positioning measurement value based on the UE Tx Delay parameter information.

In the method for correcting Tx delay according to the embodiment of the present application, the LMF corrects the positioning measurement value by using the UE Tx Delay information, which improves the positioning accuracy of uplink time difference of arrival (UL-TDOA) positioning method.

Based on the above embodiments, before the receiving UE Tx Delay parameter information obtained by UE, the method further includes:
  transmitting a RequestCapabilities message to the UE, where the RequestCapabilities message is used for requesting the UE to inform the LMF of the location function supported by the UE and whether the UE is configured to provide the UE Tx Delay parameter information;
  receiving a ProvideCapabilities message transmitted by the UE, where the ProvideCapabilities message is used for informing the LMF of the location function supported by the UE and whether the UE is configured to provide the UE Tx Delay parameter information; and transmitting a RequestUETxDelay message to the UE, where the RequestUETxDelay message is used for requesting the UE to provide the UE Tx Delay parameter information.

For example, before the location management function (LMF) receives UE Tx Delay parameter information obtained by UE, the method further includes:

LMF transmits the RequestCapabilities message to the UE, where the RequestCapabilities message is used for requesting the UE to inform the LMF of the location function supported by the UE and whether the UE is configured to provide the UE Tx Delay parameter information. In an embodiment, the RequestCapabilities message is RequestCapabilities.

LMF receives the ProvideCapabilities message transmitted by the UE, where the ProvideCapabilities message is used for informing the LMF of the location function supported by the UE and whether the UE is configured to provide the UE Tx Delay parameter information. In an embodiment, the ProvideCapabilities message is a ProvideCapabilities message, and the location function supported by the UE is LMF-based UL-TDOA positioning.

LMF transmits the RequestUETxDelay message to the UE, where the RequestUETxDelay message is used for requesting the UE to provide the UE Tx Delay parameter information.

In an embodiment, the UE establishes a connection with the gNB in the embodiments of the present application, and is in a radio resource control connected (RRC_CONNECTED) mode.

The method for correcting Tx delay according to the embodiment of the present application is applicable to LMF-based uplink time difference of arrival (UL-TDOA) positioning method, in which the positioning measurement value is corrected by using the UE Tx Delay parameter information, and the positioning accuracy of the positioning method is improved.

Figure 3:
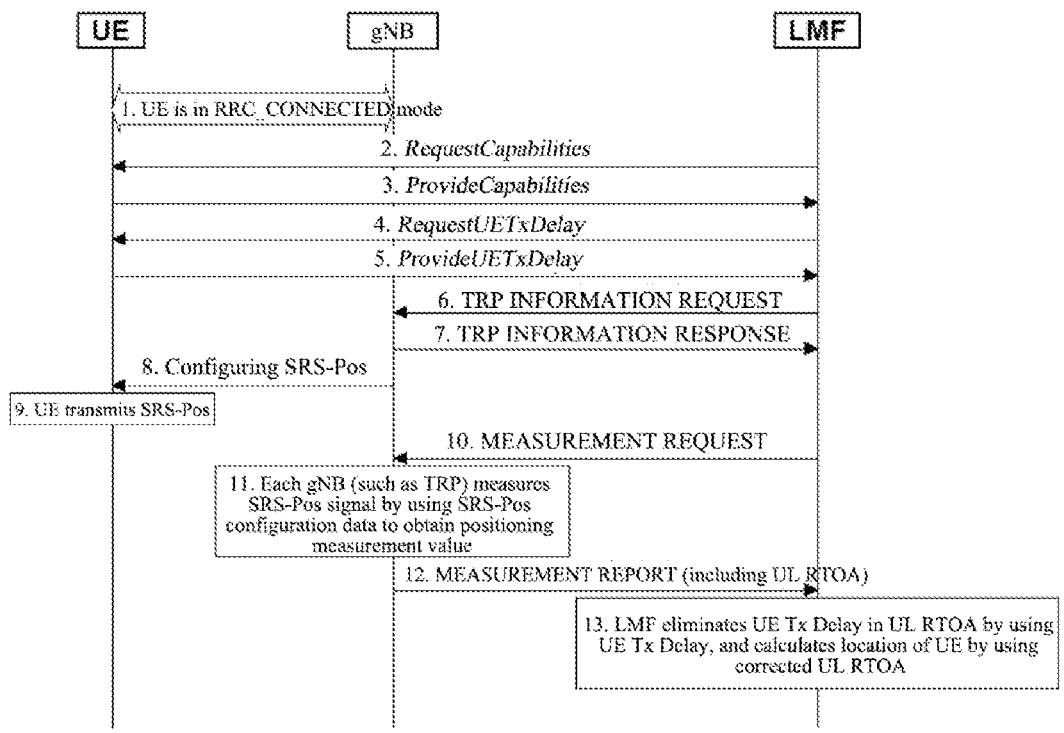
FIG. 3 is a schematic flowchart diagram of LMF-based UL-TDOA positioning method according to an embodiment of the present application.

FIG. 3 is a schematic flowchart diagram of LMF-based UL-TDOA positioning method according to an embodiment of the present application. As shown in FIG. 3, the LMF-based UL-TDOA positioning method can include the following steps:

UE establishes a connection with a gNB, where the UE is in a radio resource control connected (RRC_CONNECTED) mode;

LMF transmits a RequestCapabilities message to the UE to request the UE to inform the LMF of a location function supported by the UE, where in addition to an information included in current protocols, the RequestCapabilities message further includes that the LMF requests the UE to inform the LMF of whether the UE is configured to provideUETxDelay information;

the UE transmits a ProvideCapabilities message to the LMF to report that the UE supports LMF-based UL-TDOA positioning, where the UE further reports that whether the UE is configured to provide UETxDelay information;

the LMF transmits a RequestUETxDelay message to the UE to request the UE to provide the UE Tx Delay parameter information;

the UE transmits a Provide UETxDelay message to the LMF to provide the UE Tx Delay parameter information;

the LMF transmits a TRP INFORMATION REQUEST message to the gNB, where for a serving gNB, the TRP INFORMATION REQUEST message requests the serving gNB to provide TRP information and UL PRS-Pos configuration data simultaneously; and for a neighboring gNB, the TRP INFORMATION REQUEST message only requests the neighboring gNB to provide TRP information;

the gNB transmits a TRP INFORMATION RESPONSE message to the LMF, where for a serving gNB, the TRP INFORMATION RESPONSE message provides the LMF with the TRP information and the UL PRS-Pos configuration data for UL-TDOA positioning of the serving gNB; and for a neighboring gNB, the TRP INFORMATION RESPONSE message provides the LMF with the TRP information of the neighboring gNB;

the gNB configures SRS-Pos to the UE through RRC signaling;

the UE transmits SRS-Pos to the serving gNB and multiple neighboring gNBs according to RRC signaling;

the LMF transmits a MEASUREMENT REQUEST message to each gNB participating in UL-TDOA positioning, where the MEASUREMENT REQUEST message includes UL SRS-Pos configuration data, and requests the gNB to measure the SRS-Pos transmitted by the UE and feed back a measured positioning measurement value;

all gNBs participating in UL-TDOA positioning (including serving gNBs and neighboring gNB for the UE) measure SRS-Pos signal by using the UL SRS-Pos configuration data provided by the LMF to obtain the positioning measurement value for the UE;

all gNBs respectively transmit a MEASUREMENT REPORT message to the LMF, where the MEASUREMENT REPORT message includes the positioning measurement value (such as UL RTOA) obtained by measuring UL SRS-Pos; and the LMF corrects the UL RTOA measurement value provided by the gNB by using the UE Tx Delay information reported by the UE, that is, eliminates the effect of UE Tx Delay on the UL RTOA measurement value; and then the LMF calculates the location of the UE by using the corrected UL RTOA measurement value.

In an embodiment, the LMF performs positioning calculation using a multiple cell-round trip time (Multi-RTT) positioning method. Based on the above embodiments, in case that the transmitting node is the gNB and a UE respectively, the receiving the Tx Delay parameter information transmitted by the transmitting node and transmitting the positioning reference signal configuration information to the receiving node includes:

receiving UE Tx Delay parameter information obtained by UE;

transmitting a TRP INFORMATION REQUEST message to a gNB, where the TRP INFORMATION REQUEST message is used for requesting the gNB to provide TRP information, downlink positioning reference signal configuration information, uplink positioning reference signal configuration information and gNB Tx Delay parameter information;

receiving the TRP information, the downlink positioning reference signal configuration information, the uplink positioning reference signal configuration information, and the gNB Tx Delay parameter information;

transmitting a Provide AssistanceData message to the UE, where the ProvideAssistanceData message includes the downlink positioning reference signal configuration information for the UE to measure the downlink positioning reference signal transmitted by the gNB according to the downlink positioning reference signal configuration information to obtain a third positioning measurement value;

transmitting a MEASUREMENT REQUEST message to the gNB, where the MEASUREMENT REQUEST message includes the uplink positioning reference signal configuration information for the gNB to measure an uplink positioning reference signal transmitted by the UE according to the uplink positioning reference signal configuration information to obtain a fourth positioning measurement value;

the correcting the positioning measurement value based on the Tx Delay parameter information includes:

correcting the third positioning measurement value based on the gNB Tx Delay parameter information; and correcting the fourth positioning measurement value based on the UE Tx Delay parameter information.

For example, the LMF receives UE Tx Delay parameter information obtained by the UE.

The LMF transmits a TRP INFORMATION REQUEST message to the gNB, where the TRP INFORMATION REQUEST message is used for requesting the gNB to provide TRP information, downlink positioning reference signal configuration information, uplink positioning reference signal configuration information and gNB Tx Delay parameter information. In an embodiment, the TRP INFORMATION REQUEST message is TRP INFORMATION REQUEST.

In an embodiment, the TRP information includes TRP ID, TRP antenna location coordinates and other information, the uplink positioning reference signal configuration information includes UL SRS-Pos configuration data, and downlink positioning reference signal configuration information includes DL PRS configuration data.

After receiving the TRP INFORMATION REQUEST message transmitted by the LMF, the gNB transmits the TRP INFORMATION RESPONSE message to the LMF, where the TRP INFORMATION RESPONSE message includes the TRP information, the downlink positioning reference signal configuration information, the uplink positioning reference signal configuration information, and the gNB Tx Delay parameter information. In an embodiment, the TRP INFORMATION RESPONSE message is TRP INFORMATION RESPONSE.

The LMF receives the TRP information, the downlink positioning reference signal configuration information, the uplink positioning reference signal configuration information and the gNB Tx Delay parameter information.

In an embodiment, the gNB includes a serving gNB and one or more neighboring gNBs, and the positioning reference signal configuration information is determined by the serving gNB. In an embodiment, the LMF transmits the TRP INFORMATION REQUEST message to the gNB and receives the TRP INFORMATION RESPONSE message transmitted by the gNB includes:

for the serving gNB, the TRP INFORMATION REQUEST message is used for simultaneously requesting the serving gNB to provide uplink positioning reference signal configuration information, downlink positioning reference signal configuration information, a TRP information and a gNB Tx Delay parameter information of the serving gNB, and the TRP INFORMATION RESPONSE message includes the uplink positioning reference signal configuration information, the downlink positioning reference signal configuration information, and the TRP information and the gNB Tx Delay parameter information of the serving gNB; and for the neighboring gNB, the TRP INFORMATION REQUEST message is used for requesting the neighboring gNB to provide a TRP information and a gNB Tx Delay parameter information of the neighboring gNB, and the TRP INFORMATION RESPONSE message includes the TRP information and the gNB Tx Delay parameter information of the neighboring gNB.

After the above steps, the LMF obtains the uplink positioning reference signal configuration information, the downlink positioning reference signal configuration information, the gNB Tx Delay parameter information and the UE Tx Delay parameter information.

Then, the LMF transmits the Provide AssistanceData message to the UE, where the Provide AssistanceData message is used for providing the UE with the assistance data requested by the UE. The assistance data requested by the UE includes downlink positioning reference signal configuration information. In an embodiment, the ProvideAssistanceData message is Provide AssistanceData.

The LMF transmits the RequestLocationInformation message to the UE, where the RequestLocationInformation message is used for requesting the UE to measure the downlink positioning reference signal transmitted by the gNB and feed back a measured positioning measurement value. The UE measures the downlink positioning reference signal transmitted by the gNB according to the downlink positioning reference signal configuration information to obtain the third positioning measurement value. In an embodiment, the RequestLocationInformation message is RequestLocationInformation. In an embodiment, the third positioning measurement value is a UE Rx-Tx Time Difference.

The LMF transmits the MEASUREMENT REQUEST message to the gNB, where the MEASUREMENT REQUEST message includes the uplink positioning reference signal configuration information, the gNB measures the uplink positioning reference signal transmitted by the UE according to the uplink positioning reference signal configuration information to obtain the fourth positioning measurement value. In an embodiment, the MEASUREMENT REQUEST message is a MEASUREMENT REQUEST message. In an embodiment, the fourth positioning measurement value is gNB Rx-Tx Time Difference.

In an embodiment, the gNB includes a serving gNB and one or more neighboring gNBs. The LMF transmits the MEASUREMENT REQUEST message to the gNB. That is, the LMF transmits the MEASUREMENT REQUEST message to all gNBs participating in Multi-RTT positioning, and all the gNBs participating in Multi-RTT positioning measure the uplink positioning reference signal transmitted by the UE by using the uplink positioning reference signal configuration information provided by the LMF.

Accordingly, correcting the positioning measurement value based on the Tx Delay parameter information includes:

correcting the third positioning measurement value based on the gNB Tx Delay parameter information; and correcting the fourth positioning measurement value based on the UE Tx Delay parameter information.

In the method for correcting Tx delay according to the embodiment of the present application, the LMF corrects the positioning measurement value by using the gNB Tx Delay parameter information and UE Tx Delay information, which improves the positioning accuracy of the multiple cell-round trip time (Multi-RTT) positioning method.

Based on the above embodiments, the method for correcting transmission channel delay further includes:

transmitting a RequestCapabilities message to the UE, where the RequestCapabilities message is used for requesting the UE to inform the LMF of the location function supported by the UE and whether the UE is configured to provide the UE Tx Delay parameter information;

receiving a ProvideCapabilities message transmitted by the UE, where the ProvideCapabilities message is used for informing the LMF of the location function supported by the UE and whether the UE is configured to provide the UE Tx Delay parameter information;

transmitting a RequestUETxDelay message to the UE, where the RequestUETxDelay message is used for requesting the UE to provide the UE Tx Delay parameter information; and receiving a RequestAssistanceData message transmitted by the UE, where the RequestAssistanceData message is used for requesting the LMF to provide location assistance data to the UE.

For example, the LMF transmits a RequestCapabilities message to the UE, where the RequestCapabilities message is used for requesting the UE to inform the LMF of the location function supported by the UE and whether the UE is configured to provide the UE Tx Delay parameter information. In an embodiment, the RequestCapabilities message is RequestCapabilities.

The LMF receives the ProvideCapabilities message transmitted by the UE, where the ProvideCapabilities message is used for informing the LMF of the location function supported by the UE and whether the UE is configured to provide the UE Tx Delay parameter information. In an embodiment, the ProvideCapabilities message is a ProvideCapabilities message, and the location function supported by the UE is LMF-based Multi-RTT positioning.

The LMF transmits the RequestUETxDelay message to the UE, where the RequestUETxDelay message is used for requesting the UE to provide the UE Tx Delay parameter information.

In an embodiment, the UE establishes a connection with the gNB in the embodiments of the present application, and is in a radio resource control connected (RRC_CONNECTED) mode.

Then, the LMF receives the RequestAssistanceData message transmitted by the UE, where the RequestAssistanceData message is used for requesting the LMF to provide location assistance data to the UE. In an embodiment, the RequestAssistanceData message is RequestAssistanceData. After that, in response to the RequestAssistanceData message, the LMF transmits the location assistance data requested by the UE to the UE.

The method for correcting Tx delay according to the embodiment of the present application is applicable to LMF-based multiple cell-round trip time (Multi-RTT) positioning method, in which the LMF corrects the positioning measurement value by using the gNB Tx Delay parameter information and the UE Tx Delay information and the positioning accuracy is improved.

Figure 4:
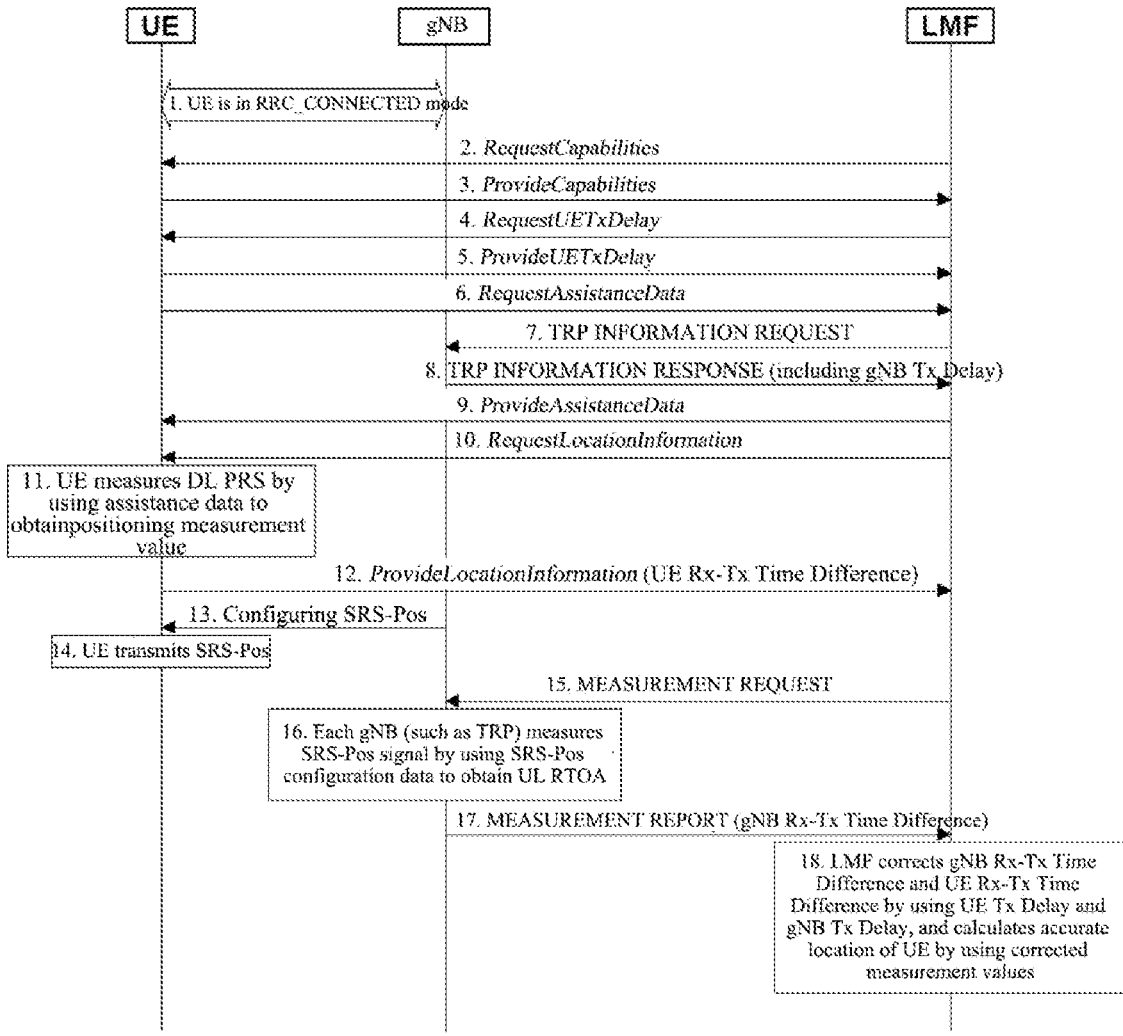
FIG. 4 is a schematic flowchart diagram of LMF-based Multi-RTT positioning method according to an embodiment of the present application.

FIG. 4 is a schematic flowchart diagram of LMF-based Multi-RTT positioning method according to an embodiment of the present application. The LMF-based Multi-RTT positioning method can include the following steps:

UE establishes a connection with a gNB and is in a radio resource control connected (RRC_CONNECTED) mode;

LMF transmits a RequestCapabilities message to the UE to request the UE to inform the LMF of a location function supported by the UE, where in addition to an information included in current protocols, the RequestCapabilities message further includes that the LMF requests the UE to inform the LMF of whether the UE is configured to provide the UE Tx Delay parameter information;

the UE transmits a ProvideCapabilities message to the LMF to report that the UE supports LMF-based Multi-RTT positioning, where the UE further reports that whether the UE is configured to provide the UE Tx Delay parameter information;

the LMF transmits a RequestUETxDelay message to the UE to request the UE to provide the UE Tx Delay parameter information;

the UE transmits a Provide UETxDelay message to the LMF to provide the UE Tx Delay parameter information;

the UE transmits a RequestAssistanceData message to the LMF to request the LMF to provide Multi-RTT assistance data;

the LMF transmits a TRP INFORMATION REQUEST message to the gNB, where for a serving gNB, the TRP INFORMATION REQUEST message requests the serving gNB to provide TRP information (such as TRP ID and TRP antenna location coordinates, etc.), DL PRS configuration data and UL SRS-Pos configuration data simultaneously; and for a neighboring gNB, the TRP INFORMATION REQUEST message only requests the neighboring gNB to provide TRP information; and in an embodiment, the LMF can request the gNB to provide gNB Tx Delay information;

the gNB transmits a TRP INFORMATION RESPONSE message to the LMF, where for a serving gNB, the TRP INFORMATION RESPONSE message provides the LMF with the TRP information, DL PRS configuration data and UL SRS-Pos configuration data of the serving gNB; and for a neighboring gNB, the TRP INFORMATION RESPONSE message provides the LMF with the TRP information of the neighboring gNB; and in an embodiment, both the serving gNB and the neighboring gNB can provide the LMF with gNB Tx Delay information;

the LMF transmits a ProvideAssistanceData message to the UE to provide the location assistance data requested by the UE to the UE, where the assistance data includes DL PRS configuration data;

the LMF transmits a RequestLocationInformation message to the UE to request the UE to measure the DL PRS of the gNB and feed back a measured positioning measurement value;

the UE measures a downlink signal by using the location assistance data (such as PRS configuration data) to obtain the positioning measurement value which includes UE Rx-Tx Time Difference;

the UE transmits a ProvideLocationInformation message to the LMF, where the ProvideLocationInformation message includes the positioning measurement value obtained by measuring the downlink PRS and the positioning measurement value includes UE Rx-Tx Time Difference;

the gNB configures SRS-Pos to the UE through RRC signaling;

the UE transmits SRS-Pos to the serving gNB and neighboring gNB according to RRC signaling;

the LMF transmits a MEASUREMENT REQUEST message to each gNB participating in Multi-RTT positioning, where the MEASUREMENT REQUEST message includes UL SRS-Pos configuration data, and requests the gNB to measure the SRS-Pos transmitted by the UE and feed back a measured positioning measurement value;

all gNBs participating in Multi-RTT positioning measure SRS-Pos signal by using the UL SRS-Pos configuration data provided by the LMF to obtain the positioning measurement value; and all gNBs transmit a MEASUREMENT REPORT message to the LMF, where the MEASUREMENT REPORT message includes the positioning measurement value obtained by measuring the UL SRS-Pos, and the positioning measurement value includes gNB Rx-Tx Time Difference.

The LMF eliminates the effect of the UE Tx Delay on the measurement value of gNB Rx-Tx Time Difference by using the UE Tx Delay information provided by the UE. For example, the corrected gNB Rx-Tx Time Difference=uncorrected gNB Rx-Tx Time Difference−UE Tx Delay. The LMF eliminates the effect of the gNB Tx Delay on the measurement value of UE Rx-Tx Time Difference by using the gNB Tx Delay information provided by the gNB. For example, the corrected UE Rx-Tx Time Difference=uncorrected UE Rx-Tx Time Difference−gNB Tx Delay. Then, the LMF calculates the accurate location of the UE by using the corrected UE Rx-Tx Time Difference and the corrected gNB Rx-Tx Time Difference.

Figure 5:
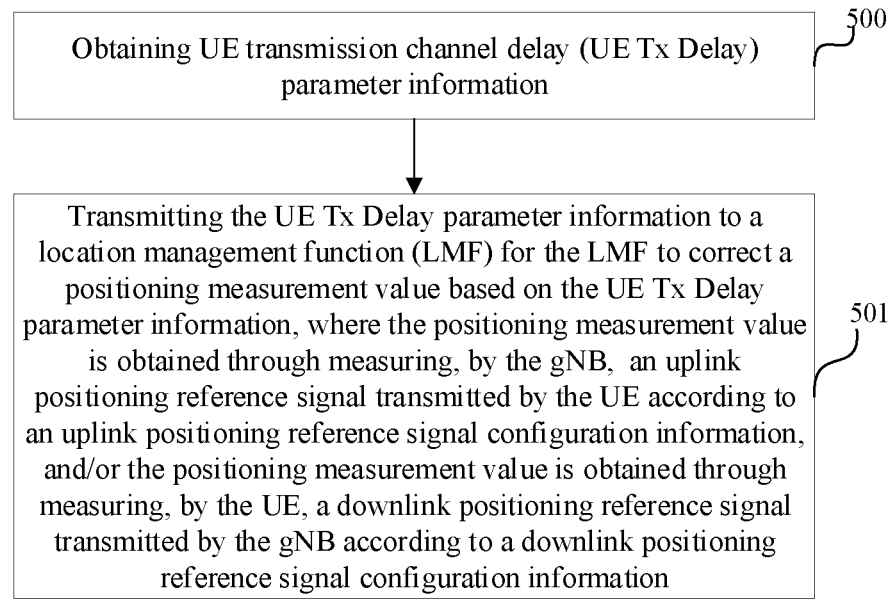
FIG. 5 is second schematic flowchart diagram of the method for correcting Tx delay according to an embodiment of the present application.

FIG. 5 is second schematic flowchart diagram of the method for correcting Tx delay according to an embodiment of the present application. The method is performed by user equipment (UE), including:

step 500, obtaining a corresponding transmission channel delay (UE Tx Delay) parameter information of the UE.

In an embodiment, the embodiment of the present application is applied to LMF-based positioning method, that is, the LMF is still used for positioning calculation. The following further illustrates the method for correcting transmission channel delay in detail from the user equipment (UE) side.

First, the UE calculates and obtains its transmission channel delay (UE Tx Delay) parameter information.

Step 501, transmitting the UE Tx Delay parameter information to the LMF for the LMF to correct a positioning measurement value based on the UE Tx Delay parameter information.

In an embodiment, the positioning measurement value is obtained through measuring, by the gNB, an uplink positioning reference signal transmitted by the UE according to an uplink positioning reference signal configuration information, and/or the positioning measurement value is obtained through measuring, by the UE, a downlink positioning reference signal transmitted by the gNB according to a downlink positioning reference signal configuration information.

In an embodiment, the UE transmits the UE Tx Delay parameter information to the LMF for the LMF to correct the positioning measurement value based on the UE Tx Delay parameter information.

In an embodiment, the LMF needs UE Tx Delay parameter information when performing positioning calculation by using the following two positioning methods: uplink time difference of arrival (UL-TDOA) positioning method and multiple cell-round trip time (Multi-RTT) positioning method. In the UL-TDOA positioning method, the positioning measurement value is the second positioning measurement value in the aforementioned method embodiment, which is obtained through measuring, by the gNB, the uplink positioning reference signal transmitted by the UE according to the uplink positioning reference signal configuration information. In the multiple cell-round trip time (Multi-RTT) positioning method, the positioning measurement value includes the third positioning measurement value and the fourth positioning measurement value in the aforementioned method embodiments, where the third positioning measurement value is obtained through measuring, by the UE, a downlink positioning reference signal transmitted by the gNB according to a downlink positioning reference signal configuration information, and the fourth positioning measurement value is obtained through measuring, by the gNB, the uplink positioning reference signal transmitted by the UE according to an uplink positioning reference signal configuration information.

The method for correcting Tx delay according to the embodiment of the present application is applicable to the LMF-based uplink time difference of arrival (UL-TDOA) positioning method and multiple cell-round trip time (Multi-RTT) positioning method, by providing the location management function (LMF) with the UE Tx Delay parameter information for the LMF to correct the positioning measurement value, the effect of the UE transmission channel delay (UE Tx Delay) on the time related positioning measurement value can be eliminated and the positioning accuracy can be effectively improved.

Based on the above embodiments, the transmitting the UE Tx Delay parameter information to the LMF includes:

receiving a RequestCapabilities message transmitted by the LMF, where the RequestCapabilities message is used for requesting the UE to inform the LMF of a location function supported by the UE and whether the UE is configured to provideUETxDelay information;

transmitting a ProvideCapabilities message to the LMF, where the ProvideCapabilities message is used for informing the LME of the location function supported by the UE and whether the UE is configured to provideUETxDelay information;

receiving a RequestUETxDelay message transmitted by the LMF, where the RequestUETxDelay message is used for requesting the UE to provide the UE Tx Delay parameter information; and transmitting a Provide UETxDelay message to the LMF, where the Provide UETxDelay message includes the UE Tx Delay parameter information.

In an embodiment, the embodiment of the present application is applicable to the LMF-based UL-TDOA positioning method and LMF-based Multi-RTT positioning method. The method for correcting Tx delay according to these embodiments of the present application can be similar to the relevant description and understanding in the above embodiments of the method for correcting tx delay performed by the LMF, which is not repeated here.

In the method for correcting Tx delay according to the embodiment of the present application, by providing the LMF with the UE Tx Delay parameter information for the LMF to correct the positioning measurement value, the effect of the UE Tx Delay on the time related positioning measurement value can be eliminated and the positioning accuracy can be effectively improved.

Based on the above embodiments, after the transmitting the Provide UETxDelay message to the LMF, the method further includes:
  receiving an uplink positioning reference signal configuration information transmitted by the gNB through radio resource control (RRC) signaling, and transmitting an uplink positioning reference signal to the gNB for the gNB to measure the uplink positioning reference signal and transmitting a measured positioning measurement value to the LMF for the LMF to correct the positioning measurement value based on the UE Tx Delay parameter information.

In an embodiment, the embodiment of the present application is applicable to the LMF-based UL-TDOA positioning method. After transmitting the ProvideUETxDelay message to the LMF, the UE receives the uplink positioning reference signal configuration information transmitted by the gNB through RRC signaling, and then transmits the uplink positioning reference signal to the gNB according to RRC signaling for the gNB to measure the uplink positioning reference signal and transmitting the measured positioning measurement value to the LMF for the LMF to correct the positioning measurement value measured by the gNB based on the UE Tx Delay parameter information.

In an embodiment, the UE transmits uplink positioning reference signals to all gNBs participating in positioning according to RRC signaling, where all the gNBs participating in positioning include a serving gNB and one or more neighboring gNBs.

The method for correcting Tx delay according to the embodiment of the present application is applicable to the LMF-based UL-TDOA positioning method, by providing the LMF with the UE Tx Delay parameter information for the LMF to correct the positioning measurement value, the positioning accuracy can be improved.

Based on the above embodiments, after the transmitting the Provide UETxDelay message to the LMF, the method further includes:
  transmitting a RequestAssistanceData message to the LMF, where the RequestAssistanceData message is used for requesting the LMF to provide location assistance data;
  receiving a Provide AssistanceData message transmitted by the LMF, where the ProvideAssistanceData message includes downlink positioning reference signal configuration information;
  measuring the downlink positioning reference signal transmitted by the gNB according to the downlink positioning reference signal configuration information to obtain the third positioning measurement value, and transmitting the third positioning measurement value to the LMF for the LMF to correct the third positioning measurement value based on the gNB Tx Delay parameter information;
  receiving the uplink positioning reference signal configuration information transmitted by the gNB through the RRC signaling, and transmitting the uplink positioning reference signal to the gNB for the gNB to measure the uplink positioning reference signal to obtain the fourth positioning measurement value and transmitting the fourth positioning measurement value to the LMF for the LMF to correct the fourth positioning measurement value based on the UE Tx Delay parameter information.

In an embodiment, the embodiment of the present application is applicable to the LMF-based Multi-RTT positioning method. The method for correcting Tx delay according to these embodiments of the present application can be similar to the relevant description and understanding in the above embodiments of the method for correcting Tx delay performed by the LMF, which is not repeated here.

The method for correcting TX delay according to the embodiment of the present application is applicable to the LMF-based Multi-RTT positioning method, by providing the LMF with the UE Tx Delay parameter information for the LMF to correct the positioning measurement value, the positioning accuracy can be improved.

Figure 6:
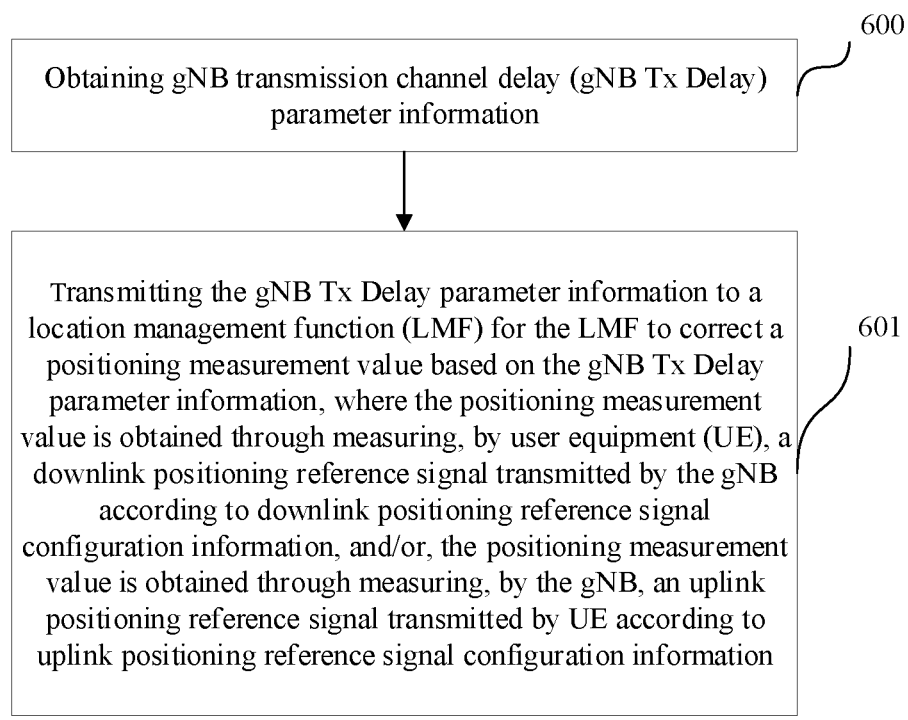
FIG. 6 is third schematic flowchart diagram of the method for correcting Tx delay according to an embodiment of the present application.

FIG. 6 is third schematic flowchart diagram of the method for correcting Tx delay according to an embodiment of the present application. The method is performed by a gNB, including:
  step 600, obtaining gNB transmission channel delay (gNB Tx Delay) parameter information.

In an embodiment, the embodiment of the present application is applicable to LMF-based positioning method, that is, the location management function (LMF) is still used for performing positioning calculation, and the method for correcting Tx delay is illustrated in detail from gNB side.

First, the gNB calculates and obtains transmission channel delay (gNB Tx Delay) parameter information.

Step 601, transmitting the gNB Tx Delay parameter information to the LMF for the LMF to correct a positioning measurement value based on the gNB Tx Delay parameter information;
  where the positioning measurement value is obtained through, by the UE, a downlink positioning reference signal transmitted by the gNB according to downlink positioning reference signal configuration information, and/or, the positioning measurement value is obtained through measuring, by the gNB, an uplink positioning reference signal transmitted by the UE according to uplink positioning reference signal configuration information.

For example, the gNB transmits the gNB Tx Delay parameter information to the LMF and the LMF corrects the positioning measurement value based on the gNB Tx Delay parameter information.

In an embodiment, the LMF uses the gNB Tx Delay parameter information when performing positioning calculation by using the following two positioning methods: downlink time difference of arrival positioning method and multiple cell-round trip time positioning method. In the downlink time difference of arrival positioning method, the positioning measurement value is the first positioning measurement value in the aforementioned method embodiment, which is obtained through measuring, by UE, the downlink positioning reference signal transmitted by the gNB according to the downlink positioning reference signal configuration information. In the multiple cell-round trip time positioning method, the positioning measurement value includes the third positioning measurement value and the fourth positioning measurement value in the aforementioned method embodiment, which is obtained through measuring, by the UE, the downlink positioning reference signal transmitted by the gNB according to the downlink positioning reference signal configuration information, and by the gNB measuring the uplink positioning reference signal transmitted by the UE according to the uplink positioning reference signal configuration information.

The method for correcting Tx delay according to the embodiment of the present application is applicable to the LMF-based downlink time difference of arrival positioning method and multiple cell-round trip time positioning method, and by providing the LMF with the gNB Tx Delay parameter information for the LMF to correct the positioning measurement value, the effect of the gNB Tx Delay on the time related positioning measurement value can be eliminated and the positioning accuracy can be effectively improved.

Based on the above embodiments, the transmitting the gNB Tx Delay parameter information to the LMF includes:
receiving a TRP INFORMATION REQUEST message transmitted by the LMF and transmitting a TRP INFORMATION RESPONSE message to the LMF;
where the TRP INFORMATION REQUEST message is used for requesting the gNB to provide its TRP information, downlink positioning reference signal configuration information and gNB Tx Delay parameter information, and the TRP INFORMATION RESPONSE message includes the TRP information, the downlink positioning reference signal configuration information and the gNB Tx Delay parameter information; or
the TRP INFORMATION REQUEST message is used for requesting the gNB to provide TRP information, downlink positioning reference signal configuration information, uplink positioning reference signal configuration information and gNB Tx Delay parameter information, and the TRP INFORMATION RESPONSE message includes the TRP information, the downlink positioning reference signal configuration information, the uplink positioning reference signal configuration information and the gNB Tx Delay parameter information.

In an embodiment, the gNB and the location management function (LMF) transmit gNB Tx Delay parameter information and uplink/downlink positioning reference signal configuration information based on NRPPa messages.

The TRP INFORMATION REQUEST message is used for requesting the gNB to provide TRP information, downlink positioning reference signal configuration information and gNB Tx Delay parameter information.

In an embodiment, the TRP INFORMATION REQUEST message is TRP INFORMATION REQUEST.

In an embodiment, TRP information includes TRP ID, TRP antenna location coordinates and other information, and downlink positioning reference signal configuration information is DL PRS configuration data.

In an embodiment, after receiving the TRP INFORMATION REQUEST message transmitted by the LMF, the gNB transmits the TRP INFORMATION RESPONSE message to the LMF. The TRP INFORMATION RESPONSE message is used for providing the LMF with location assistance data which includes the TRP information, downlink positioning reference signal configuration information, and gNB Tx Delay parameter information. In an embodiment, the location assistance data is DL-TDOA location assistance data.

In an embodiment, the TRP INFORMATION RESPONSE message is TRP INFORMATION RESPONSE.

In an embodiment, the gNB includes a serving gNB and one or more neighboring gNBs, and the uplink positioning reference signal configuration information and/or the downlink positioning reference signal configuration information is determined by the serving gNB.

In an embodiment, the receiving the TRP INFORMATION REQUEST message transmitted by the LMF and transmitting the TRP INFORMATION RESPONSE message to the LMF includes that:
for the serving gNB, the serving gNB receives the TRP INFORMATION REQUEST message transmitted by the LMF, where the TRP INFORMATION REQUEST message is used for simultaneously requesting the serving gNB to provide the downlink positioning reference signal configuration information, and the TRP information and the gNB Tx Delay information of the serving gNB; the serving gNB transmits the TRP INFORMATION RESPONSE message to the LMF, where the TRP INFORMATION RESPONSE message includes the downlink positioning reference signal configuration information, and the TRP information and the gNB Tx Delay information of the serving gNB; and
for the neighboring gNB, the neighboring gNB receives the TRP INFORMATION REQUEST message transmitted by the LMF, where the TRP INFORMATION REQUEST message is used for requesting the neighboring gNB to provide TRP information and gNB Tx Delay information of the neighboring gNB; and the neighboring gNB transmits the TRP INFORMATION RESPONSE message to the LMF, where the TRP INFORMATION RESPONSE message includes the TRP information and the gNB Tx Delay information of the neighboring gNB.

In the method for correcting Tx delay according to the embodiment of the present application, by providing the gNB Tx Delay parameter information to the LMF for the LMF to correct the positioning measurement value, the positioning accuracy can be effectively improved.

Figure 7:
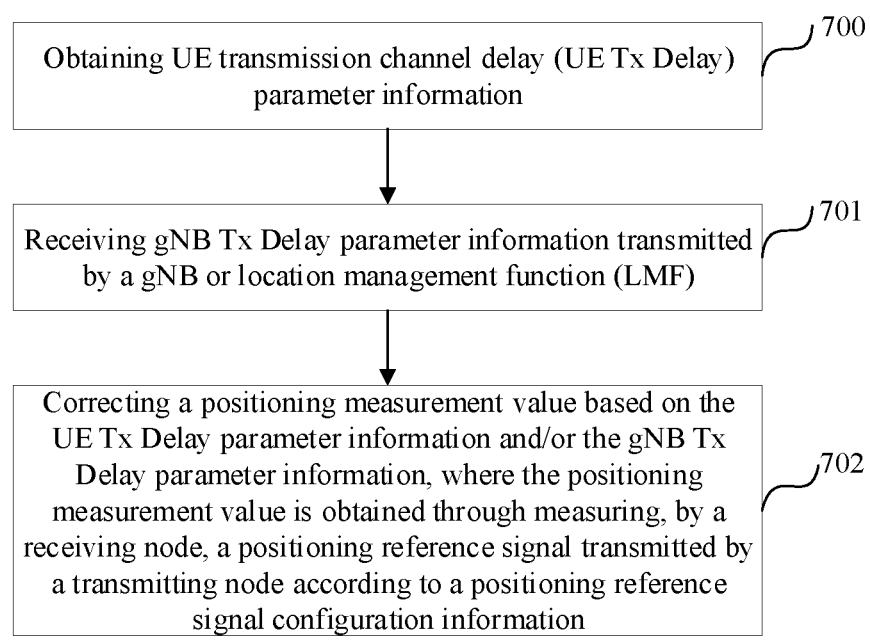
FIG. 7 is fourth schematic flowchart diagram of the method for correcting Tx delay according to an embodiment of the present application.

FIG. 7 is fourth schematic flowchart diagram of the method for correcting Tx delay according to an embodiment of the present application. The method is performed by user equipment (UE), including:
step 700, obtaining UE transmission channel delay (UE Tx Delay) parameter information.

In an embodiment, the embodiment of the present application is applicable to UE-based positioning method, and the method is performed by UE, that is, UE, as a calculation node, performs positioning calculation.

In related protocol specification, UE supports the following two positioning methods for positioning calculation: UE-based downlink time difference of arrival positioning method and UE-based multiple cell-round trip time positioning method.

First, the UE calculates and obtains UE transmission channel delay (UE Tx Delay) parameter information.
Step 701, receiving gNB Tx Delay parameter information transmitted by a gNB or location management function (LMF).

In an embodiment, in the UE-based downlink time difference of arrival positioning method, the UE needs to use the gNB Tx Delay parameter information, and in the UE-based multiple cell-round trip time positioning method, the UE needs to use the gNB Tx Delay parameter information and its UE Tx Delay parameter information.

In an embodiment, the UE can directly receive the gNB Tx Delay parameter information transmitted by the gNB, or receive the gNB Tx Delay parameter information forwarded by the LMF.

Step 702, correcting a positioning measurement value based on the UE Tx Delay parameter information and/or the gNB Tx Delay parameter information;
where the positioning measurement value is obtained through measuring, by a receiving node, a positioning reference signal transmitted by a transmitting node according to a positioning reference signal configuration information.

In an embodiment, in the UE-based downlink time difference of arrival positioning method, the transmitting node is gNB, the receiving node is the UE, the positioning reference signal is a downlink positioning reference signal, and positioning reference signal configuration information is downlink positioning reference signal configuration information. UE corrects the positioning measurement value by using the gNB Tx Delay parameter information, and the positioning measurement value is obtained through measuring, by the UE, the positioning reference signal transmitted by the gNB according to the positioning reference signal configuration information. The positioning reference signal configuration information is determined by the gNB and forwarded to the UE through LMF.

In an embodiment, in the UE-based multiple cell-round trip time positioning method, the transmitting node includes the gNB and the UE respectively, and the receiving node includes the UE and the gNB respectively, and the positioning reference signal includes downlink positioning reference signal and uplink positioning reference signal respectively, the positioning reference signal configuration information is downlink positioning reference signal configuration information and uplink positioning reference signal configuration information respectively. The UE corrects the positioning measurement value by using the gNB Tx Delay parameter information and its UE Tx Delay parameter information, and the positioning measurement value includes the positioning measurement value obtained through measuring, by the gNB, the uplink positioning reference signal transmitted by the UE according to the uplink positioning reference signal configuration information, and the positioning measurement value obtained through measuring, by the UE, the downlink positioning reference signal transmitted by the gNB according to the downlink positioning reference signal configuration information.

In an embodiment, the positioning measurement value includes, but not limited to, one or more of the following items: downlink reference signal time difference (DL RSTD), gNB Rx-Tx time difference and UE Rx-Tx time difference.

In an embodiment, the following corrections can be performed for different types of positioning methods:

1) for downlink time difference of arrival (DL-TDOA) positioning method:

$DL\ RSTD = DL\ RSTD - gNB\ Tx\ Delay;$ 2) for multiple cell-round trip time (Multi-RTT) positioning method:

$gNB\ Rx\text{-}Tx\ time\ difference = gNB\ Rx\text{-}Tx\ time\ difference - UE\ Tx\ Delay;$ $UE\ Rx\text{-}Tx\ time\ difference = UE\ Rx\text{-}Tx\ time\ difference - gNB\ Tx\ Delay.$ In an embodiment, the UE can perform positioning calculation based on the corrected positioning measurement value and a gNB antenna location of the gNB, to achieve accurate positioning.

The method for correcting Tx delay according to the embodiment of the present application is applicable to various UE-based positioning methods, and the effect of the transmission channel delay on the time related positioning measurement value can be eliminated and the positioning accuracy can be effectively improved.

Based on the above embodiments, the UE Tx Delay parameter information or the gNB Tx Delay parameter information includes an absolute group delay information of the transmission channel, a relative group delay information of the transmission channel and a quality indicator for group delay information of the transmission channel:

where the absolute group delay information of the transmission channel is a parameter related to per carrier frequency band or a carrier frequency with a certain carrier bandwidth, and represents an absolute delay of the carrier frequency band or the carrier frequency;

the relative group delay information of the transmission channel is a set of parameters associated with a sub-carrier frequency in a bandwidth covered by a carrier frequency or a frequency band; and the quality indicator for group delay information of the transmission channel includes an error parameter.

The UE Tx Delay parameter information or the gNB Tx Delay parameter information can refer to the description of Tx Delay parameter information in the above embodiments, and is not repeated here.

Based on the above embodiments, the receiving the gNB Tx Delay parameter information transmitted by a gNB or location management function (LMF) includes:

receiving gNB Tx Delay parameter information of a serving gNB, and gNB Tx Delay parameter information of a neighboring gNB forwarded by the serving gNB; or receiving the gNB Tx Delay parameter information of the serving gNB, and the gNB Tx Delay parameter information of the neighboring gNB forwarded by the LMF; or receiving the gNB Tx Delay parameter information of the serving gNB and the gNB Tx Delay parameter information of the neighboring gNB which are forwarded by the LMF.

In an embodiment, the gNB includes a serving gNB and one or more neighboring gNBs.

In an embodiment, the gNB Tx Delay parameter information of the serving gNB can be transmitted to the UE by the serving gNB itself or be forwarded to the UE through the LMF.

The gNB Tx Delay parameter information of the neighboring gNB can be forwarded to the UE through the LMF, or can be first transmitted to the serving gNB through Xn interface between the neighboring gNB and the serving gNB, and then be forwarded to the UE through the serving gNB.

Therefore, the receiving the gNB Tx Delay parameter information transmitted by the gNB or the LMF includes:

receiving a gNB Tx Delay parameter information of a serving gNB, and a gNB Tx Delay parameter information of a neighboring gNB forwarded by the serving gNB; or receiving the gNB Tx Delay parameter information of the serving gNB, and the gNB Tx Delay parameter information of the neighboring gNB forwarded by the LMF; or receiving the gNB Tx Delay parameter information of the serving gNB and the gNB Tx Delay parameter information of the neighboring gNB which are forwarded by the LMF.

In the method for correcting Tx delay according to the embodiment of the present application, by providing the gNB Tx Delay parameter information to the UE, it is convenient for the UE to eliminate the effect of gNB transmission channel delay on positioning measurement value, and the positioning accuracy can be effectively improved.

The method for correcting Tx delay according to the embodiment of the present application is further illustrated as follows from the perspectives of UE-based downlink time difference of arrival positioning method and UE-based multiple cell-round trip time positioning method.

In an embodiment, based on the above embodiments, in case that the transmitting node is a gNB, before the correcting the positioning measurement value based on the UE Tx Delay parameter information and/or the gNB Tx Delay parameter information, the method further includes:
  receiving a RequestCapabilities message transmitted by the LMF, where the RequestCapabilities message is used for requesting the UE to inform the LMF of a location function supported by the UE;
  transmitting a ProvideCapabilities message to the LMF, where the ProvideCapabilities message is used for informing the LMF of the location function supported by the UE;
  transmitting a RequestAssistanceData message to the LMF, where the RequestAssistanceData message is used for requesting the LMF to provide location assistance data;
  receiving a ProvideAssistanceData message transmitted by the LMF, where the Provide AssistanceData message is used for providing the location assistance data to the UE, and the location assistance data includes downlink positioning reference signal configuration information;
  receiving a RequestLocationInformation message transmitted by the LMF, where the RequestLocationInformation message is used for requesting the UE to measure a downlink positioning reference signal transmitted by the gNB; and
  measuring the downlink positioning reference signal transmitted by the gNB by using the downlink positioning reference signal configuration information to obtain a fifth positioning measurement value;
  the correcting the positioning measurement value based on the UE Tx Delay parameter information and/or the gNB Tx Delay parameter information includes:
  correcting the fifth positioning measurement value based on the gNB Tx Delay parameter information.

In an embodiment of the present application, UE adopts downlink time difference of arrival positioning method. UE measures the downlink positioning reference signal transmitted by the gNB according to the downlink positioning reference signal configuration information determined by the gNB to obtain the fifth positioning measurement value. UE can obtain the downlink positioning reference signal configuration information from the LMF.

In an embodiment, the UE establishes a connection with the gNB in the embodiments of the present application, and is in a radio resource control connected (RRC_CONNECTED) mode.

First, the UE receives a RequestCapabilities message transmitted by the LMF, where the RequestCapabilities message is used for requesting the UE to inform the LMF of a location function supported by the UE. In an embodiment, the RequestCapabilities message is RequestCapabilities.

The UE transmits a ProvideCapabilities message to the LMF, where the ProvideCapabilities message is used for informing the LMF of the location function supported by the UE. In an embodiment, the ProvideCapabilities message is ProvideCapabilities, and the location function supported by the UE is UE-based DL-TDOA positioning.

The UE transmits a RequestAssistanceData message to the LMF, where the RequestAssistanceData message is used for requesting the LMF to provide location assistance data. In an embodiment, the RequestAssistanceData message is RequestAssistanceData, and the location assistance data is DL TDOA location assistance data.

The UE receives a ProvideAssistanceData message transmitted by the LMF, where the ProvideAssistanceData message is used for providing the location assistance data to the UE, and the location assistance data includes downlink positioning reference signal configuration information. In an embodiment, the ProvideAssistanceData message is Provide AssistanceData.

Then, the UE receives a RequestLocationInformation message transmitted by the LMF, where the RequestLocationInformation message is used for requesting the UE to measure a downlink positioning reference signal transmitted by the gNB. In an embodiment, the RequestLocationInformation message is RequestLocationInformation.

The UE measures the downlink positioning reference signal transmitted by the gNB by using the downlink positioning reference signal configuration information to obtain a fifth positioning measurement value. In an embodiment, the fifth positioning measurement value is a downlink reference signal time difference DL RSTD or DL reference signal received power (RSRP).

The correcting the positioning measurement value based on the UE Tx Delay parameter information and/or the gNB Tx Delay parameter information includes:
  correcting the fifth positioning measurement value based on the gNB Tx Delay parameter information.

In the method for correcting transmission channel delay according to the embodiment of the present application, UE corrects the positioning measurement value by using the gNB Tx Delay parameter information, which improves the positioning accuracy of downlink time difference of arrival positioning method.

In an embodiment, based on the above embodiments, in case that the transmitting node is the gNB and the UE, before the correcting the positioning measurement value based on the UE Tx Delay parameter information and/or the gNB Tx Delay parameter information, the method further includes:
  receiving a RequestCapabilities message transmitted by the LMF, where the RequestCapabilities message is used for requesting the UE to inform the LMF of a location function supported by the UE;
  transmitting a ProvideCapabilities message to the LMF, where the ProvideCapabilities message is used for informing the LMF of the location function supported by the UE;
  transmitting a RequestAssistanceData message to the LMF, where the RequestAssistanceData message is used for requesting the LMF to provide location assistance data;
  receiving a ProvideAssistanceData message transmitted by the LMF, wherein the ProvideAssistanceData message is used for providing the location assistance data to the UE, and the location assistance data includes downlink positioning reference signal configuration information;
  receiving a RequestLocationInformation message transmitted by the LMF, where the RequestLocationInformation message is used for requesting the UE to measure a downlink positioning reference signal transmitted by the gNB;
  measuring the downlink positioning reference signal transmitted by the gNB by using the location assistance data to obtain a sixth positioning measurement value;
  receiving an uplink positioning reference signal configuration information transmitted by a serving gNB through radio resource control (RRC) signaling;
  transmitting an uplink positioning reference signal to all gNBs participating in positioning according to the RRC signaling for all the gNBs participating in positioning to measure the uplink positioning reference signal according to the uplink positioning reference signal configuration information transmitted by the LMF to obtain a seventh positioning measurement value and transmitting the seventh positioning measurement value to the UE through the LMF;

where all the gNBs participating in positioning include the serving gNB and one or more neighboring gNBs;

the correcting the positioning measurement value based on the UE Tx Delay parameter information and/or the gNB Tx Delay parameter information includes:

correcting the sixth positioning measurement value based on the gNB Tx Delay parameter information; and correcting the seventh positioning measurement value based on the UE Tx Delay parameter information.

In an embodiment of the present application, the UE adopts multiple cell-round trip time positioning method.

In an embodiment, the UE establishes a connection with the gNB in the embodiments of the present application, and is in a radio resource control connected (RRC_CONNECTED) mode.

The UE receives a RequestCapabilities message transmitted by the LMF, where the RequestCapabilities message is used for requesting the UE to inform the LMF of a location function supported by the UE. In an embodiment, the RequestCapabilities message is RequestCapabilities.

The UE transmits a ProvideCapabilities message to the LMF, where the ProvideCapabilities message is used for informing the LMF of the location function supported by the UE. In an embodiment, the ProvideCapabilities message is ProvideCapabilities, and the location function supported by the UE is UE-based Multi-RTT positioning.

The UE transmits a RequestAssistanceData message to the LMF, where the RequestAssistanceData message is used for requesting the LMF to provide location assistance data. In an embodiment, the RequestAssistanceData message is RequestAssistanceData, and the location assistance data is Multi-RTT assistance data.

The UE receives a ProvideAssistanceData message transmitted by the LMF, where the ProvideAssistanceData message is used for providing the location assistance data to the UE, and the location assistance data includes downlink positioning reference signal configuration information. In an embodiment, the ProvideAssistanceData message is ProvideAssistanceData, and the downlink positioning reference signal configuration information is determined by serving gNB.

The UE receives a RequestLocationInformation message transmitted by the LMF, where the RequestLocationInformation message is used for requesting the UE to measure a downlink positioning reference signal transmitted by the gNB. In an embodiment, the RequestLocationInformation message is RequestLocationInformation and the downlink positioning reference signal is DL PRS.

The UE measures the downlink positioning reference signal transmitted by the gNB by using the location assistance data to obtain a sixth positioning measurement value. In an embodiment, the sixth positioning measurement value is UE Rx-Tx Time Difference.

The UE receives uplink positioning reference signal configuration information transmitted by a serving gNB through radio resource control (RRC) signaling, and the serving gNB configures uplink positioning reference signal for the UE through RRC signaling. In an embodiment, the uplink positioning reference signal is UL SRS-Pos.

The UE transmits an uplink positioning reference signal to all gNBs participating in positioning according to the RRC signaling for all the gNBs participating in positioning to measure the uplink positioning reference signal according to the uplink positioning reference signal configuration information transmitted by the LMF to obtain a seventh positioning measurement value and transmitting the seventh positioning measurement value to the UE through the LMF. In an embodiment, the seventh positioning measurement value is gNB Rx-Tx Time Difference.

In an embodiment, the forwarding the seventh positioning measurement value to the UE through the LMF includes:

the UE transmits a Multi-RTT MEASUREMENT REQUEST message to the LMF, where the Multi-RTT MEASUREMENT REQUEST message is used for requesting the LMF to provide information related to Multi-RTT measurement; and the LMF transmits a Multi-RTT measurement report message to the UE, where the Multi-RTT measurement report message is used for transmitting the gNB Rx-Tx Time Difference and the gNB Tx Delay measured by the gNB to the UE.

In the method for correcting transmission channel delay according to the embodiment of the present application, UE corrects the positioning measurement value by using the gNB Tx Delay parameter information and UE Tx Delay parameter information, which improves the positioning accuracy of the multiple cell-round trip time positioning method.

Figure 8:
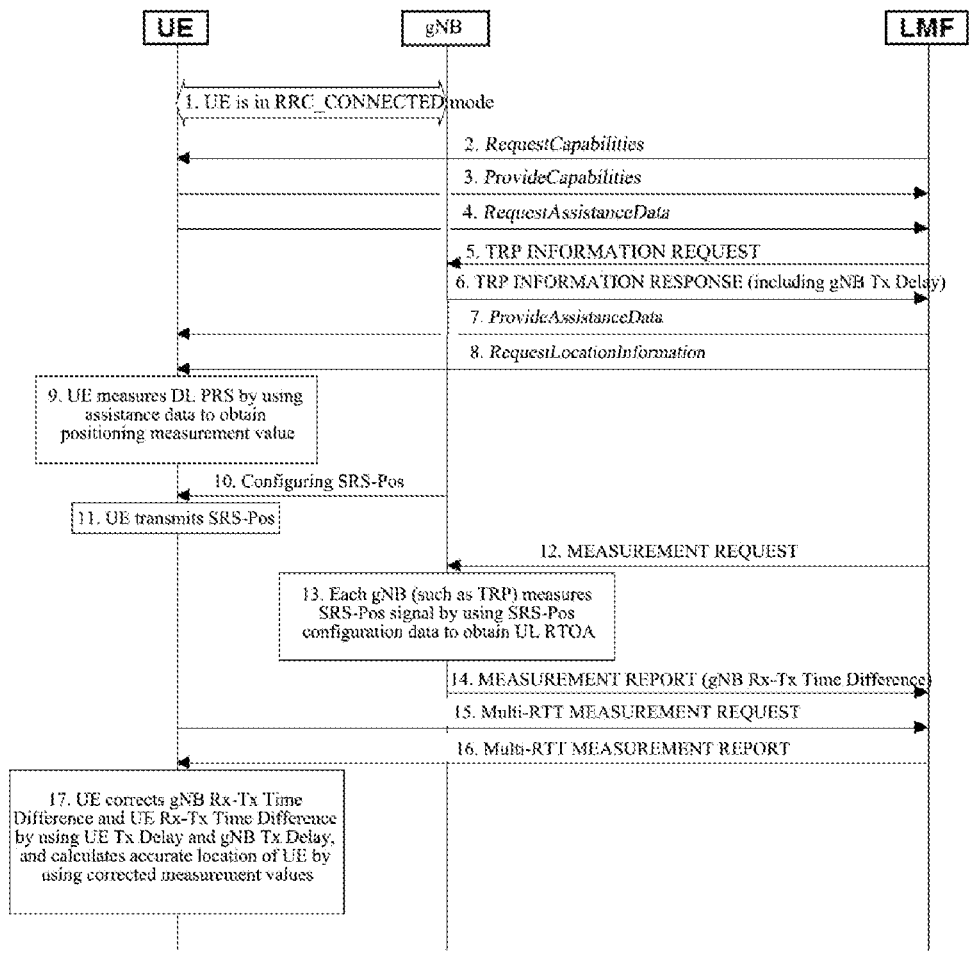
FIG. 8 is a schematic flowchart diagram of UE-based Multi-RTT positioning method according to an embodiment of the present application.

FIG. 8 is a schematic flowchart diagram of UE-based Multi-RTT positioning method according to an embodiment of the present application, and the method includes the following steps.

UE establishes a connection with a gNB and tis in a radio resource control connected (RRC_CONNECTED) mode;

LMF transmits a RequestCapabilities message to the UE to request the UE to inform the LMF of a location function supported by the UE;

the UE transmits a ProvideCapabilities message to the LMF to report that the UE supports UE-based Muti-RTT positioning;

the UE transmits a RequestAssistanceData message to the LMF to request the LMF to provide Muti-RTT assistance data;

the LMF transmits a TRP INFORMATION REQUEST message to the gNB, where for a serving gNB, the TRP INFORMATION REQUEST message simultaneously requests the serving gNB to provide TRP information (such as TRP ID and TRP antenna location coordinates, etc.), DL PRS configuration data, and UL SRS-Pos configuration data; and for a neighboring gNB, the TRP INFORMATION REQUEST message only requests the neighboring gNB to provide TRP information; and in an embodiment, the LMF can request the gNB to provide gNB Tx Delay information;

the gNB transmits a TRP INFORMATION RESPONSE message to the LMF, where for a serving gNB, the TRP INFORMATION RESPONSE message provides the LMF with DL PRS configuration data and UL SRS-Pos configuration data; and for a neighboring gNB, the TRP INFORMATION RESPONSE message provides the LMF with the TRP information of the neighboring gNB; and in an embodiment, both the serving gNB and neighboring gNB can provide LMF with gNB Tx Delay information;

the LMF transmits a Provide AssistanceData message to the UE to provide the UE with the location assistance data requested by the UE, where the location assistance data includes the DL PRS configuration data;

the LMF transmits a RequestLocationInformation message to the UE to request the UE to measure DL PRS of the gNB;

the UE measures a downlink signal by using the location assistance data (such as PRS configuration data) to obtain a positioning measurement value which includes UE reception transmission time difference (UE Rx-Tx Time Difference);

the gNB configures SRS-Pos for the UE through RRC signaling;

the UE transmits SRS-Pos to the serving gNB and neighboring gNB according to RRC signaling;

the LMF transmits a MEASUREMENT REQUEST message to each gNB participating in Multi-RTT positioning, where the MEASUREMENT REQUEST message includes UL SRS-Pos configuration data, and requests the gNB to measure the SRS-Pos transmitted by the UE and feed back a measured positioning measurement value;

all gNBs participating in Multi-RTT positioning measure SRS-Pos signal by using the UL SRS-Pos configuration data provided by the LMF to obtain the positioning measurement value;

the gNB transmits a MEASUREMENT REPORT message to the LMF, where the message includes the positioning measurement value obtained by measuring UL SRS-Pos, and the positioning measurement value includes gNB Rx-Tx time difference;

the UE transmits a Multi-RTT MEASUREMENT REQUEST message to the LMF, the Multi-RTT MEASUREMENT REQUEST message requests the LMF to provide the information related to Multi-RTT measurement;

the LMF transmits a Multi-RTT MEASUREMENT REPORT message to the UE, where the LMF transmits the gNB Rx-Tx time difference and gNB Tx Delay measured by the gNB to the UE through the Multi-RTT MEASUREMENT REPORT message; and the UE eliminates the effect of UE Tx Delay on gNB Rx-Tx time difference measurement value by using the UE Tx Delay information of the UE itself (corrected gNB Rx-Tx time difference=uncorrected gNB Rx-Tx time difference−UE Tx Delay); the UE eliminates the effect of gNB Tx Delay on UE Rx-Tx Time Difference measurement value by using the gNB Tx Delay information provided by the gNB (corrected UE Rx-Tx time difference=uncorrected UE Rx-Tx time difference−gNB Tx Delay); and then the UE calculates the accurate location of the UE by using the corrected UE Rx-Tx Time Difference and the corrected gNB Rx-Tx Time Difference.

Figure 9:
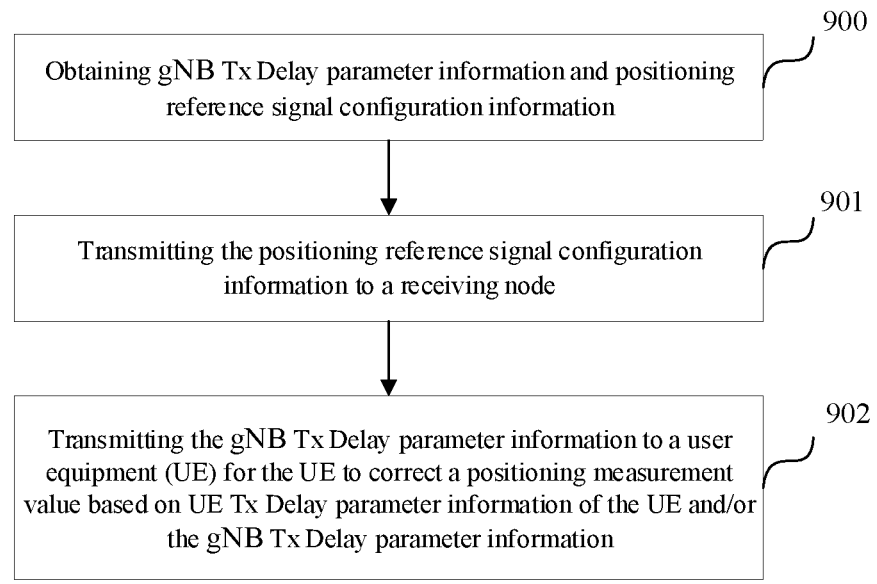
FIG. 9 is fifth schematic flowchart diagram of the method for correcting Tx delay according to an embodiment of the present application.

FIG. 9 is a fifth schematic flowchart diagram of the method for correcting Tx delay according to an embodiment of the present application. The method is performed by a location management function (LMF), including:

step 900, obtaining gNB Tx Delay parameter information and positioning reference signal configuration information.

In an embodiment, the embodiment of the present application is applicable to UE-based positioning method, that is, the user equipment (UE) still performs positioning calculation, and the method for correcting Tx delay is illustrated in detail from location management function side.

In related protocol specification, UE supports the following two positioning methods for positioning calculation: UE-based downlink time difference of arrival positioning method and UE-based multiple cell-round trip time positioning method. In the UE-based downlink time difference of arrival positioning method, the UE needs to use gNB Tx Delay parameter information, and in the UE-based multiple cell-round trip time positioning method, the UE needs to use gNB Tx Delay parameter information and its UE Tx Delay parameter information. The UE can directly receive the gNB Tx Delay parameter information transmitted by the gNB, or receive the gNB Tx Delay parameter information forwarded by the LMF. In an embodiment of the present application, the gNB Tx Delay parameter information is forwarded by the LMF.

First, the LMF obtains the gNB Tx Delay parameter information and the positioning reference signal configuration information from the gNB.

Step 901, transmitting the positioning reference signal configuration information to a receiving node.

In the UE-based downlink time difference of arrival positioning method, in case that the transmitting node is a gNB, the receiving node is the UE, and the LMF transmits the downlink positioning reference signal configuration information obtained from the gNB to the receiving node. In the UE-based multiple cell-round trip time positioning method, the transmitting node is the UE and the gNB respectively, the receiving node is the gNB and the UE, and the location management function (LMF) transmits the downlink positioning reference signal configuration information obtained from the gNB to the UE, and transmits the uplink positioning reference signal configuration information to all gNBs participating in positioning.

Step 902, transmitting the gNB Tx Delay parameter information to the UE for the UE to correct a positioning measurement value based on UE Tx Delay parameter information of the UE and/or the gNB Tx Delay parameter information.

For example, the LMF transmits the gNB Tx Delay parameter information to the UE for the UE to correct the positioning measurement value based on UE Tx Delay parameter information of the UE and/or the gNB Tx Delay parameter information.

In an embodiment, the positioning measurement value is obtained through measuring, by the receiving node, a positioning reference signal transmitted by a transmitting node according to the positioning reference signal configuration information.

The method for correcting Tx delay according to the embodiment of the present application is applicable to various UE-based positioning methods, and by forwarding the gNB Tx Delay parameter information and the positioning reference signal configuration information determined by the gNB through the location management function (LMF), the effect of transmission channel delay on the time related positioning measurement value can be eliminated and the positioning accuracy can be effectively improved.

Based on the above embodiments, the obtaining gNB Tx Delay parameter information and positioning reference signal configuration information includes:

transmitting a TRP INFORMATION REQUEST message to the gNB and receiving a TRP INFORMATION RESPONSE message transmitted by the gNB;

where for a serving gNB, the TRP INFORMATION REQUEST message is used for simultaneously requesting the serving gNB to provide the downlink positioning reference signal configuration information, uplink positioning reference signal configuration information and TRP information and gNB Tx Delay information of the serving gNB; and for a neighboring gNB, the TRP INFORMATION REQUEST message is used for requesting the neighboring gNB to provide TRP information and gNB Tx Delay information of the neighboring gNB; or for the serving gNB, the TRP INFORMATION REQUEST message is used for simultaneously requesting the serving gNB to provide downlink positioning reference signal configuration information and TRP information and gNB Tx Delay information of the serving gNB; and for the neighboring gNB, the TRP INFORMATION REQUEST message is used for requesting the neighboring gNB to provide TRP information and gNB Tx Delay information of the neighboring gNB.

In an embodiment, the gNB and the location management function (LMF) transmit gNB Tx Delay parameter information and uplink/downlink positioning reference signal configuration information based on NRPPa messages.

In an embodiment, the gNB includes a serving gNB and one or more neighboring gNBs. The uplink positioning reference signal configuration information and/or downlink positioning reference signal configuration information is determined by the serving gNB.

In an embodiment, the LMF transmits the TRP INFORMATION REQUEST message to the gNB and receives the TRP INFORMATION RESPONSE message transmitted by the gNB.

For the UE-based multiple cell-round trip time positioning method, the LMF transmits the TRP INFORMATION REQUEST message to the serving gNB, where the TRP INFORMATION REQUEST message is used for simultaneously requesting the serving gNB to provide the downlink positioning reference signal configuration information, the uplink positioning reference signal configuration information, and the TRP information and the gNB Tx Delay information of the serving gNB: receives the TRP INFORMATION RESPONSE message transmitted by the serving gNB, where the TRP INFORMATION RESPONSE message is used for providing the location management function (LMF) with the downlink positioning reference signal configuration information, the uplink positioning reference signal configuration information, and the TRP information and gNB Tx Delay information of the serving gNB; transmits the TRP INFORMATION REQUEST message to the neighboring gNB, where the TRP INFORMATION REQUEST message is used for requesting the neighboring gNB to provide the TRP information and the gNB Tx Delay information of the neighboring gNB; and receives the TRP INFORMATION RESPONSE message transmitted by the neighboring gNB, where the TRP INFORMATION RESPONSE message is used for providing the location management function (LMF) with the TRP information and the gNB Tx Delay information of the neighboring gNB; or for the UE-based downlink time difference of arrival positioning method, the LMF transmits the TRP INFORMATION REQUEST message to the serving gNB, where the TRP INFORMATION REQUEST message is used for simultaneously requesting the serving gNB to provide the downlink positioning reference signal configuration information, and the TRP information and the gNB Tx Delay information of the serving gNB: receives the TRP INFORMATION RESPONSE message transmitted by the serving gNB, where the TRP INFORMATION RESPONSE message is used for providing the location management function (LMF) with the downlink positioning reference signal configuration information, and the TRP information and gNB Tx Delay information of the serving gNB: transmits the TRP INFORMATION REQUEST message to the neighboring gNB, where the TRP INFORMATION REQUEST message is used for requesting the neighboring gNB to provide the TRP information and the gNB Tx Delay information of the neighboring gNB; and receives the TRP INFORMATION RESPONSE message transmitted by the neighboring gNB, where the TRP INFORMATION RESPONSE message is used for providing the location management function (LMF) with the TRP information and the gNB Tx Delay information of the neighboring gNB.

Based on the above embodiments, the method further includes:

transmitting a RequestCapabilities message to the UE, where the RequestCapabilities message is used for requesting the UE to inform the LMF of a location function supported by the UE;

receiving a ProvideCapabilities message transmitted by the UE, where the ProvideCapabilities message is used for informing the LMF of the location function supported by the UE;

receiving a RequestAssistanceData message transmitted by the UE, where the RequestAssistanceData message is used for requesting the LMF to provide location assistance data;

transmitting a ProvideAssistanceData message to the UE, where the Provide AssistanceData message is used for providing the location assistance data to the UE, and the location assistance data includes the downlink positioning reference signal configuration information; and transmitting a RequestLocationInformation message to the UE for the UE to measure the downlink positioning reference signal transmitted by a gNB by using the location assistance data, where the RequestLocationInformation message is used for requesting the UE to measure a downlink positioning reference signal transmitted by a gNB.

In an embodiment, the embodiment of the present application is applicable to UE-based downlink time difference of arrival positioning method, and the method for correcting Tx delay according to these embodiments of the present application can be similar to the relevant description and understanding in the above embodiments of the method for correcting transmission channel delay performed by UE for UE-based positioning methods, which is not repeated here.

In the method for correcting Tx delay according to the embodiment of the present application, by providing the UE with the gNB Tx Delay parameter information, the positioning accuracy can be effectively improved.

Based on the above embodiments, after the transmitting the RequestLocationInformation message to the UE, the method further includes:

transmitting a MEASUREMENT REQUEST message to all gNBs participating in positioning, where the MEASUREMENT REQUEST message includes uplink positioning reference signal configuration information for all the gNBs participating in positioning to measure uplink positioning reference signal transmitted by the UE and reporting measured positioning measurement values; and receiving the positioning measurement values transmitted by all the gNBs participating in positioning, and transmitting the positioning measurement values transmitted by all the gNBs participating in positioning to the UE.

In an embodiment, the embodiment of the present application is applicable to UE-based multiple cell-round trip time positioning method.

The LMF transmits the RequestCapabilities message to the UE, where the RequestCapabilities message is used for requesting the UE to inform the LMF of the location function supported by the UE. In an embodiment, the RequestCapabilities message is RequestCapabilities.

The LMF receives the ProvideCapabilities message transmitted by the UE, where the ProvideCapabilities message is used for informing the LMF of the location function supported by the UE. In an embodiment, the ProvideCapabilities message is ProvideCapabilities, and the location function supported by the UE is UE-based Multi-RTT positioning.

The LMF receives the RequestAssistanceData message transmitted by the UE, where the RequestAssistanceData message is used for requesting the LMF to provide location assistance data. In an embodiment, the RequestAssistanceData message is a RequestAssistanceData message, and the location assistance data is Multi-RTT location assistance data.

The LMF transmits the Provide AssistanceData message to the UE, where the Provide AssistanceData message is used for providing the location assistance data to the UE, and the location assistance data includes the downlink positioning reference signal configuration information. In an embodiment, the ProvideAssistanceData message is a ProvideAssistanceData message, and the location assistance data is Multi-RTT location assistance data.

The LMF transmits the RequestLocationInformation message to the UE, where the RequestLocationInformation message is used for requesting the UE to measure the downlink positioning reference signal transmitted by a gNB for the UE to measure the downlink positioning reference signal transmitted by a gNB by using the location assistance data. In an embodiment, the RequestLocationInformation message is RequestLocationInformation, and the downlink positioning reference signal is DL PRS.

The LMF transmits the MEASUREMENT REQUEST message to all gNBs participating in positioning, where the MEASUREMENT REQUEST message includes the uplink positioning reference signal configuration information, and is used for requesting all the gNBs participating in positioning to measure uplink positioning reference signal transmitted by the UE and report measured positioning measurement values. In an embodiment, the MEASUREMENT REQUEST message a MEASUREMENT REQUEST message, and the uplink positioning reference signal is UL SRS-Pos.

The LMF receives the positioning measurement values transmitted by all the gNBs participating in positioning, and transmits the positioning measurement values transmitted by all the gNBs participating in positioning to the UE, all the gNBs participating in Multi-RTT positioning measure the SRS-Pos signal by using the UL SRS-Pos configuration data provided by the LMF to obtain the positioning measurement values. The gNBs transmit measurement report messages to the LMF, where the MEASUREMENT REPORT message includes the positioning measurement value obtained through measurement. In an embodiment, the MEASUREMENT REPORT message is MEASUREMENT REPORT.

The method for correcting Tx delay according to the embodiment of the present application can effectively improve the positioning accuracy.

Figure 10:
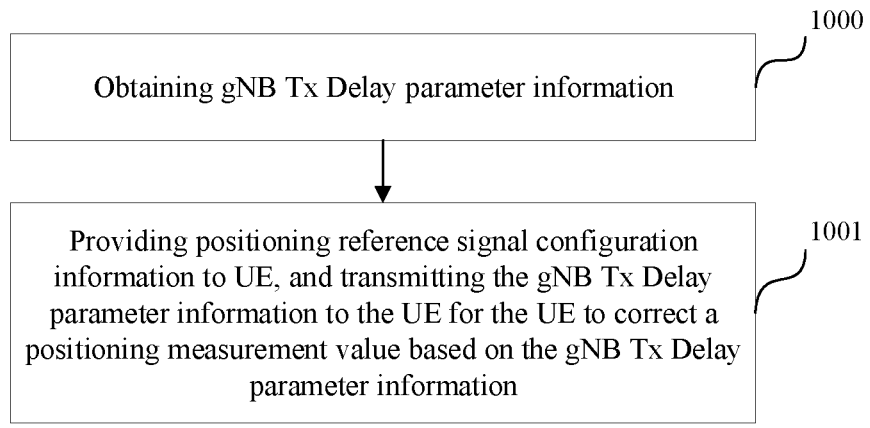
FIG. 10 is sixth schematic flowchart diagram of the method for correcting Tx delay according to an embodiment of the present application.

FIG. 10 is a sixth schematic flowchart diagram of the method for correcting Tx delay according to an embodiment of the present application. The method is performed by a gNB, including:

step 1000, obtaining gNB transmission channel delay (gNB Tx Delay) parameter information.

In an embodiment, the gNB determines the corresponding transmission channel delay (gNB Tx Delay) parameter information.

Step 1001, providing positioning reference signal configuration information to user equipment (UE), and transmitting the gNB Tx Delay parameter information to the UE for the UE to correct a positioning measurement value based on the gNB Tx Delay parameter information;

where the positioning measurement value is obtained through, by the UE, a downlink positioning reference signal transmitted by the gNB according to downlink positioning reference signal configuration information, and/or, the positioning measurement value is obtained through measuring, by the gNB, an uplink positioning reference signal transmitted by the UE according to uplink positioning reference signal configuration information The embodiment of the present application is applicable to UE-based positioning method, that is, the user equipment (UE) still performs positioning calculation, and the method for correcting Tx delay is further illustrated in detail from gNB side. The method for correcting Tx delay according to these embodiments of the present application can be similar to the relevant description and understanding in the above embodiments of the method for correcting transmission channel delay performed by UE for UE-based positioning methods, which is not repeated here.

The method for correcting transmission channel delay according to the embodiment of the present application is applicable to various UE-based positioning methods, and can eliminate the effect of transmission channel delay on time related positioning measurement value, and positioning accuracy can be effectively improved.

Based on the above embodiments, the providing positioning reference signal configuration information to user equipment (UE) includes:

generating downlink positioning reference signal configuration information and forwarding the downlink positioning reference signal configuration information to the UE through the LMF for the UE to measure the downlink positioning reference signal transmitted by the gNB according to the downlink positioning reference signal configuration information; or generating uplink positioning reference signal configuration information and downlink positioning reference signal configuration information, and transmitting them to the LMF for the LMF to transmit the downlink positioning reference signal configuration information to the UE and transmitting the uplink positioning reference signal configuration information to all gNBs participating in positioning;

where the gNB configures the uplink positioning reference signal configuration information for the UE through radio resource control (RRC) signaling for the UE to transmit the uplink positioning reference signal to the gNB through the RRC signaling according to the uplink positioning reference signal configuration information.

The method for correcting Tx delay according to these embodiments of the present application can be similar to the relevant description and understanding in the above embodiments of the method for correcting transmission channel delay performed by UE for UE-based positioning methods, which is not repeated here.

Based on the above embodiments, the gNB includes a serving gNB and one or more neighboring gNBs, and the transmitting the gNB Tx Delay parameter information to the UE includes:
- directly transmitting, by the serving gNB, its gNB Tx Delay parameter information to the UE, or forwarding the gNB Tx Delay parameter information of the serving gNB to the UE through LMF; and
- forwarding gNB Tx Delay parameter information of the neighboring gNB to the UE through the serving gNB or the LMF.

Based on the above embodiments, the providing positioning reference signal configuration information to user equipment (UE) and transmitting the gNB Tx Delay parameter information to the UE includes:
- receiving a TRP INFORMATION REQUEST message transmitted by LMF and transmitting a TRP INFORMATION RESPONSE message to the LMF;
- where for the serving gNB, the TRP INFORMATION REQUEST message is used for simultaneously requesting the serving gNB to provide downlink positioning reference signal configuration information, uplink positioning reference signal configuration information, and TRP information and gNB Tx Delay information of the serving gNB; and for the neighboring gNB, the TRP INFORMATION REQUEST message is used for requesting the neighboring gNB to provide TRP information and gNB Tx Delay information of the neighboring gNB; or
- for the serving gNB, the TRP INFORMATION REQUEST message is used for simultaneously requesting the serving gNB to provide downlink positioning reference signal configuration information and TRP information and gNB Tx Delay information of the serving gNB; and for the neighboring gNB, the TRP INFORMATION REQUEST message is used for requesting the neighboring gNB to provide TRP information and gNB Tx Delay information of the neighboring gNB.

The method for correcting Tx delay according to these embodiments of the present application can be similar to the relevant description and understanding in the above embodiments of the method for correcting transmission channel delay performed by UE for UE-based positioning methods, which is not repeated here.

Figure 11:
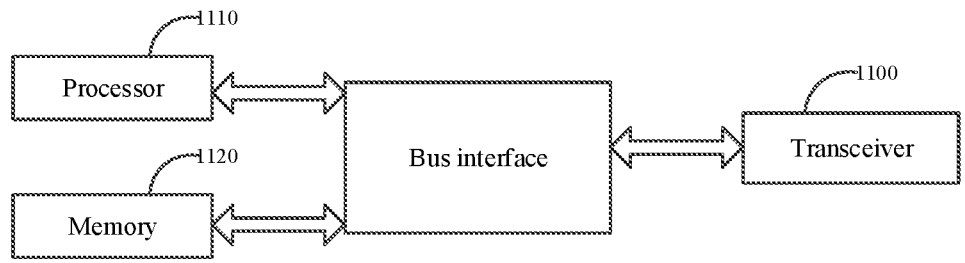
FIG. 11 is first schematic structural diagram of a location management function (LMF) according to an embodiment of the present application.

FIG. 11 is a first schematic structural diagram of a location management function (LMF) according to an embodiment of the present application, including memory 1120, transceiver 1100 and processor 1110;
- where the transceiver 1100 is used for receiving and transmitting data under the control of the processor 1110.

In FIG. 11, a bus architecture can include any number of interconnected buses and bridges, which are linked together through various circuits of one or more processors represented by the processor 1110 and one or more memories represented by the memory 1120. The bus architecture can further link together various other circuits, such as peripherals, voltage regulators, and power management circuits. The bus interface provides an interface. Transceiver 1100 can be multiple elements, i.e., including a transmitter and a receiver, and the transceiver 1100 provides devices for communicating with various other devices over transmission media including wireless channels, wired channels, fiber optic cables, and the like. The processor 1110 is responsible for managing the bus architecture and general processing, and the memory 1120 can store data used by the processor 1110 when operations are performed.

The processor 1110 can be a central processing unit (CPU), an application specific integrated circuit (ASIC), a field-programmable gate array (FPGA), or a complex programmable logic device (CPLD), the processor can also use a multi-core architecture.

The processor 1110 is used for reading the computer program in the memory and performing the following operations:
- receiving a transmission channel delay (Tx Delay) parameter information transmitted by a transmitting node and transmitting a positioning reference signal configuration information to a receiving node;
- correcting a positioning measurement value based on the Tx Delay parameter information; and
- where the positioning measurement value is obtained through measuring, by the receiving node, a positioning reference signal transmitted by the transmitting node according to the positioning reference signal configuration information.

The location management function (LMF) according to the embodiment of the present application can implement all the method steps implemented by the above-mentioned method embodiments, and can achieve the same effect. The same parts and beneficial effects as the same method embodiments are not repeated here.

In an embodiment, based on the above embodiments, the transmitting node is a next generation Node B (gNB) and/or user equipment (UE),
- in case that the transmitting node is a gNB, the Tx Delay parameter information is gNB Tx Delay parameter information, the receiving node includes the UE, and the positioning reference signal is a downlink positioning reference signal;
- in case that the transmitting node is the UE, the Tx Delay parameter information is UE Tx Delay parameter information, the receiving node is the gNB, and the positioning reference signal is an uplink positioning reference signal; and
- in case that the transmitting node includes the gNB and the UE, the Tx Delay parameter information includes gNB Tx Delay parameter information and UE Tx Delay parameter information, the receiving node includes the UE and the gNB, and the positioning reference signal includes a downlink positioning reference signal and an uplink positioning reference signal.

In an embodiment, based on the above embodiments, in case that the transmitting node is a gNB, the receiving the transmission channel delay (Tx Delay) parameter information transmitted by the transmitting node and transmitting the positioning reference signal configuration information to the receiving node includes:
- transmitting a TRP INFORMATION REQUEST message to the gNB, where the TRP INFORMATION REQUEST message is used for requesting the gNB to provide its TRP information, downlink positioning reference signal configuration information and gNB Tx Delay parameter information;
- receiving the TRP information, the downlink positioning reference signal configuration information and the gNB Tx Delay parameter information; and
- transmitting a ProvideAssistanceData message to UE, where the ProvideAssistanceData message includes the downlink positioning reference signal configuration information for the UE to measure the downlink positioning reference signal transmitted by the gNB according to the downlink positioning reference signal configuration information to obtain a first positioning measurement value;

the correcting the positioning measurement value based on the Tx Delay parameter information includes:

correcting the first positioning measurement value based on the gNB Tx Delay parameter information.

In an embodiment, based on the above embodiments, before the transmitting the TRP INFORMATION REQUEST message to the gNB, the processor 1110 further performs the following operations:

transmitting a RequestCapabilities message to the UE, where the RequestCapabilities message is used for requesting the UE to inform the LMF of a location function supported by the UE;

receiving a ProvideCapabilities message transmitted by the UE, where the ProvideCapabilities message is used for informing the LMF of the location function supported by the UE; and receiving a RequestAssistanceData message transmitted by the UE, where the RequestAssistanceData message is used for requesting the LMF to provide location assistance data to the UE.

In an embodiment, based on the above embodiments, in case that the transmitting node is the UE, the receiving the Tx Delay parameter information transmitted by the transmitting node and transmitting the positioning reference signal configuration information to the receiving node includes:

receiving UE Tx Delay parameter information obtained by the UE;

transmitting a TRP INFORMATION REQUEST message to gNB, where the TRP INFORMATION REQUEST message is used for requesting the gNB to provide TRP information and uplink positioning reference signal configuration information;

receiving the TRP information and the uplink positioning reference signal configuration information; and transmitting a MEASUREMENT REQUEST message to the gNB, where the MEASUREMENT REQUEST message includes the uplink positioning reference signal configuration information for the gNB to measure an uplink positioning reference signal transmitted by the UE according to the uplink positioning reference signal configuration information to obtain a second positioning measurement value;

the correcting the positioning measurement value based on the Tx Delay parameter information includes:

correcting the second positioning measurement value based on the UE Tx Delay parameter information.

In an embodiment, based on the above embodiments, before the receiving UE Tx Delay parameter information obtained by the UE, the processor 1110 further performs the following operations:

transmitting a RequestCapabilities message to the UE, where the RequestCapabilities message is used for requesting the UE to inform the LMF of a location function supported by the UE and whether the UE is configured to provide the UE Tx Delay parameter information;

receiving a ProvideCapabilities message transmitted by the UE, where the ProvideCapabilities message is used for informing the LMF of the location function supported by the UE and whether the UE is configured to provide the UE Tx Delay parameter information; and transmitting a RequestUETxDelay message to the UE, where the RequestUETxDelay message is used for requesting the UE to provide the UE Tx Delay parameter information.

In an embodiment, based on the above embodiments, in case that the transmitting node is the gNB and the UE, the receiving the transmission channel delay (Tx Delay) parameter information transmitted by the transmitting node and transmitting the positioning reference signal configuration information to the receiving node includes:

receiving UE Tx Delay parameter information obtained by the UE;

transmitting a TRP INFORMATION REQUEST message to the gNB, where the TRP INFORMATION REQUEST message is used for requesting the gNB to provide TRP information, downlink positioning reference signal configuration information, uplink positioning reference signal configuration information and gNB Tx Delay parameter information;

receiving the TRP information, the downlink positioning reference signal configuration information, the uplink positioning reference signal configuration information and the gNB Tx Delay parameter information;

transmitting a ProvideAssistanceData message to the UE, where the ProvideAssistanceData message includes the downlink positioning reference signal configuration information for the UE to measure the downlink positioning reference signal transmitted by the gNB according to the downlink positioning reference signal configuration information to obtain a third positioning measurement value;

transmitting a MEASUREMENT REQUEST message to the gNB, where the MEASUREMENT REQUEST message includes the uplink positioning reference signal configuration information for the gNB to measure an uplink positioning reference signal transmitted by the UE according to the uplink positioning reference signal configuration information to obtain a fourth positioning measurement value;

the correcting the positioning measurement value based on the Tx Delay parameter information includes:

correcting the third positioning measurement value based on the gNB Tx Delay parameter information; and correcting the fourth positioning measurement value based on the UE Tx Delay parameter information.

In an embodiment, based on the above embodiments, the processor 1110 further performs the following operations:

transmitting a RequestCapabilities message to the UE, where the RequestCapabilities message is used for requesting the UE to inform the LMF of a location function supported by the UE and whether the UE is configured to provide the UE Tx Delay parameter information;

receiving a ProvideCapabilities message transmitted by the UE, where the ProvideCapabilities message is used for informing the LMF of the location function supported by the UE and whether the UE is configured to provide the UE Tx Delay parameter information;

transmitting a RequestUETxDelay message to the UE, where the RequestUETxDelay message is used for requesting the UE to provide the UE Tx Delay parameter information; and receiving a RequestAssistanceData message transmitted by the UE, where the RequestAssistanceData message is used for requesting the LMF to provide location assistance data to the UE.

In an embodiment, based on the above embodiments, the gNB includes a serving gNB and one or more neighboring gNBs, and the positioning reference signal configuration information is determined by the serving gNB.

In an embodiment, based on the above embodiments, the Tx Delay parameter information includes an absolute group delay information of the transmission channel, a relative group delay information of the transmission channel and a quality indicator for group delay information of the transmission channel:

where the absolute group delay information of the transmission channel is a parameter related to per carrier frequency band or a carrier frequency with a certain carrier bandwidth, and represents an absolute delay of the carrier frequency band or the carrier frequency;

the relative group delay information of the transmission channel is a set of parameters associated with a subcarrier frequency in a bandwidth covered by a carrier frequency or a frequency band; and the quality indicator for group delay information of the transmission channel includes an error parameter.

The LMF according to above embodiments of the present application can perform all the method steps implemented by the above-mentioned method embodiments, and can achieve the same effect. The same parts and beneficial effects as the same method embodiments are not repeated here.

Figure 12:
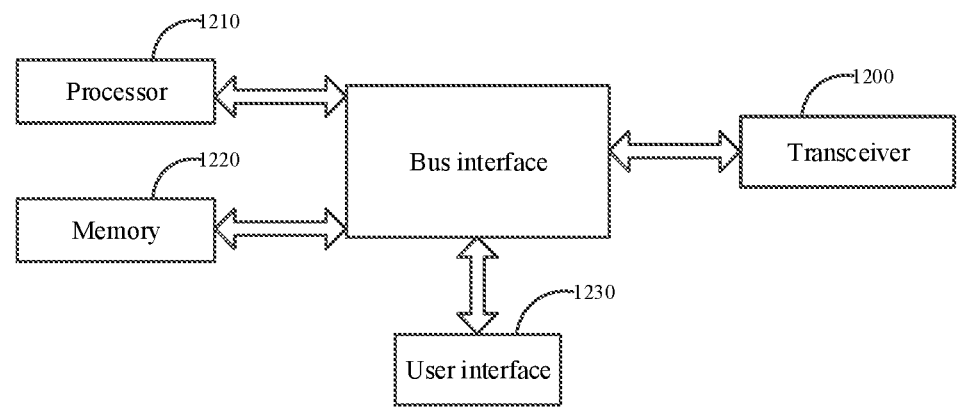
FIG. 12 is first schematic structural diagram of a user equipment (UE) according to an embodiment of the present application.

FIG. 12 is a first schematic structural diagram of a user equipment (UE) according to an embodiment of the present application, including: a memory 1220, a transceiver 1200 and a processor 1210;

where the transceiver 1200 is used for receiving and transmitting data under the control of the processor 1210.

In FIG. 12, a bus architecture can include any number of interconnected buses and bridges, which are linked together through various circuits of one or more processors represented by the processor 1210 and one or more memories represented by the memory 1220. The bus architecture can further link together various other circuits, such as peripherals, voltage regulators, and power management circuits. The bus interface provides an interface. Transceiver 1200 can be multiple elements, i.e., including a transmitter and a receiver, and the transceiver 1200 provides devices for communicating with various other devices over transmission media including wireless channels, wired channels, fiber optic cables, and the like. For different user equipments, the user interface 1230 can be an interface capable of externally or internally connecting the required equipment, and the connected equipment includes, but not limited to, a keypad, a display, a speaker, a microphone, a joystick, and the like.

The processor 1210 is responsible for managing the bus architecture and general processing, and the memory 1220 can store data used by the processor 1210 when performing operations.

The processor 1210 can be a central processing unit (CPU), an application specific integrated circuit (ASIC), a field-programmable gate array (FPGA), or a complex programmable logic device (CPLD), the processor can also use a multi-core architecture.

The processor 1210 is used for reading the computer program in the memory 1220 and performing the following operations;

obtaining UE transmission channel delay (UE Tx Delay) parameter information; transmitting the UE Tx Delay parameter information to a location management function (LMF) for the LMF to correct a positioning measurement value based on the UE Tx Delay parameter information; and where the positioning measurement value is obtained through measuring, by a gNB, an uplink positioning reference signal transmitted by the UE according to uplink positioning reference signal configuration information, and/or, the positioning measurement value is obtained through measuring, by the UE, a downlink positioning reference signal transmitted by the gNB according to downlink positioning reference signal configuration information.

In an embodiment, based on the above embodiments, the transmitting the UE Tx Delay parameter information to the LMF includes:

receiving a RequestCapabilities message transmitted by the LMF, where the RequestCapabilities message is used for requesting the UE to inform the LMF of a location function supported by the UE and whether the UE is configured to provide the UE Tx Delay parameter information;

transmitting a ProvideCapabilities message to the LMF, where the ProvideCapabilities message is used for informing the LMF of the location function supported by the UE and whether the UE is configured to provide the UE Tx Delay parameter information;

receiving a RequestUETxDelay message transmitted by the LMF, where the RequestUETxDelay message is used for requesting the UE to provide the UE Tx Delay parameter information; and transmitting a Provide UETxDelay message to the LMF, where the Provide UETxDelay message includes the UE Tx Delay parameter information.

In an embodiment, based on the above embodiments, after the transmitting the Provide UETxDelay message to the LMF, the processor 1210 further performs the following operations:

receiving an uplink positioning reference signal configuration information transmitted by a gNB through radio resource control (RRC) signaling, and transmitting an uplink positioning reference signal to the gNB for the gNB to measure the uplink positioning reference signal and transmitting a measured positioning measurement value to the LMF for the LMF to correct the positioning measurement value based on the UE Tx Delay parameter information.

In an embodiment, based on the above embodiments, after the transmitting the Provide UETxDelay message to the LMF, the processor 1210 further performs the following operations:

transmitting the UE Tx Delay parameter information to the LMF;

transmitting a RequestAssistanceData message to the LMF, where the RequestAssistanceData message is used for requesting the LMF to provide location assistance data;

receiving a Provide AssistanceData message transmitted by the LMF, where the ProvideAssistanceData message includes downlink positioning reference signal configuration information;

measuring a downlink positioning reference signal transmitted by a gNB according to the downlink positioning reference signal configuration information to obtain a third positioning measurement value, and transmitting the third positioning measurement value to the LMF for the LMF to correct the third positioning measurement value based on the gNB Tx Delay parameter information; and receiving uplink positioning reference signal configuration information transmitted by the gNB through RRC signaling, and transmitting an uplink positioning reference signal to the gNB for the gNB to measure the uplink positioning reference signal to obtain a fourth positioning measurement value and transmitting the fourth positioning measurement value to the LMF for the LMF to correct the fourth positioning measurement value based on the UE Tx Delay parameter information.

It should be noted that the user equipment (UE) according to the embodiment of the present application can implement all the method steps implemented by the above-mentioned method embodiments, and can achieve the same effect. The same parts and beneficial effects as the same method embodiments are not repeated here.

Figure 13:
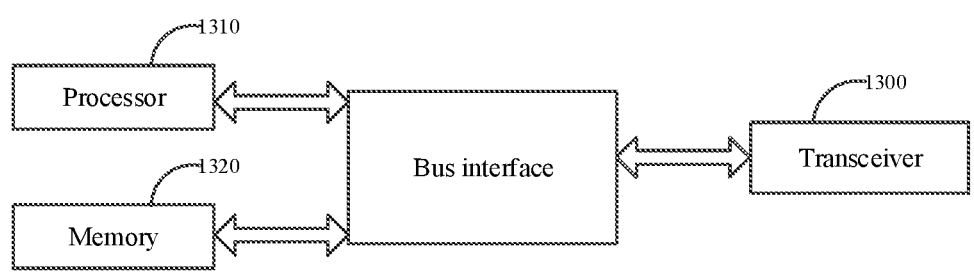
FIG. 13 is first schematic structural diagram of a gNB according to an embodiment of the present application.

FIG. 13 is a first schematic structural diagram of a gNB according to an embodiment of the present application, including: a memory 1320, a transceiver 1300 and a processor 1310;

where the transceiver 1300 is used for receiving and transmitting data under the control of the processor 1310.

In FIG. 13, a bus architecture can include any number of interconnected buses and bridges, which are linked together through various circuits of one or more processors represented by the processor 1310 and one or more memories represented by the memory 1320. The bus architecture can further link together various other circuits, such as peripherals, voltage regulators, and power management circuits. The bus interface provides an interface. Transceiver 1300 can be multiple elements, i.e., including a transmitter and a receiver, and the transceiver 1300 provides devices for communicating with various other devices over transmission media including wireless channels, wired channels, fiber optic cables, and the like. The processor 1310 is responsible for managing the bus architecture and general processing, and the memory 1320 can store data used by the processor 1310 when performing operations.

The processor 1310 can be a central processing unit (CPU), an application specific integrated circuit (ASIC), a field-programmable gate array (FPGA), or a complex programmable logic device (CPLD), the processor can also use a multi-core architecture.

The processor 1310 is used for reading the computer program in the memory and performing the following operations;

obtaining gNB transmission channel delay (gNB Tx Delay) parameter information;

transmitting the gNB Tx Delay parameter information to a location management function (LMF) for the LMF to correct a positioning measurement value based on the gNB Tx Delay parameter information; and where the positioning measurement value is obtained through measuring, by a user equipment (UE), a downlink positioning reference signal transmitted by the gNB according to downlink positioning reference signal configuration information, and/or, the positioning measurement value is obtained through measuring, by the gNB, an uplink positioning reference signal transmitted by the UE according to uplink positioning reference signal configuration information.

In an embodiment, based on the above embodiments, the transmitting the gNB Tx Delay parameter information to the location management function (LMF) includes:

receiving a TRP INFORMATION REQUEST message transmitted by the LMF and transmitting a TRP INFORMATION RESPONSE message to the LMF;

where the TRP INFORMATION REQUEST message is used for requesting the gNB to provide its TRP information, downlink positioning reference signal configuration information and gNB Tx Delay parameter information, and the TRP INFORMATION RESPONSE message includes the TRP information, the downlink positioning reference signal configuration information and the gNB Tx Delay parameter information; or the TRP INFORMATION REQUEST message is used for requesting the gNB to provide TRP information, downlink positioning reference signal configuration information, uplink positioning reference signal configuration information and gNB Tx Delay parameter information, and the TRP INFORMATION RESPONSE message includes the TRP information, the downlink positioning reference signal configuration information, the uplink positioning reference signal configuration information and the gNB Tx Delay parameter information.

In an embodiment, based on the above embodiments, the gNB includes a serving gNB and one or more neighboring gNBs, and the uplink positioning reference signal configuration information and/or the downlink positioning reference signal configuration information is determined by the serving gNB.

It should be noted that the gNB according to the above embodiments of the present application can implement all the method steps implemented by the above-mentioned method embodiments, and can achieve the same effect. The same parts and beneficial effects as the same method embodiments are not repeated here.

An embodiment of the present application provides a user equipment (UE), including: a memory, a transceiver and a processor:

where the memory is used for storing a computer program; the transceiver is used for receiving and transmitting data under the control of the processor; and the processor is used for reading the computer program in the memory and performing the following operations;

obtaining UE transmission channel delay (UE Tx Delay) parameter information;

receiving gNB Tx Delay parameter information transmitted by a gNB or LMF;

correcting a positioning measurement value based on the UE Tx Delay parameter information and/or the gNB Tx Delay parameter information; and where the positioning measurement value is obtained through measuring, by a receiving node, a positioning reference signal transmitted by a transmitting node according to a positioning reference signal configuration information.

In an embodiment, the receiving the gNB Tx Delay parameter information transmitted by a gNB or location management function (LMF) includes:

receiving gNB Tx Delay parameter information of a serving gNB, and gNB Tx Delay parameter information of a neighboring gNB forwarded by the serving gNB; or receiving the gNB Tx Delay parameter information of the serving gNB, and the gNB Tx Delay parameter information of the neighboring gNB forwarded by the LMF; or receiving the gNB Tx Delay parameter information of the serving gNB and the gNB Tx Delay parameter information of the neighboring gNB which are forwarded by the LMF.

In an embodiment, in case that the transmitting node is a gNB, before the correcting the positioning measurement value based on the UE Tx Delay parameter information and/or the gNB Tx Delay parameter information, the processor further performs the following operations:

receiving a RequestCapabilities message transmitted by the LMF, where the RequestCapabilities message is used for requesting the UE to inform the LMF of a location function supported by the UE;

transmitting a ProvideCapabilities message to the LMF, where the ProvideCapabilities message is used for informing the LMF of the location function supported by the UE;

transmitting a RequestAssistanceData message to the LMF, where the RequestAssistanceData message is used for requesting the LMF to provide location assistance data;

receiving a ProvideAssistanceData message transmitted by the LMF, where the Provide AssistanceData message is used for providing the location assistance data to the UE, and the location assistance data includes downlink positioning reference signal configuration information;

receiving a RequestLocationInformation message transmitted by the LMF, where the RequestLocationInformation message is used for requesting the UE to measure a downlink positioning reference signal transmitted by the gNB;

measuring the downlink positioning reference signal transmitted by the gNB by using the downlink positioning reference signal configuration information to obtain a fifth positioning measurement value;

the correcting the positioning measurement value based on the UE Tx Delay parameter information and/or the gNB Tx Delay parameter information includes:

correcting the fifth positioning measurement value based on the gNB Tx Delay parameter information.

In an embodiment, in case that the transmitting node is the gNB and the UE, before the correcting the positioning measurement value based on the UE Tx Delay parameter information and/or the gNB Tx Delay parameter information, the processor further performs the following operations:

receiving a RequestCapabilities message transmitted by the LMF, where the RequestCapabilities message is used for requesting the UE to inform the LMF of a location function supported by the UE;

transmitting a ProvideCapabilities message to the LMF, where the ProvideCapabilities message is used for informing the LMF of the location function supported by the UE;

transmitting a RequestAssistanceData message to the LMF, where the RequestAssistanceData message is used for requesting the LMF to provide location assistance data;

receiving a ProvideAssistanceData message transmitted by the LMF, where the ProvideAssistanceData message is used for providing the location assistance data to the UE, and the location assistance data includes downlink positioning reference signal configuration information;

receiving a RequestLocationInformation message transmitted by the LMF, where the RequestLocationInformation message is used for requesting the UE to measure a downlink positioning reference signal transmitted by the gNB;

measuring the downlink positioning reference signal transmitted by the gNB by using the location assistance data to obtain a sixth positioning measurement value;

receiving an uplink positioning reference signal configuration information transmitted by a serving gNB through radio resource control (RRC) signaling;

transmitting an uplink positioning reference signal to all gNBs participating in positioning according to the RRC signaling for all the gNBs participating in positioning to measure the uplink positioning reference signal according to the uplink positioning reference signal configuration information transmitted by the LMF to obtain a seventh positioning measurement value and transmitting the seventh positioning measurement value to the UE through the LMF;

where all the gNBs participating in positioning include the serving gNB and one or more neighboring gNBs;

the correcting the positioning measurement value based on the UE Tx Delay parameter information and/or the gNB Tx Delay parameter information includes:

correcting the sixth positioning measurement value based on the gNB Tx Delay parameter information; and correcting the seventh positioning measurement value based on the UE Tx Delay parameter information.

In an embodiment, the UE Tx Delay parameter information or the gNB Tx Delay parameter information includes an absolute group delay information of the transmission channel, a relative group delay information of the transmission channel and a quality indicator for group delay information of the transmission channel:

where the absolute group delay information of the transmission channel is a parameter related to per carrier frequency band or a carrier frequency with a certain carrier bandwidth, and represents an absolute delay of the carrier frequency band or the carrier frequency;

the relative group delay information of the transmission channel is a set of parameters associated with a subcarrier frequency in a bandwidth covered by a carrier frequency or a frequency band; and the quality indicator for group delay information of the transmission channel includes an error parameter.

It should be noted that, the UE according to the above embodiments of the present application can implement all the method steps implemented by the above-mentioned method embodiments, and can achieve the same effect. The same parts and beneficial effects as the same method embodiments are not repeated here.

An embodiment of the present application provides a location management function (LMF), including: a memory, a transceiver and a processor;

where the memory is used for storing a computer program; the transceiver is used for receiving and transmitting data under the control of the processor; and the processor is used for reading the computer program in the memory and performing the following operations;

obtaining gNB Tx Delay parameter information and positioning reference signal configuration information;

transmitting the positioning reference signal configuration information to a receiving node;

transmitting the gNB Tx Delay parameter information to a user equipment (UE) for the UE to correct a positioning measurement value based on UE Tx Delay parameter information of the UE and/or the gNB Tx Delay parameter information;

where the positioning measurement value is obtained through measuring, by the receiving node, a positioning reference signal transmitted by a transmitting node according to the positioning reference signal configuration information; and in case that the transmitting node is a gNB, the receiving node is the UE; and in case that the transmitting node is the UE and the gNB, the receiving node is the gNB and the UE.

In an embodiment, the obtaining gNB Tx Delay parameter information and positioning reference signal configuration information includes:

transmitting a TRP INFORMATION REQUEST message to a gNB, and receiving a TRP INFORMATION RESPONSE message transmitted by the gNB;

where for a serving gNB, the TRP INFORMATION REQUEST message is used for simultaneously requesting the serving gNB to provide downlink positioning reference signal configuration information, uplink positioning reference signal configuration information and TRP information and gNB Tx Delay information of the serving gNB; and for a neighboring gNB, the TRP INFORMATION REQUEST message is used for requesting the neighboring gNB to provide TRP information and gNB Tx Delay information of the neighboring gNB; or for the serving gNB, the TRP INFORMATION REQUEST message is used for simultaneously requesting the serving gNB to provide downlink positioning reference signal configuration information and TRP information and gNB Tx Delay information of the serving gNB; and for the neighboring gNB, the TRP INFORMATION REQUEST message is used for requesting the neighboring gNB to provide TRP information and gNB Tx Delay information of the neighboring gNB.

In an embodiment, the processor further performs the following operations:

transmitting a RequestCapabilities message to the UE, where the RequestCapabilities message is used for requesting the UE to inform the LMF of a location function supported by the UE;

receiving a ProvideCapabilities message transmitted by the UE, where the ProvideCapabilities message is used for informing the LMF of the location function supported by the UE;

receiving a RequestAssistanceData message transmitted by the UE, where the RequestAssistanceData message is used for requesting the LMF to provide location assistance data;

transmitting a ProvideAssistanceData message to the UE, where the ProvideAssistanceData message is used for providing the location assistance data to the UE, and the location assistance data includes downlink positioning reference signal configuration information; and transmitting a RequestLocationInformation message to the UE for the UE to measure the downlink positioning reference signal transmitted by a gNB by using the location assistance data, where the RequestLocationInformation message is used for requesting the UE to measure a downlink positioning reference signal transmitted by a gNB.

In an embodiment, after the transmitting the RequestLocationInformation message to the UE, the processor further performs the following operations:

transmitting a MEASUREMENT REQUEST message to all gNBs participating in positioning, where the MEASUREMENT REQUEST message includes uplink positioning reference signal configuration information for all the gNBs participating in positioning to measure uplink positioning reference signal transmitted by the UE and reporting measured positioning measurement values; and receiving the positioning measurement values transmitted by all the gNBs participating in positioning, and transmitting the positioning measurement values transmitted by all the gNBs participating in positioning to the UE.

It should be noted that the location management function (LMF) according to the above embodiments of the present application can implement all the method steps implemented by the above-mentioned method embodiments, and can achieve the same effect. The same parts and beneficial effects as the same method embodiments are not repeated here.

An embodiment of the present application provides a gNB, including: a memory, a transceiver and a processor:

where the memory is used for storing a computer program; the transceiver is used for receiving and transmitting data under the control of the processor; and the processor is used for reading the computer program in the memory and performing the following operations;

obtaining gNB transmission channel delay (gNB Tx Delay) parameter information;

providing positioning reference signal configuration information to user equipment (UE), and transmitting the gNB Tx Delay parameter information to the UE for the UE to correct a positioning measurement value based on the gNB Tx Delay parameter information; and where the positioning measurement value is obtained through measuring, by the user equipment (UE), a downlink positioning reference signal transmitted by the gNB according to downlink positioning reference signal configuration information, and/or, the positioning measurement value is obtained through measuring, by the gNB, an uplink positioning reference signal transmitted by the UE according to uplink positioning reference signal configuration information.

In an embodiment, the providing positioning reference signal configuration information to user equipment (UE) includes:

generating downlink positioning reference signal configuration information and forwarding the downlink positioning reference signal configuration information to the UE through location management function (LMF) for the UE to measure the downlink positioning reference signal transmitted by the gNB according to the downlink positioning reference signal configuration information; or generating uplink positioning reference signal configuration information and downlink positioning reference signal configuration information, and transmitting them to the LMF for the LMF to transmit the downlink positioning reference signal configuration information to the UE and transmitting the uplink positioning reference signal configuration information to all the gNBs participating in positioning;

where the gNB configures the uplink positioning reference signal configuration information for the UE through RRC signaling for the UE to transmit the uplink positioning reference signal to the gNB through RRC signaling according to the uplink positioning reference signal configuration information.

In an embodiment, the gNB includes a serving gNB and one or more neighboring gNBs, and the transmitting the gNB Tx Delay parameter information to the UE includes:
  directly transmitting, by the serving gNB, gNB Tx Delay parameter information of the serving gNB to the UE, or forwarding the gNB Tx Delay parameter information of the serving gNB to the UE through LMF; and; and
  forwarding, by the neighboring gNB, gNB Tx Delay parameter information of the neighboring gNB to the UE through the serving gNB or the LMF.

In an embodiment, the providing positioning reference signal configuration information to user equipment (UE) and transmitting the gNB Tx Delay parameter information to the UE includes:
  receiving a TRP INFORMATION REQUEST message transmitted by LMF and transmitting a TRP INFORMATION RESPONSE message to the LMF;
  where for a serving gNB, the TRP INFORMATION REQUEST message is used for simultaneously requesting the serving gNB to provide downlink positioning reference signal configuration information, uplink positioning reference signal configuration information and TRP information and gNB Tx Delay information of the serving gNB; and for a neighboring gNB, the TRP INFORMATION REQUEST message is used for requesting the neighboring gNB to provide TRP information and gNB Tx Delay information of the neighboring gNB; or
  for the serving gNB, the TRP INFORMATION REQUEST message is used for simultaneously requesting the serving gNB to provide downlink positioning reference signal configuration information and TRP information and gNB Tx Delay information of the serving gNB; and for the neighboring gNB, the TRP INFORMATION REQUEST message is used for requesting the neighboring gNB to provide TRP information and gNB Tx Delay information of the neighboring gNB.

It should be noted that the gNB according to above embodiments of the present application can implement all the method steps implemented by the above-mentioned method embodiments, and can achieve the same effect. The same parts and beneficial effects as the same method embodiments are not repeated here.

Figure 14:
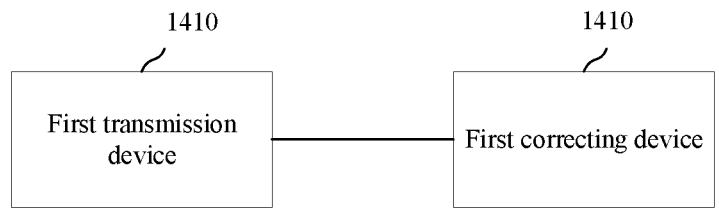
FIG. 14 is second schematic structural diagram of the location management function (LMF) according to an embodiment of the present application.

FIG. 14 is a second schematic structural diagram of the location management function (LMF) according to an embodiment of the present application, including a first transmission device 1410 and a first correcting device 1420;
  where the first transmission device 1410 is used for receiving a transmission channel delay (Tx Delay) parameter information transmitted by a transmitting node and transmitting a positioning reference signal configuration information to a receiving node;
  the first correcting device 1420 is used for correcting a positioning measurement value based on the Tx Delay parameter information; and
  where the positioning measurement value is obtained through measuring, by the receiving node, a positioning reference signal transmitted by the transmitting node according to the positioning reference signal configuration information.

In an embodiment, the transmitting node is a next generation Node B (gNB) and/or user equipment (UE),
  in case that the transmitting node is a gNB, the Tx Delay parameter information is gNB Tx Delay parameter information, the receiving node is the UE, and the positioning reference signal is a downlink positioning reference signal;
  in case that the transmitting node is the UE, the Tx Delay parameter information is UE Tx Delay parameter information, the receiving node is the gNB, and the positioning reference signal is an uplink positioning reference signal; and
  in case that the transmitting node includes the gNB and the UE, the Tx Delay parameter information includes gNB Tx Delay parameter information and UE Tx Delay parameter information, the receiving node includes the UE and the gNB, and the positioning reference signal includes downlink positioning reference signal and uplink positioning reference signal.

In an embodiment, in case that the transmitting node is a gNB, the first transmission device is used for:
  transmitting a TRP INFORMATION REQUEST message to the gNB, where the TRP INFORMATION REQUEST message is used for requesting the gNB to provide its TRP information, downlink positioning reference signal configuration information and gNB Tx Delay parameter information;
  receiving the TRP information, the downlink positioning reference signal configuration information and the gNB Tx Delay parameter information; and
  transmitting a ProvideAssistanceData message to UE, where the ProvideAssistanceData message includes the downlink positioning reference signal configuration information for the UE to measure the downlink positioning reference signal transmitted by the gNB according to the downlink positioning reference signal configuration information to obtain a first positioning measurement value;
  the first correcting device is used for:
  correcting the first positioning measurement value based on the gNB Tx Delay parameter information.

In an embodiment, the LMF further includes:
  a first capabilities requesting device, used for transmitting a RequestCapabilities message to the UE, where the RequestCapabilities message is used for requesting the UE to inform the LMF of a location function supported by the UE;
  a first capabilities receiving device, used for receiving a ProvideCapabilities message transmitted by the UE, where the ProvideCapabilities message is used for informing the LMF of the location function supported by the UE; and
  a first assistance request receiving device, used for receiving a RequestAssistanceData message transmitted by the UE, where the RequestAssistanceData message is used for requesting the LMF to provide location assistance data to the UE.

In an embodiment, in case that the transmitting node is user equipment (UE), the first transmission device is used for:
  receiving UE Tx Delay parameter information obtained by the UE;
  transmitting a TRP INFORMATION REQUEST message to gNB, where the TRP INFORMATION REQUEST message is used for requesting the gNB to provide its TRP information and uplink positioning reference signal configuration information;
  receiving the TRP information and the uplink positioning reference signal configuration information; and transmitting a MEASUREMENT REQUEST message to the gNB, where the MEASUREMENT REQUEST message includes the uplink positioning reference signal configuration information for the gNB to measure an uplink positioning reference signal transmitted by the UE according to the uplink positioning reference signal configuration information to obtain a second positioning measurement value;

the first correcting device is used for:

correcting the second positioning measurement value based on the UE Tx Delay parameter information.

In an embodiment, the LMF further includes:

a second capabilities requesting device, used for transmitting a RequestCapabilities message to the UE, where the RequestCapabilities message is used for requesting the UE to inform the LMF of a location function supported by the UE and whether the UE is configured to provide the UE Tx Delay parameter information;

a second capabilities receiving device, used for receiving a ProvideCapabilities message transmitted by the UE, where the ProvideCapabilities message is used for informing the LMF of the location function supported by the UE and whether the UE is configured to provide the UE Tx Delay parameter information; and a first transmission delay requesting device, used for transmitting a RequestUETxDelay message to the UE, where the RequestUETxDelay message is used for requesting the UE to provide the UE Tx Delay parameter information.

In an embodiment, in case that the transmitting node is the gNB and the UE, the first transmission device is used for:

receiving UE Tx Delay parameter information obtained by the UE;

transmitting a TRP INFORMATION REQUEST message to the gNB, where the TRP INFORMATION REQUEST message is used for requesting the gNB to provide TRP information, downlink positioning reference signal configuration information, uplink positioning reference signal configuration information and gNB Tx Delay parameter information;

receiving the TRP information, the downlink positioning reference signal configuration information, the uplink positioning reference signal configuration information and the gNB Tx Delay parameter information;

transmitting a Provide AssistanceData message to the UE, where the Provide AssistanceData message includes the downlink positioning reference signal configuration information for the UE to measure the downlink positioning reference signal transmitted by the gNB according to the downlink positioning reference signal configuration information to obtain a third positioning measurement value;

transmitting a MEASUREMENT REQUEST message to the gNB, where the MEASUREMENT REQUEST message includes the uplink positioning reference signal configuration information for the gNB to measure an uplink positioning reference signal transmitted by the UE according to the uplink positioning reference signal configuration information to obtain a fourth positioning measurement value;

the first correcting device is used for:

correcting the third positioning measurement value based on the gNB Tx Delay parameter information; and correcting the fourth positioning measurement value based on the UE Tx Delay parameter information.

In an embodiment, the LMF further includes:

a third capabilities requesting device, used for transmitting a RequestCapabilities message to the UE, where the RequestCapabilities message is used for requesting the UE to inform the LMF of a location function supported by the UE and whether the UE is configured to provide the UE Tx Delay parameter information;

a third capabilities receiving device, used for receiving a ProvideCapabilities message transmitted by the UE, where the ProvideCapabilities message is used for informing the LMF of the location function supported by the UE and whether the UE is configured to provide the UE Tx Delay parameter information;

a second transmission delay requesting device, used for transmitting a RequestUETxDelay message to the UE, where the RequestUETxDelay message is used for requesting the UE to provide the UE Tx Delay parameter information; and a second assistance request receiving device, used for receiving a RequestAssistanceData message transmitted by the UE, where the RequestAssistanceData message is used for requesting the LMF to provide location assistance data to the UE.

In an embodiment, the gNB includes a serving gNB and one or more neighboring gNBs, and the positioning reference signal configuration information is determined by the serving gNB.

In an embodiment, the transmission channel delay (Tx Delay) parameter information includes an absolute group delay information of the transmission channel, a relative group delay information of the transmission channel and a quality indicator for group delay information of the transmission channel:

where the absolute group delay information of the transmission channel is a parameter related to per carrier frequency band or a carrier frequency with a certain carrier bandwidth, and represents an absolute delay of the carrier frequency band or the carrier frequency;

the relative group delay information of the transmission channel is a set of parameters associated with a subcarrier frequency in a bandwidth covered by a carrier frequency or a frequency band; and the quality indicator for group delay information of the transmission channel includes an error parameter.

It should be noted that the location management function (LMF) according to the embodiment of the present application can implement all the method steps implemented by the above-mentioned method embodiments, and can achieve the same effect. The same parts and beneficial effects as the same method embodiments are not repeated here.

Figure 15:
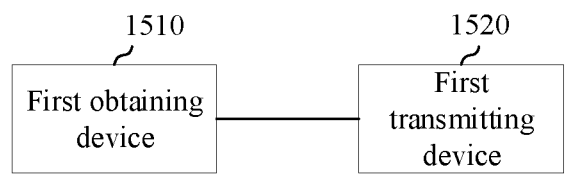
FIG. 15 is second schematic structural diagram of the user equipment (UE) according to an embodiment of the present application.

FIG. 15 is second schematic structural diagram of the user equipment (UE) according to an embodiment of the present application, including: a first obtaining device 1510 and a first transmitting device 1520;

the first obtaining device 1510 is used for obtaining UE transmission channel delay (UE Tx Delay) parameter information;

the first transmitting device 1520 is used for transmitting the UE Tx Delay parameter information to a location management function (LMF) for the LMF to correct a positioning measurement value based on the UE Tx Delay parameter information; and where the positioning measurement value is obtained through measuring, by the gNB, an uplink positioning reference signal transmitted by the UE according to uplink positioning reference signal configuration information, and/or, the positioning measurement value is obtained through measuring, by the UE, a downlink positioning reference signal transmitted by the gNB according to downlink positioning reference signal configuration information.

In an embodiment, the first transmitting device is further used for:
  receiving a RequestCapabilities message transmitted by the LMF, where the RequestCapabilities message is used for requesting the UE to inform the LMF of a location function supported by the UE and whether the UE is configured to provide the UE Tx Delay parameter information;
  transmitting a ProvideCapabilities message to the LMF, where the ProvideCapabilities message is used for informing the LMF of the location function supported by the UE and whether the UE is configured to provide the UE Tx Delay parameter information;
  receiving a RequestUETxDelay message transmitted by the LMF, where the RequestUETxDelay message is used for requesting the UE to provide the UE Tx Delay parameter information; and
  transmitting a Provide UETxDelay message to the LMF, where the Provide UETxDelay message includes the UE Tx Delay parameter information.

In an embodiment, the UE further includes:
  a first uplink positioning reference signal configuration information receiving device, used for receiving an uplink positioning reference signal configuration information transmitted by a gNB through RRC signaling;
  a first uplink positioning reference signal transmitting device, used for transmitting an uplink positioning reference signal to the gNB for the gNB to measure the uplink positioning reference signal and transmitting a measured positioning measurement value to the LMF for the LMF to correct the positioning measurement value based on the UE Tx Delay parameter information.

In an embodiment, the UE further includes:
  an assistance request transmitting device, used for transmitting a RequestAssistanceData message to the LMF, where the RequestAssistanceData message is used for requesting the LMF to provide location assistance data;
  an assistance data receiving device, used for receiving a ProvideAssistanceData message transmitted by the LMF, where the ProvideAssistanceData message includes a downlink positioning reference signal configuration information;
  a first measuring and correcting device, used for measuring a downlink positioning reference signal transmitted by a gNB according to the downlink positioning reference signal configuration information to obtain a third positioning measurement value, and transmitting the third positioning measurement value to the LMF for the LMF to correct the third positioning measurement value based on the gNB Tx Delay parameter information; and
  a second uplink positioning reference signal transmitting device, used for receiving an uplink positioning reference signal configuration information transmitted by the gNB through radio resource control (RRC) signaling, and transmitting an uplink positioning reference signal to the gNB for the gNB to measure the uplink positioning reference signal to obtain a fourth positioning measurement value and transmitting the fourth positioning measurement value to the LMF for the LMF to correct the fourth positioning measurement value based on the UE Tx Delay parameter information.

It should be noted that the user equipment (UE) according to the embodiment of the present application can perform all the method steps implemented by the above-mentioned method embodiments, and can achieve the same effect. The same parts and beneficial effects as the same method embodiments are not repeated here.

Figure 16:
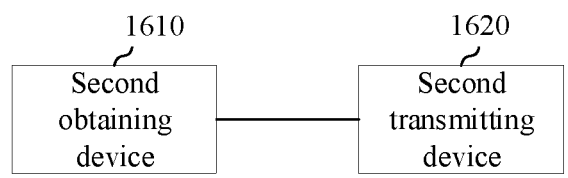
FIG. 16 is second schematic structural diagram of the gNB according to an embodiment of the present application.

FIG. 16 is a second schematic structural diagram of the gNB according to an embodiment of the present application, including: a second obtaining device 1610 and a second transmitting device 1620;
  the second obtaining device 1610 is used for obtaining gNB transmission channel delay (gNB Tx Delay) parameter information;
  the second transmitting device 1620 is used for transmitting the gNB Tx Delay parameter information to a location management function (LMF) for the LMF to correct a positioning measurement value based on the gNB Tx Delay parameter information; and
  where the positioning measurement value is obtained through measuring, by a user equipment (UE), a downlink positioning reference signal transmitted by the gNB according to downlink positioning reference signal configuration information, and/or, the positioning measurement value is obtained through measuring, by the gNB, an uplink positioning reference signal transmitted by the UE according to uplink positioning reference signal configuration information.

In an embodiment, the second transmitting device is further used for:
  receiving a TRP INFORMATION REQUEST message transmitted by the LMF and transmitting a TRP INFORMATION RESPONSE message to the LMF;
  where the TRP INFORMATION REQUEST message is used for requesting the gNB to provide TRP information, downlink positioning reference signal configuration information and gNB Tx Delay parameter information, and the TRP INFORMATION RESPONSE message includes the TRP information, the downlink positioning reference signal configuration information and the gNB Tx Delay parameter information; or
  the TRP INFORMATION REQUEST message is used for requesting the gNB to provide TRP information, downlink positioning reference signal configuration information, uplink positioning reference signal configuration information and gNB Tx Delay parameter information, and the TRP INFORMATION RESPONSE message includes the TRP information, the downlink positioning reference signal configuration information, the uplink positioning reference signal configuration information and the gNB Tx Delay parameter information.

In an embodiment, the gNB includes a serving gNB and one or more neighboring gNBs, and the uplink positioning reference signal configuration information and/or the downlink positioning reference signal configuration information is determined by the serving gNB.

It should be noted that the gNB according to the embodiment of the present application can perform all the method steps implemented by the above-mentioned method embodiments, and can achieve the same effect. The same parts and beneficial effects as the same method embodiments are not repeated here.

Figure 17:
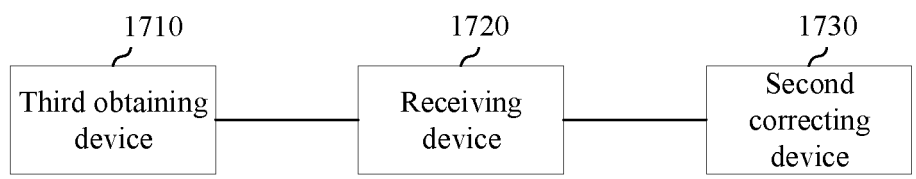
FIG. 17 is third schematic structural diagram of the user equipment (UE) according to an embodiment of the present application.

FIG. 17 is third schematic structural diagram of the user equipment (UE) according to an embodiment of the present application, including: a third obtaining device 1710, a receiving device 1720 and a second correcting device 1730;

the third obtaining device 1710 is used for obtaining UE transmission channel delay (UE Tx Delay) parameter information;

the receiving device 1720 is used for receiving gNB Tx Delay parameter information transmitted by a gNB or location management function (LMF);

the second correcting device 1730 is used for correcting a positioning measurement value based on the UE Tx Delay parameter information and/or the gNB Tx Delay parameter information; and where the positioning measurement value is obtained through measuring, by a receiving node, a positioning reference signal transmitted by a transmitting node according to a positioning reference signal configuration information.

In an embodiment, the receiving device is used for:

receiving a gNB Tx Delay parameter information of a serving gNB, and a gNB Tx Delay parameter information of a neighboring gNB forwarded by the serving gNB; or receiving the gNB Tx Delay parameter information of the serving gNB, and the gNB Tx Delay parameter information of the neighboring gNB forwarded by the LMF; or receiving the gNB Tx Delay parameter information of the serving gNB and the gNB Tx Delay parameter information of the neighboring gNB which are forwarded by the LMF.

In an embodiment, in case that the transmitting node is a gNB, the UE further includes:

a first capabilities request receiving device, used for receiving a RequestCapabilities message transmitted by the LMF, where the RequestCapabilities message is used for requesting the UE to inform the LMF of a location function supported by the UE;

a first capabilities transmitting device, used for transmitting a ProvideCapabilities message to the LMF, where the ProvideCapabilities message is used for informing the LMF of the location function supported by the UE;

a first assistance data request transmitting device, used for transmitting a RequestAssistanceData message to the LMF, where the RequestAssistanceData message is used for requesting the LMF to provide location assistance data;

a first assistance data receiving device, used for receiving a ProvideAssistanceData message transmitted by the LMF, where the ProvideAssistanceData message is used for providing the location assistance data to the UE, and the location assistance data includes downlink positioning reference signal configuration information;

a first location information request receiving device, used for receiving a RequestLocationInformation message transmitted by the LMF, where the RequestLocationInformation message is used for requesting the UE to measure a downlink positioning reference signal transmitted by the gNB;

a first measuring device, used for measuring the downlink positioning reference signal transmitted by the gNB by using the downlink positioning reference signal configuration information to obtain a fifth positioning measurement value;

the second correcting device is used for:

correcting the fifth positioning measurement value based on the gNB Tx Delay parameter information.

In an embodiment, in case that the transmitting node is the gNB and the UE, the UE further includes:

a second capabilities request receiving device, used for receiving a RequestCapabilities message transmitted by the LMF, where the RequestCapabilities message is used for requesting the UE to inform the LMF of a location function supported by the UE;

a second capabilities transmitting device, used for transmitting a ProvideCapabilities message to the LMF, where the ProvideCapabilities message is used for informing the LMF of the location function supported by the UE;

a second assistance data request transmitting device, used for transmitting a RequestAssistanceData message to the LMF, where the RequestAssistanceData message is used for requesting the LMF to provide location assistance data;

a second assistance data receiving device, used for receiving a ProvideAssistanceData message transmitted by the LMF, where the ProvideAssistanceData message is used for providing the location assistance data to the UE, and the location assistance data includes downlink positioning reference signal configuration information;

a second location information request receiving device, used for receiving a RequestLocationInformation message transmitted by the LMF, where the RequestLocationInformation message is used for requesting the UE to measure a downlink positioning reference signal transmitted by the gNB;

a second measuring device, used for measuring the downlink positioning reference signal transmitted by the gNB by using the location assistance data to obtain a sixth positioning measurement value;

a second uplink positioning reference signal configuration information receiving device, used for receiving an uplink positioning reference signal configuration information transmitted by a serving gNB through radio resource control (RRC) signaling;

a second uplink positioning reference signal transmitting device, used for transmitting an uplink positioning reference signal to all gNBs participating in positioning according to the RRC signaling for all the gNBs participating in positioning to measure the uplink positioning reference signal according to the uplink positioning reference signal configuration information transmitted by the LMF to obtain a seventh positioning measurement value and transmitting the seventh positioning measurement value to the UE through the LMF;

where all the gNBs participating in positioning include the serving gNB and one or more neighboring gNBs;

the second correcting device is used for:

correcting the sixth positioning measurement value based on the gNB Tx Delay parameter information; and correcting the seventh positioning measurement value based on the UE Tx Delay parameter information.

In an embodiment, the UE Tx Delay parameter information or the gNB Tx Delay parameter information includes an absolute group delay information of the transmission channel, a relative group delay information of the transmission channel and a quality indicator for group delay information of the transmission channel:

where the absolute group delay information of the transmission channel is a parameter related to per carrier frequency band or a carrier frequency with a certain carrier bandwidth, and represents an absolute delay of the carrier frequency band or the carrier frequency;

the relative group delay information of the transmission channel is a set of parameters associated with a subcarrier frequency in a bandwidth covered by a carrier frequency or a frequency band; and the quality indicator for group delay information of the transmission channel includes an error parameter.

It should be noted that the UE according to the embodiment of the present application can perform all the method steps implemented by the above-mentioned method embodiments, and can achieve the same effect. The same parts and beneficial effects as the same method embodiments are not repeated here.

Figure 18:
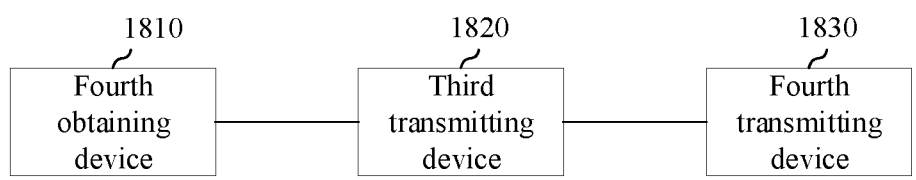
FIG. 18 is third schematic structural diagram of the location management function (LMF) according to an embodiment of the present application.

FIG. 18 is a third schematic structural diagram of the location management function (LMF) according to an embodiment of the present application, including: a fourth obtaining device 1810, a third transmitting device 1820 and a fourth transmitting device 1830;

the fourth obtaining device 1810 is used for obtaining gNB Tx Delay parameter information and positioning reference signal configuration information;

the third transmitting device 1820 is used for transmitting the positioning reference signal configuration information to a receiving node;

the fourth transmitting device 1830 is used for transmitting the gNB Tx Delay parameter information to a user equipment (UE) for the UE to correct a positioning measurement value based on UE Tx Delay parameter information of the UE and/or the gNB Tx Delay parameter information;

where the positioning measurement value is obtained through measuring, by the receiving node, a positioning reference signal transmitted by a transmitting node according to the positioning reference signal configuration information; and in case that the transmitting node is a gNB, the receiving node is the UE; and in case that the transmitting node is the UE and the gNB, the receiving node is the gNB and the UE.

In an embodiment, the fourth obtaining device is further used for:

transmitting a TRP INFORMATION REQUEST message to a gNB, and receiving a TRP INFORMATION RESPONSE message transmitted by the gNB;

where for a serving gNB, the TRP INFORMATION REQUEST message is used for simultaneously requesting the serving gNB to provide downlink positioning reference signal configuration information, uplink positioning reference signal configuration information and TRP information and gNB Tx Delay information of the serving gNB; and for a neighboring gNB, the TRP INFORMATION REQUEST message is used for requesting the neighboring gNB to provide TRP information and gNB Tx Delay information of the neighboring gNB; or for the serving gNB, the TRP INFORMATION REQUEST message is used for simultaneously requesting the serving gNB to provide downlink positioning reference signal configuration information and TRP information and gNB Tx Delay information of the serving gNB; and for the neighboring gNB, the TRP INFORMATION REQUEST message is used for requesting the neighboring gNB to provide TRP information and gNB Tx Delay information of the neighboring gNB.

In an embodiment, the LMF further includes:

a fourth capabilities requesting device, used for transmitting a RequestCapabilities message to the UE, where the RequestCapabilities message is used for requesting the UE to inform the LMF of a location function supported by the UE;

a fourth capabilities receiving device, used for receiving a ProvideCapabilities message transmitted by the UE, where the ProvideCapabilities message is used for informing the LMF of the location function supported by the UE;

a third assistance request receiving device, used for receiving a RequestAssistanceData message transmitted by the UE, where the RequestAssistanceData message is used for requesting the LMF to provide location assistance data;

an assistance data providing device, used for transmitting a ProvideAssistanceData message to the UE, where the ProvideAssistanceData message is used for providing the location assistance data to the UE, and the location assistance data includes downlink positioning reference signal configuration information; and a first location request transmitting device, used for transmitting a RequestLocationInformation message to the UE for the UE to measure the downlink positioning reference signal transmitted by a gNB by using the location assistance data, where the RequestLocationInformation message is used for requesting the UE to measure a downlink positioning reference signal transmitted by a gNB.

In an embodiment, the LMF further includes:

a second location request transmitting device, used for transmitting a MEASUREMENT REQUEST message to all gNBs participating in positioning, where the MEASUREMENT REQUEST message includes uplink positioning reference signal configuration information for all the gNBs participating in positioning to measure uplink positioning reference signal transmitted by the UE and reporting measured positioning measurement values; and a positioning measurement value receiving device, used for receiving the positioning measurement values transmitted by all the gNBs participating in positioning, and transmitting the positioning measurement values transmitted by all the gNBs participating in positioning to the UE.

It should be noted that the LMF according to the embodiment of the present application can perform all the method steps implemented by the above-mentioned method embodiments, and can achieve the same effect. The same parts and beneficial effects as the same method embodiments are not repeated here.

Figure 19:
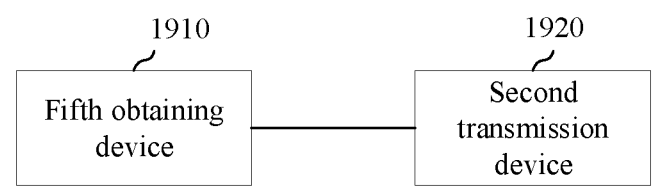
FIG. 19 is third schematic structural diagram of the gNB according to an embodiment of the present application.

FIG. 19 is a third schematic structural diagram of the gNB according to an embodiment of the present application, including: a fifth obtaining device 1910 and a second transmission device 1920;

the fifth obtaining device 1910 is used for obtaining gNB transmission channel delay (gNB Tx Delay) parameter information;

the second transmission device 1920 is used for providing positioning reference signal configuration information to user equipment (UE), and transmitting the gNB Tx Delay parameter information to the UE for the UE to correct a positioning measurement value based on the gNB Tx Delay parameter information; and where the positioning measurement value is obtained through measuring, by the user equipment (UE), a downlink positioning reference signal transmitted by the gNB according to downlink positioning reference signal configuration information, and/or, the positioning measurement value is obtained through measuring, by the gNB, an uplink positioning reference signal transmitted by the UE according to uplink positioning reference signal configuration information.

In an embodiment, the second transmission device is further used for:

generating downlink positioning reference signal configuration information and forwarding the downlink positioning reference signal configuration information to the UE through location management function (LMF) for the UE to measure the downlink positioning reference signal transmitted by the gNB according to the downlink positioning reference signal configuration information; or generating uplink positioning reference signal configuration information and downlink positioning reference signal configuration information, and transmitting the uplink positioning reference signal configuration information and the downlink positioning reference signal configuration information to location management function (LMF) for the LMF to transmit the downlink positioning reference signal configuration information to the UE and transmitting the uplink positioning reference signal configuration information to all gNBs participating in positioning;

where the gNB configures the uplink positioning reference signal configuration information for the UE through RRC signaling for the UE to transmit the uplink positioning reference signal to the gNB through RRC signaling according to the uplink positioning reference signal configuration information.

In an embodiment, the gNB includes a serving gNB and one or more neighboring gNBs, and the transmitting the gNB Tx Delay parameter information to the UE includes:

directly transmitting, by the serving gNB, gNB Tx Delay parameter information of the serving gNB to the UE, or forwarding the gNB Tx Delay parameter information of the serving gNB to the UE through LMF; and forwarding, by the neighboring gNB, gNB Tx Delay parameter information of the neighboring gNB to the UE through the serving gNB or the LMF.

In an embodiment, the second transmission device is further used for:

receiving a TRP INFORMATION REQUEST message transmitted by LMF and transmitting a TRP INFORMATION RESPONSE message to the LMF;

where for a serving gNB, the TRP INFORMATION REQUEST message is used for simultaneously requesting the serving gNB to provide downlink positioning reference signal configuration information, uplink positioning reference signal configuration information and TRP information and gNB Tx Delay information of the serving gNB; and for a neighboring gNB, the TRP INFORMATION REQUEST message is used for requesting the neighboring gNB to provide TRP information and gNB Tx Delay information of the neighboring gNB; or for the serving gNB, the TRP INFORMATION REQUEST message is used for simultaneously requesting the serving gNB to provide downlink positioning reference signal configuration information and TRP information and gNB Tx Delay information of the serving gNB; and for the neighboring gNB, the TRP INFORMATION REQUEST message is used for requesting the neighboring gNB to provide TRP information and gNB Tx Delay information of the neighboring gNB.

It should be noted that the gNB according to the embodiment of the present application can perform all the method steps implemented by the above-mentioned method embodiments, and can achieve the same effect. The same parts and beneficial effects as the same method embodiments are not repeated here.

It should be noted that, the division of devices in the embodiments of the present application is schematic, and is only a logical function division, and there can be other division manners in actual implementation. In addition, the functional devices in the various embodiments of the present application can be integrated into one processing device, or each device can exist alone physically, or two or more devices can be integrated into one device. The above-mentioned integrated device can be implemented in the form of hardware or software functional device.

If the integrated device is implemented in the form of a software functional device and sold or used as an independent product, it can be stored in a computer readable storage medium. Based on such understanding, the solutions of the present application in essence or a part of the solutions that contributes to the related art, or all or part of the solutions, can be embodied in the form of a software product, which is stored in a storage medium, including several instructions to cause a computer device (which can be a personal computer, server, or network device, etc.) or a processor to perform all or part of the steps of the methods described in the respective embodiments of the present application. The storage medium described above includes various media that can store program codes such as USB flash disk, mobile hard disk, read-only memory (ROM), random access memory (RAM), magnetic disk, or optical disk.

An embodiment of the present application provides a non-transitory computer readable storage medium having a computer program stored thereon that cause a processor to perform the steps of the method for correcting transmission channel delay (Tx Delay) described above, which includes:

receiving Tx delay parameter information transmitted by a transmitting node and transmitting positioning reference signal configuration information to a receiving node;

correcting a positioning measurement value based on the Tx Delay parameter information; and where the positioning measurement value is obtained through measuring, by the receiving node, a positioning reference signal transmitted by the transmitting node according to the positioning reference signal configuration information.

In an embodiment, the computer program causes a processor to perform the steps of the method for correcting transmission channel delay described above, which includes:

obtaining UE transmission channel delay (UE Tx Delay) parameter information;

transmitting the UE Tx Delay parameter information to a location management function (LMF) for the LMF to correct a positioning measurement value based on the UE Tx Delay parameter information; and where the positioning measurement value is obtained through measuring, by the gNB, an uplink positioning reference signal transmitted by the UE according to uplink positioning reference signal configuration information, and/or, the positioning measurement value is obtained through measuring, by the UE, a downlink positioning reference signal transmitted by the gNB according to downlink positioning reference signal configuration information.

In an embodiment, the computer program causes a processor to perform the steps of the method for correcting transmission channel delay described above, which includes:

obtaining gNB transmission channel delay (gNB Tx Delay) parameter information;

transmitting the gNB Tx Delay parameter information to a location management function (LMF) for the LMF to correct a positioning measurement value based on the gNB Tx Delay parameter information; and where the positioning measurement value is obtained through measuring, by a user equipment (UE), a downlink positioning reference signal transmitted by the gNB according to downlink positioning reference signal configuration information, and/or, the positioning measurement value is obtained through measuring, by the gNB, an uplink positioning reference signal transmitted by the UE according to uplink positioning reference signal configuration information.

In an embodiment, the computer program causes a processor to execute the steps of the method for correcting transmission channel delay described above, which includes:

obtaining UE transmission channel delay (UE Tx Delay) parameter information;

receiving gNB Tx Delay parameter information transmitted by a gNB or location management function (LMF);

correcting a positioning measurement value based on the UE Tx Delay parameter information and/or the gNB Tx Delay parameter information; and where the positioning measurement value is obtained through measuring, by a receiving node, a positioning reference signal transmitted by a transmitting node according to a positioning reference signal configuration information.

In an embodiment, the computer program causes a processor to perform the steps of the method for correcting transmission channel delay described above, which includes:

obtaining gNB Tx Delay parameter information and positioning reference signal configuration information;

transmitting the positioning reference signal configuration information to a receiving node;

transmitting the gNB Tx Delay parameter information to a user equipment (UE) for the UE to correct a positioning measurement value based on UE Tx Delay parameter information of the UE and/or the gNB Tx Delay parameter information;

where the positioning measurement value is obtained through measuring, by the receiving node, a positioning reference signal transmitted by a transmitting node according to the positioning reference signal configuration information; and in case that the transmitting node is a gNB, the receiving node is the UE; and in case that the transmitting node is the UE and the gNB, the receiving node is the gNB and the UE.

In an embodiment, the computer program causes a processor to perform the steps of the method for correcting transmission channel delay described above, which includes:

obtaining gNB transmission channel delay (gNB Tx Delay) parameter information;

providing positioning reference signal configuration information to user equipment (UE), and transmitting the gNB Tx Delay parameter information to the UE for the UE to correct a positioning measurement value based on the gNB Tx Delay parameter information; and where the positioning measurement value is obtained through measuring, by the user equipment (UE), a downlink positioning reference signal transmitted by the gNB according to downlink positioning reference signal configuration information, and/or, the positioning measurement value is obtained through measuring, by the gNB, an uplink positioning reference signal transmitted by the UE according to uplink positioning reference signal configuration information.

In an embodiment, the computer readable storage medium can be any available medium or data storage device that can be accessed by the computer, including but not limited to, a magnetic storage (e.g., a floppy disk, a hard disk, a magnetic tape, a magneto-optical disk (MO), etc.), optical memory (such as CD, DVD, BD, HVD, etc.), and a semiconductor memory (such as ROM, EPROM, EEPROM, non-volatile memory (NAND FLASH), solid-state drive (SSD)), etc.

Embodiments of the present application can be provided as a method, system, or computer program product. Accordingly, the present application can take the form of an entirely hardware embodiment, an entirely software embodiment, or an embodiment combining software and hardware aspects. Furthermore, the present application can take the form of a computer program product embodied on one or more computer-usable storage media having computer-usable program code embodied therein, including but not limited to disk storage, optical storage, and the like.

The present application is described with reference to flow charts and/or block diagrams of methods, apparatus (systems), and computer program products according to embodiments of the present application. It will be understood that each flow and/or block in the flow charts and/or block diagrams, and combinations thereof can be implemented by computer-executable instructions. These computer-executable instructions can be provided to processors of a general-purpose computer, a special purpose computer, an embedded processor or other programmable data processing device to produce a machine and the instructions executed by the processor of the computer or other programmable data processing device form a means for performing the functions specified in one or more flows in a flowchart and/or one or more blocks of a block diagram.

These processor-executable instructions can be loaded onto a computer or other programmable data processing device to cause a series of operational steps to be performed on the computer or other programmable device to produce a computer-implemented process and instructions performed on the computer or other programmable devices provide steps for performing the functions specified in one or more flows in the flowchart and/or one or more blocks of the block diagram.

What is claimed is:

1. A method for correcting transmission channel delay (Tx delay), performed by a location management function (LMF), comprising:

receiving Tx delay parameter information transmitted by a transmitting node and transmitting positioning reference signal configuration information to a receiving node; and correcting a positioning measurement value based on the Tx Delay parameter information;

wherein the positioning measurement value is obtained through measuring, by the receiving node, a positioning reference signal transmitted by the transmitting node according to the positioning reference signal configuration information.

2. The method of claim 1, wherein the transmitting node is a gNB and/or a user equipment (UE),
wherein in case that the transmitting node is the gNB, the Tx Delay parameter information is gNB Tx Delay parameter information, the receiving node includes the UE, and the positioning reference signal is a downlink positioning reference signal;
in case that the transmitting node is the UE, the Tx Delay parameter information is UE Tx Delay parameter information, the receiving node is the gNB, and the positioning reference signal is an uplink positioning reference signal; and
in case that the transmitting node comprises a gNB and a UE, the Tx Delay parameter information comprises gNB Tx Delay parameter information and UE Tx Delay parameter information, the receiving node comprises a UE and a gNB, and the positioning reference signal comprises a downlink positioning reference signal and an uplink positioning reference signal.

3. The method of claim 2, wherein in case that the transmitting node is the gNB, the receiving the Tx delay parameter information transmitted by the transmitting node and transmitting the positioning reference signal configuration information to the receiving node comprises:
transmitting a TRP INFORMATION REQUEST message to the gNB, wherein the TRP INFORMATION REQUEST message is used for requesting the gNB to provide TRP information, downlink positioning reference signal configuration information and gNB Tx Delay parameter information;
receiving the TRP information, the downlink positioning reference signal configuration information and the gNB Tx Delay parameter information; and
transmitting a Provide Assistance Data message to UE, wherein the Provide Assistance Data message comprises the downlink positioning reference signal configuration information for the UE to measure the downlink positioning reference signal transmitted by the gNB according to the downlink positioning reference signal configuration information to obtain a first positioning measurement value;
the correcting the positioning measurement value based on the Tx Delay parameter information comprises:
correcting the first positioning measurement value based on the gNB Tx Delay parameter information;
wherein before the transmitting the TRP INFORMATION REQUEST message to the gNB, the method further comprises:
transmitting a RequestCapabilities message to the UE, wherein the RequestCapabilities message is used for requesting the UE to inform the LMF of a location function supported by the UE;
receiving a ProvideCapabilities message transmitted by the UE, wherein the ProvideCapabilities message is used for informing the LMF of the location function supported by the UE; and
receiving a RequestAssistanceData message transmitted by the UE, wherein the RequestAssistanceData message is used for requesting the LMF to provide location assistance data to the UE.

4. The method of claim 3, wherein the gNB comprises a serving gNB and one or more neighboring gNBs, and the positioning reference signal configuration information is determined by the serving gNB.

5. The method of claim 2, wherein in case that the transmitting node is the UE, the receiving the Tx delay parameter information transmitted by the transmitting node and transmitting the positioning reference signal configuration information to the receiving node comprises:
receiving UE Tx Delay parameter information obtained by the UE;
transmitting a TRP INFORMATION REQUEST message to gNB, wherein the TRP INFORMATION REQUEST message is used for requesting the gNB to provide TRP information and uplink positioning reference signal configuration information;
receiving the TRP information and the uplink positioning reference signal configuration information; and
transmitting a MEASUREMENT REQUEST message to the gNB, wherein the MEASUREMENT REQUEST message comprises the uplink positioning reference signal configuration information for the gNB to measure an uplink positioning reference signal transmitted by the UE according to the uplink positioning reference signal configuration information to obtain a second positioning measurement value;
the correcting the positioning measurement value based on the Tx Delay parameter information comprises:
correcting the second positioning measurement value based on the UE Tx Delay parameter information;
wherein before the receiving UE Tx Delay parameter information obtained by the UE, the method further comprises:
transmitting a RequestCapabilities message to the UE, wherein the RequestCapabilities message is used for requesting the UE to inform the LMF of a location function supported by the UE and whether the UE is configured to provide the UE Tx Delay parameter information;
receiving a ProvideCapabilities message transmitted by the UE, wherein the ProvideCapabilities message is used for informing the LMF of the location function supported by the UE and whether the UE is configured to provide the UE Tx Delay parameter information; and
transmitting a RequestUETxDelay message to the UE, wherein the RequestUETxDelay message is used for requesting the UE to provide the UE Tx Delay parameter information.

6. The method of claim 2, wherein in case that the transmitting node comprises the gNB and the UE, the receiving the Tx delay parameter information transmitted by the transmitting node and transmitting the positioning reference signal configuration information to the receiving node comprises:
receiving UE Tx Delay parameter information obtained by the UE;
transmitting a TRP INFORMATION REQUEST message to the gNB, wherein the TRP INFORMATION REQUEST message is used for requesting the gNB to provide TRP information, downlink positioning reference signal configuration information, uplink positioning reference signal configuration information and gNB Tx Delay parameter information;
receiving the TRP information, the downlink positioning reference signal configuration information, the uplink positioning reference signal configuration information and the gNB Tx Delay parameter information;
transmitting a ProvideAssistanceData message to the UE, wherein the Provide Assistance Data message comprises the downlink positioning reference signal configuration information for the UE to measure the downlink positioning reference signal transmitted by the gNB according to the downlink positioning reference signal configuration information to obtain a third positioning measurement value;

transmitting a MEASUREMENT REQUEST message to the gNB, wherein the MEASUREMENT REQUEST message comprises the uplink positioning reference signal configuration information for the gNB to measure an uplink positioning reference signal transmitted by the UE according to the uplink positioning reference signal configuration information to obtain a fourth positioning measurement value;

the correcting the positioning measurement value based on the Tx Delay parameter information comprises:

correcting the third positioning measurement value based on the gNB Tx Delay parameter information; and correcting the fourth positioning measurement value based on the UE Tx Delay parameter information;

wherein the method further comprises:

transmitting a RequestCapabilities message to the UE, wherein the RequestCapabilities message is used for requesting the UE to inform the LMF of a location function supported by the UE and whether the UE is configured to provide the UE Tx Delay parameter information;

receiving a ProvideCapabilities message transmitted by the UE, wherein the ProvideCapabilities message is used for informing the LMF of the location function supported by the UE and whether the UE is configured to provide the UE Tx Delay parameter information;

transmitting a RequestUETxDelay message to the UE, wherein the RequestUETxDelay message is used for requesting the UE to provide the UE Tx Delay parameter information; and receiving a RequestAssistanceData message transmitted by the UE, wherein the RequestAssistance Data message is used for requesting the LMF to provide location assistance data to the UE.

7. The method of claim 1, wherein the transmission channel delay (Tx Delay) parameter information comprises an absolute group delay information of the transmission channel, a relative group delay information of the transmission channel and a quality indicator for group delay information of the transmission channel;

wherein the absolute group delay information of the transmission channel is a parameter related to per carrier frequency band or a carrier frequency with a certain carrier bandwidth, and represents an absolute delay of the carrier frequency band or the carrier frequency;

the relative group delay information of the transmission channel is a set of parameters associated with a sub-carrier frequency in a bandwidth covered by a carrier frequency or a frequency band; and the quality indicator for group delay information of the transmission channel comprises an error parameter.

8. A location management function (LMF), comprising: a memory, a transceiver and a processor;

wherein the memory is used for storing a computer program; the transceiver is used for receiving and transmitting data under the control of the processor; and the processor is used for reading the computer program in the memory and performing the method of claim 1.

9. A method for correcting transmission channel delay (Tx delay), performed by a user equipment (UE) and comprising:

obtaining UE transmission channel delay (UE Tx Delay) parameter information;

transmitting the UE Tx Delay parameter information to a location management function (LMF) for the LMF to correct a positioning measurement value based on the UE Tx Delay parameter information; and wherein the positioning measurement value is obtained through measuring, by a gNB, an uplink positioning reference signal transmitted by the UE according to uplink positioning reference signal configuration information, and/or, the positioning measurement value is obtained through measuring, by the UE, a downlink positioning reference signal transmitted by the gNB according to downlink positioning reference signal configuration information.

10. The method of claim 9, wherein the transmitting the UE Tx Delay parameter information to the LMF comprises:

receiving a RequestCapabilities message transmitted by the LMF, wherein the RequestCapabilities message is used for requesting the UE to inform the LMF of a location function supported by the UE and whether the UE is configured to provide the UE Tx Delay parameter information;

transmitting a ProvideCapabilities message to the LMF, wherein the ProvideCapabilities message is used for informing the LMF of the location function supported by the UE and whether the UE is configured to provide the UE Tx Delay parameter information;

receiving a RequestUETxDelay message transmitted by the LMF, wherein the RequestUETxDelay message is used for requesting the UE to provide the UE Tx Delay parameter information; and transmitting a Provide UETxDelay message to the LMF, wherein the Provide UETxDelay message comprises the UE Tx Delay parameter information.

11. The method of claim 10, wherein after the transmitting the Provide UETxDelay message to the LMF, the method further comprises:

receiving an uplink positioning reference signal configuration information transmitted by a gNB through radio resource control (RRC) signaling, and transmitting an uplink positioning reference signal to the gNB for the gNB to measure the uplink positioning reference signal and transmitting a measured positioning measurement value to the LMF for the LMF to correct the positioning measurement value based on the UE Tx Delay parameter information.

12. The method of claim 10, wherein after the transmitting the Provide UETxDelay message to the LMF, the method further comprises:

transmitting a RequestAssistanceData message to the LMF, wherein the RequestAssistance Data message is used for requesting the LMF to provide location assistance data;

receiving a Provide AssistanceData message transmitted by the LMF, wherein the Provide Assistance Data message comprises downlink positioning reference signal configuration information;

measuring a downlink positioning reference signal transmitted by the gNB according to the downlink positioning reference signal configuration information to obtain a third positioning measurement value, and transmitting the third positioning measurement value to the LMF for the LMF to correct the third positioning measurement value based on the gNB Tx Delay parameter information; and receiving an uplink positioning reference signal configuration information transmitted by the gNB through the RRC signaling, and transmitting an uplink positioning reference signal to the gNB for the gNB to measure the uplink positioning reference signal to obtain a fourth positioning measurement value and transmitting the fourth positioning measurement value to the LMF for the LMF to correct the fourth positioning measurement value based on the UE Tx Delay parameter information.

13. A user equipment (UE), comprising: a memory, a transceiver and a processor;
wherein the memory is used for storing a computer program; the transceiver is used for receiving and transmitting data under the control of the processor; and the processor is used for reading the computer program in the memory and performing the method of claim 9.

14. A method for correcting transmission channel delay (Tx delay),
performed by a user equipment (UE), comprising:
obtaining UE transmission channel delay (UE Tx Delay) parameter information;
receiving gNB Tx Delay parameter information transmitted by a gNB or location management function (LMF);
correcting a positioning measurement value based on the UE Tx Delay parameter information and/or the gNB Tx Delay parameter information; and
wherein the positioning measurement value is obtained through measuring, by a receiving node, a positioning reference signal transmitted by a transmitting node according to a positioning reference signal configuration information.

15. The method of claim 14, wherein the receiving the gNB Tx Delay parameter information transmitted by a gNB or LMF comprises:
receiving gNB Tx Delay parameter information of a serving gNB, and gNB Tx Delay parameter information of a neighboring gNB forwarded by the serving gNB; or
receiving the gNB Tx Delay parameter information of the serving gNB, and the gNB Tx Delay parameter information of the neighboring gNB forwarded by the LMF; or
receiving the gNB Tx Delay parameter information of the serving gNB and the gNB Tx Delay parameter information of the neighboring gNB which are forwarded by the LMF.

16. The method of claim 14, wherein in case that the transmitting node is a gNB, before the correcting the positioning measurement value based on the UE Tx Delay parameter information and/or the gNB Tx Delay parameter information, the method further comprises:
receiving a RequestCapabilities message transmitted by the LMF, wherein the RequestCapabilities message is used for requesting the UE to inform the LMF of a location function supported by the UE;
transmitting a ProvideCapabilities message to the LMF, wherein the ProvideCapabilities message is used for informing the LMF of the location function supported by the UE;
transmitting a RequestAssistanceData message to the LMF, wherein the RequestAssistance Data message is used for requesting the LMF to provide location assistance data;
receiving a Provide Assistance Data message transmitted by the LMF, wherein the Provide Assistance Data message is used for providing the location assistance data to the UE, and the location assistance data comprises downlink positioning reference signal configuration information;
receiving a RequestLocationInformation message transmitted by the LMF,
wherein the RequestLocationInformation message is used for requesting the UE to measure a downlink positioning reference signal transmitted by the gNB;
measuring the downlink positioning reference signal transmitted by the gNB by using the downlink positioning reference signal configuration information to obtain a fifth positioning measurement value;
the correcting the positioning measurement value based on the UE Tx Delay parameter information and/or the gNB Tx Delay parameter information comprises:
correcting the fifth positioning measurement value based on the gNB Tx Delay parameter information; or
wherein in case that the transmitting node is the gNB and the UE, before the correcting the positioning measurement value based on the UE Tx Delay parameter information and/or the gNB Tx Delay parameter information, the method further comprises:
receiving a RequestCapabilities message transmitted by the LMF, wherein the RequestCapabilities message is used for requesting the UE to inform the LMF of a location function supported by the UE;
transmitting a ProvideCapabilities message to the LMF, wherein the ProvideCapabilities message is used for informing the LMF of the location function supported by the UE;
transmitting a RequestAssistance Data message to the LMF, wherein the RequestAssistance Data message is used for requesting the LMF to provide location assistance data;
receiving a Provide Assistance Data message transmitted by the LMF, wherein the Provide Assistance Data message is used for providing the location assistance data to the UE, and the location assistance data comprises downlink positioning reference signal configuration information;
receiving a RequestLocationInformation message transmitted by the LMF, wherein the RequestLocationInformation message is used for requesting the UE to measure a downlink positioning reference signal transmitted by the gNB;
measuring the downlink positioning reference signal transmitted by the gNB by using the location assistance data to obtain a sixth positioning measurement value;
receiving an uplink positioning reference signal configuration information transmitted by a serving gNB through radio resource control (RRC) signaling;
transmitting an uplink positioning reference signal to all gNBs participating in positioning according to the RRC signaling for all the gNBs participating in positioning to measure the uplink positioning reference signal according to the uplink positioning reference signal configuration information transmitted by the LMF to obtain a seventh positioning measurement value and transmit the seventh positioning measurement value to the UE through the LMF;
wherein all the gNBs participating in positioning comprise the serving gNB and one or more neighboring gNBs;
the correcting the positioning measurement value based on the UE Tx Delay parameter information and/or the gNB Tx Delay parameter information comprises:

correcting the sixth positioning measurement value based on the gNB Tx Delay parameter information; and correcting the seventh positioning measurement value based on the UE Tx Delay parameter information.

17. A user equipment (UE), comprising: a memory, a transceiver and a processor;

wherein the memory is used for storing a computer program; the transceiver is used for receiving and transmitting data under the control of the processor; and the processor is used for reading the computer program in the memory and performing the method of claim 14.

18. A method for correcting transmission channel delay (Tx delay), performed by a location management function (LMF), comprising:

obtaining gNB Tx Delay parameter information and positioning reference signal configuration information;

transmitting the positioning reference signal configuration information to a receiving node;

transmitting the gNB Tx Delay parameter information to a user equipment (UE) for the UE to correct a positioning measurement value based on UE Tx Delay parameter information of the UE and/or the gNB Tx Delay parameter information;

wherein the positioning measurement value is obtained through measuring, by the receiving node, a positioning reference signal transmitted by a transmitting node according to the positioning reference signal configuration information; and in case that the transmitting node is a gNB, the receiving node is the UE; and in case that the transmitting node is the UE and the gNB, the receiving node is the gNB and the UE.

19. The method of claim 18, wherein the obtaining gNB Tx Delay parameter information and positioning reference signal configuration information comprises:

transmitting a TRP INFORMATION REQUEST message to a gNB, and receiving a TRP INFORMATION RESPONSE message transmitted by the gNB;

wherein for a serving gNB, the TRP INFORMATION REQUEST message is used for simultaneously requesting the serving gNB to provide downlink positioning reference signal configuration information, uplink positioning reference signal configuration information and TRP information and gNB Tx Delay information of the serving gNB; and for a neighboring gNB, the TRP INFORMATION REQUEST message is used for requesting the neighboring gNB to provide TRP information and gNB Tx Delay information of the neighboring gNB; or for the serving gNB, the TRP INFORMATION REQUEST message is used for simultaneously requesting the serving gNB to provide downlink positioning reference signal configuration information and TRP information and gNB Tx Delay information of the serving gNB; and for the neighboring gNB, the TRP INFORMATION REQUEST message is used for requesting the neighboring gNB to provide TRP information and gNB Tx Delay information of the neighboring gNB;

wherein the method further comprises:

transmitting a RequestCapabilities message to the UE, wherein the RequestCapabilities message is used for requesting the UE to inform the LMF of a location function supported by the UE;

receiving a ProvideCapabilities message transmitted by the UE, wherein the ProvideCapabilities message is used for informing the LMF of the location function supported by the UE;

receiving a RequestAssistance Data message transmitted by the UE, wherein the RequestAssistance Data message is used for requesting the LMF to provide location assistance data;

transmitting a Provide Assistance Data message to the UE, wherein the Provide Assistance Data message is used for providing the location assistance data to the UE, and the location assistance data comprises downlink positioning reference signal configuration information; and transmitting a RequestLocationInformation message to the UE for the UE to measure the downlink positioning reference signal transmitted by a gNB by using the location assistance data, wherein the RequestLocationInformation message is used for requesting the UE to measure a downlink positioning reference signal transmitted by a gNB;

wherein after the transmitting the RequestLocationInformation message to the UE, the method further comprises:

transmitting a MEASUREMENT REQUEST message to all gNBs participating in positioning, wherein the MEASUREMENT REQUEST message comprises uplink positioning reference signal configuration information for all the gNBs participating in positioning to measure uplink positioning reference signal transmitted by the UE and reporting measured positioning measurement values; and receiving the positioning measurement values transmitted by all the gNBs participating in positioning, and transmitting the positioning measurement values transmitted by all the gNBs participating in positioning to the UE.

20. A location management function (LMF), comprising: a memory, a transceiver and a processor;

wherein the memory is used for storing a computer program; the transceiver is used for receiving and transmitting data under the control of the processor; and the processor is used for reading the computer program in the memory and performing the method of claim 18.

* * * * *